United States Patent
Verhage et al.

(10) Patent No.: US 12,433,969 B2
(45) Date of Patent: Oct. 7, 2025

(54) AIR CLEANER ASSEMBLY

(71) Applicant: Evergreen Innovation and Technology, Inc., Middleville, MI (US)

(72) Inventors: Keith Alan Verhage, Middleville, MI (US); Aaron Jon Schradin, West Olive, MI (US); David Robert Skelton, Bartlett, TN (US)

(73) Assignee: EVERGREEN INNOVATION AND TECHNOLOGY, INC., Middleville, MI (US)

( * ) Notice: Subject to any disclaimer, the term of this patent is extended or adjusted under 35 U.S.C. 154(b) by 526 days.

(21) Appl. No.: 17/997,445

(22) PCT Filed: Apr. 29, 2021

(86) PCT No.: PCT/US2021/029792
§ 371 (c)(1),
(2) Date: Oct. 28, 2022

(87) PCT Pub. No.: WO2021/222499
PCT Pub. Date: Nov. 4, 2021

(65) Prior Publication Data
US 2023/0165997 A1    Jun. 1, 2023

Related U.S. Application Data

(60) Provisional application No. 63/115,708, filed on Nov. 19, 2020, provisional application No. 63/017,127, filed on Apr. 29, 2020.

(51) Int. Cl.
*A61L 9/20* (2006.01)
*F24F 8/22* (2021.01)

(52) U.S. Cl.
CPC ........ *A61L 9/20* (2013.01); *F24F 8/22* (2021.01); *A61L 2209/12* (2013.01); *A61L 2209/15* (2013.01); *A61L 2209/16* (2013.01)

(58) Field of Classification Search
CPC .... A61L 9/20; A61L 2209/12; A61L 2209/15; A61L 2209/16; F24F 8/22
See application file for complete search history.

(56) References Cited

U.S. PATENT DOCUMENTS

| 4,786,812 A | 11/1988 | Humphreys |
| 6,939,397 B2 | 9/2005 | Nelsen et al. |
| (Continued) | | |

FOREIGN PATENT DOCUMENTS

| CN | 106052081 A | 10/2016 |
| CN | 107062452 A | 8/2017 |
| (Continued) | | |

OTHER PUBLICATIONS

International Search Report issued in corresponding International Application No. PCT/US2021/029792, date of mailing Aug. 11, 2021 (3 pages).

(Continued)

*Primary Examiner* — Sean M Luck
(74) *Attorney, Agent, or Firm* — FLYNN THIEL, P.C.

(57) ABSTRACT

An air cleaner assembly having a lighting arrangement which emits ultraviolet (UV) light for the purpose of disinfecting air which is circulated through the air cleaner assembly, and which disinfected air is then discharged from the assembly. The air cleaning assembly may be utilized in conjunction with an upright space-dividing wall panel system, such as those used in office or work areas.

20 Claims, 29 Drawing Sheets

(56) References Cited

U.S. PATENT DOCUMENTS

| | | |
|---|---|---|
| 7,416,588 B2 | 8/2008 | Burrows et al. |
| 7,704,463 B2 | 4/2010 | Willette |
| 8,017,073 B2 | 9/2011 | Engelhard |
| 8,388,731 B2 | 3/2013 | Metteer |
| 8,404,186 B2 | 3/2013 | Clark et al. |
| 8,772,744 B1 | 7/2014 | Liu |
| 9,035,270 B2 | 5/2015 | Graebel et al. |
| 9,370,600 B1 | 6/2016 | DuPuis et al. |
| 10,220,110 B2 | 3/2019 | Kim et al. |
| 2003/0003028 A1 | 1/2003 | Tomaselli |
| 2003/0230477 A1 | 12/2003 | Fink et al. |
| 2004/0135104 A1* | 7/2004 | Vilarasau Alegre ...... A61L 9/20 250/504 R |
| 2007/0297951 A1 | 12/2007 | Caramuta |
| 2008/0019861 A1 | 1/2008 | Silderhuis |
| 2016/0271289 A1 | 9/2016 | Duffy |
| 2018/0264160 A1 | 9/2018 | Benedek et al. |
| 2018/0344890 A1 | 12/2018 | Watanabe et al. |

FOREIGN PATENT DOCUMENTS

| | | |
|---|---|---|
| DE | 202018001847 U1 | 8/2019 |
| KR | 1020120005143 A | 1/2012 |
| KR | 1020170124845 A | 11/2017 |
| RU | 2664447 C1 | 8/2018 |
| TW | M585625 U | 11/2019 |

OTHER PUBLICATIONS

Written Opinion of the International Searching Authority issued in corresponding International Application No. PCT/US2021/029792, date of mailing Aug. 11, 2021 (7 pages).

* cited by examiner

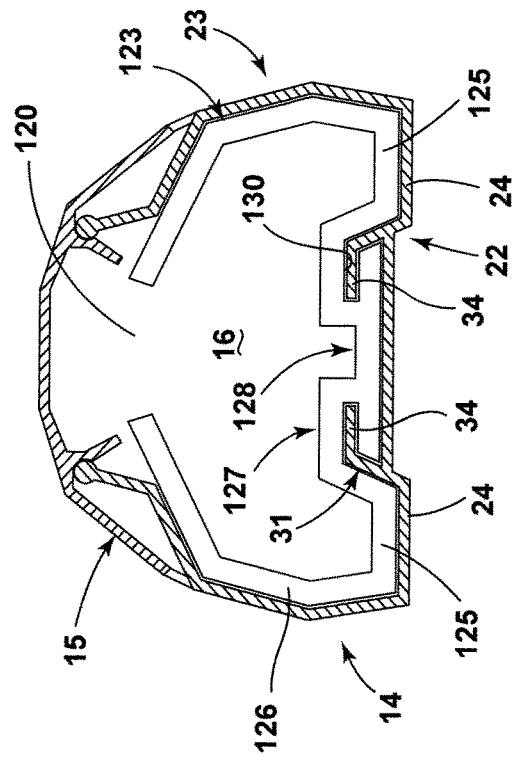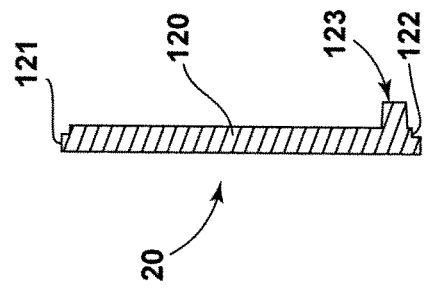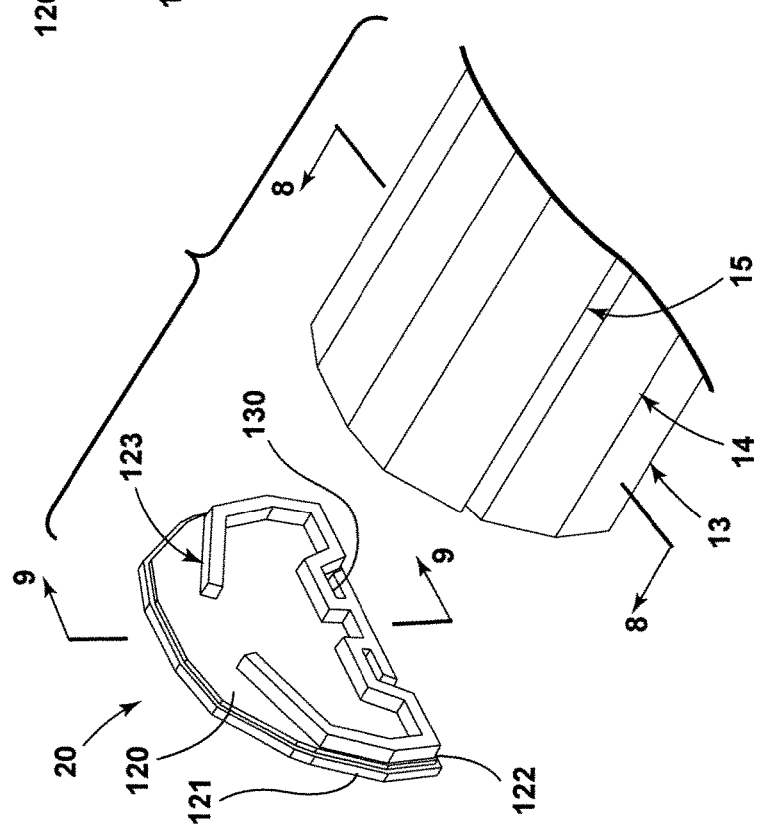
FIG. 8
FIG. 9
FIG. 7

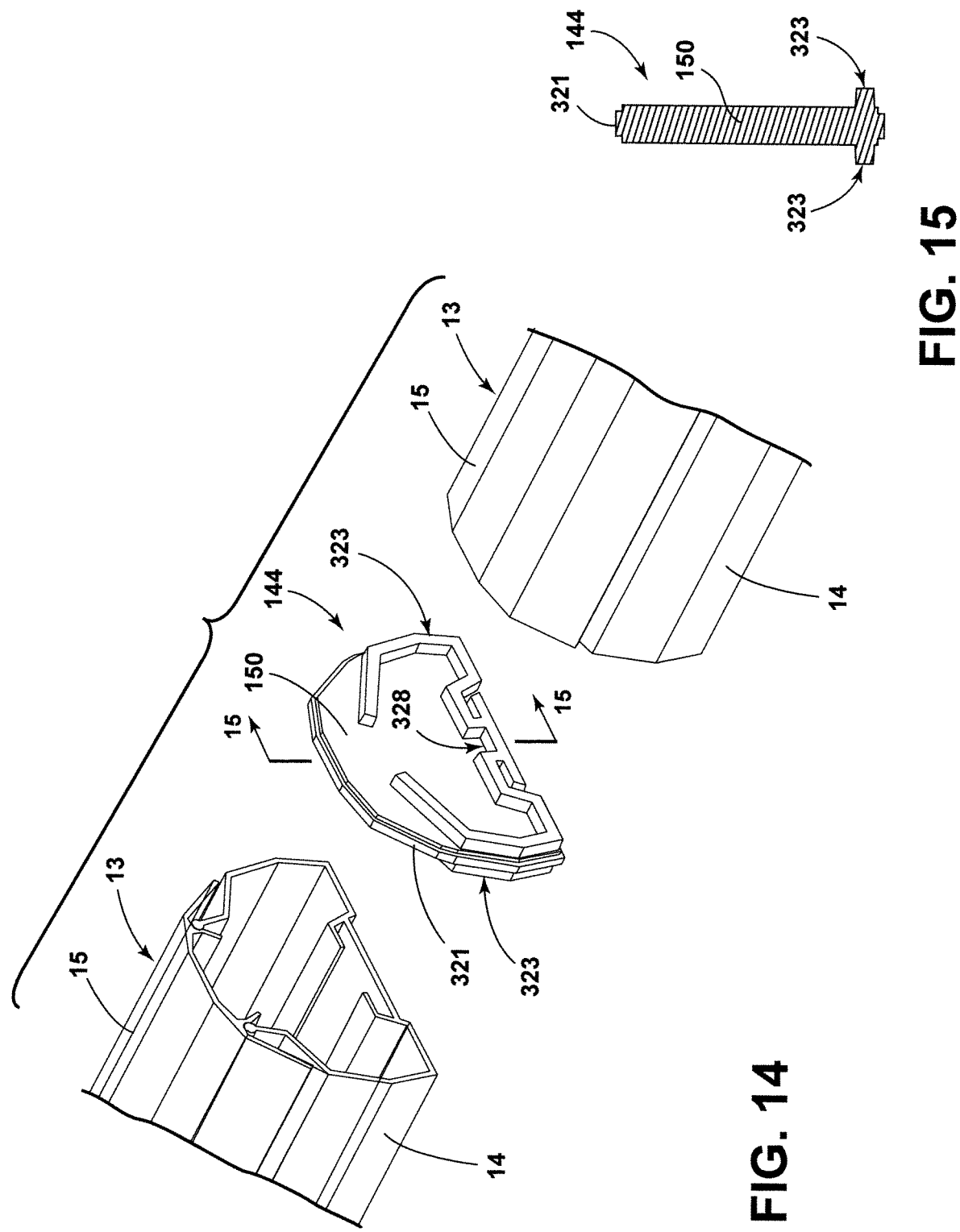

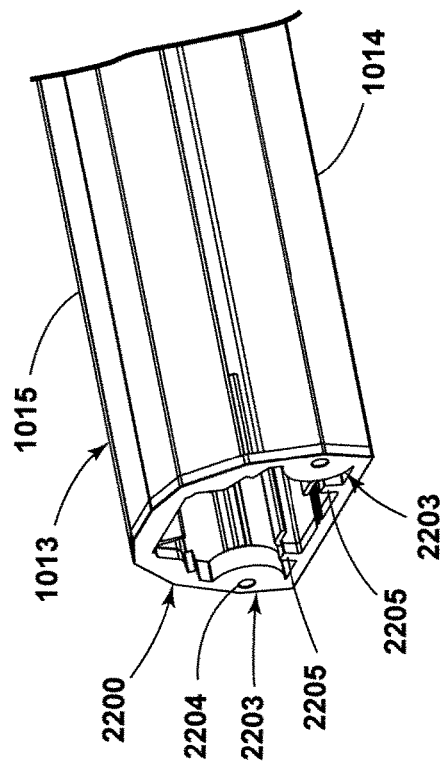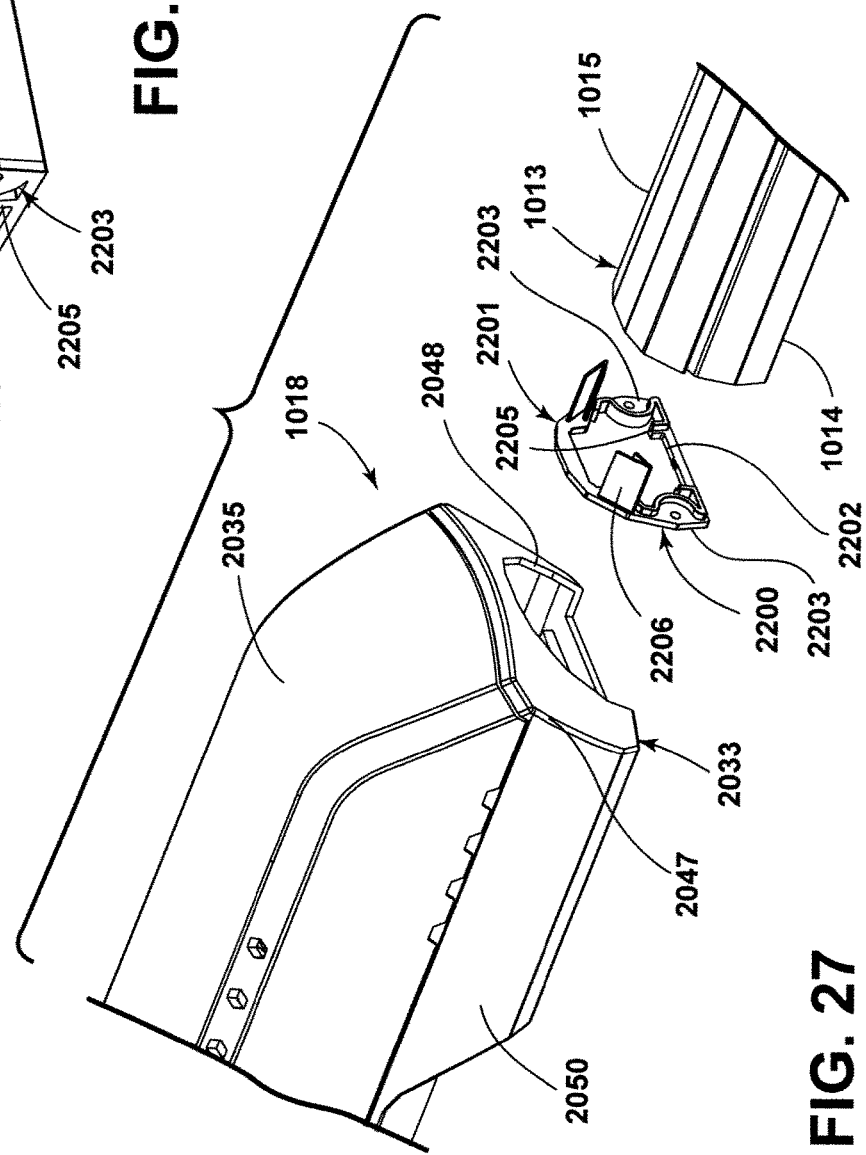

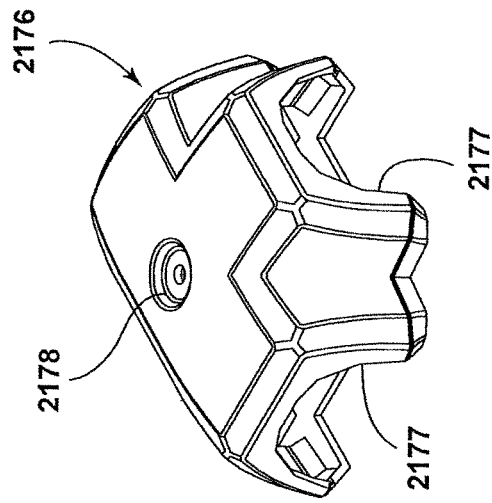
FIG. 42
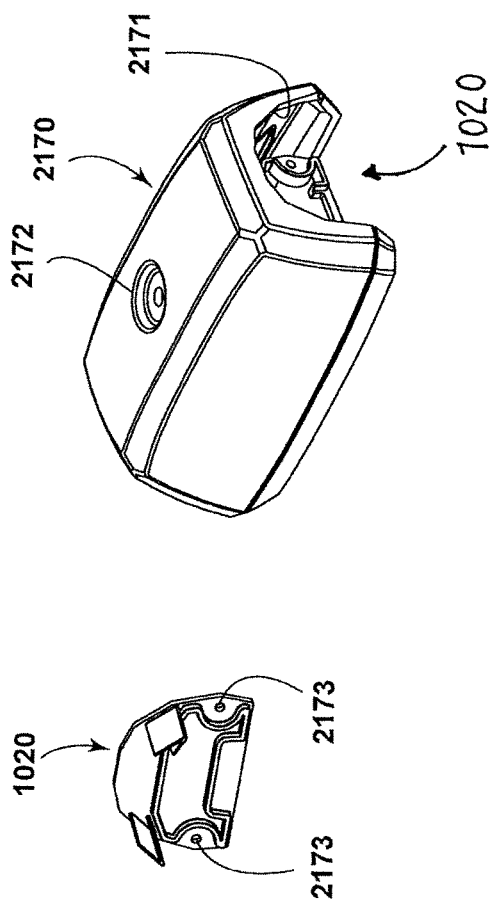
FIG. 41
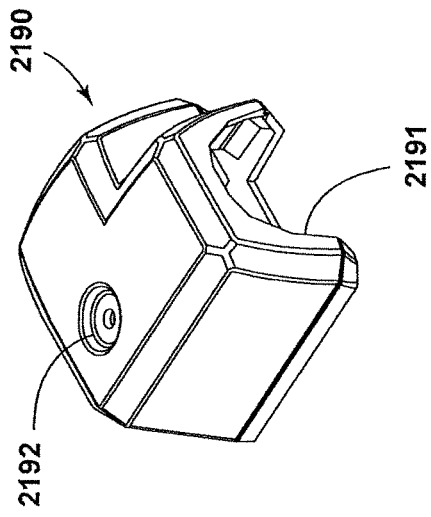
FIG. 43
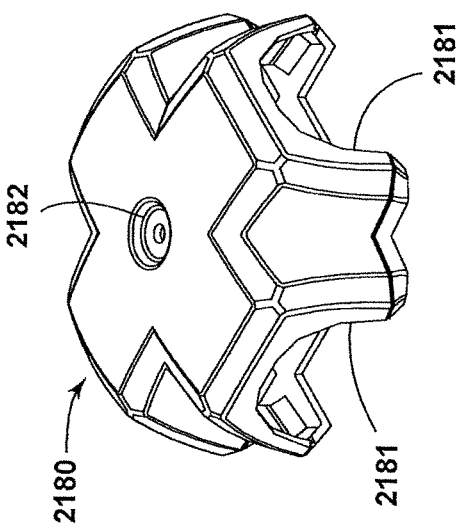
FIG. 44
FIG. 45

AIR CLEANER ASSEMBLY

CROSS REFERENCE TO RELATED APPLICATIONS

This claims the benefit of U.S. Provisional Application Ser. No. 63/017,127 filed on Apr. 29, 2020 and U.S. Provisional Application Ser. No. 63/115,708 filed on Nov. 19, 2020, the disclosures of which are hereby incorporated herein by reference in their entireties.

TECHNICAL FIELD

This invention relates to an air cleaner assembly incorporating a lighting arrangement which emits ultraviolet (UV) energy for the purpose of cleaning contaminated air which is circulated through the air cleaner assembly, and which cleaned air is then discharged from the assembly.

BACKGROUND

Today, a large number of pollutants and toxins can be found in the air we breathe on a regular basis. Such substances are pollen, viruses, bacteria, fungus and molds. Because these pollutants are so prevalent in the air and are found in most locations, contact with them is inevitable. Typically, pollutants cause general discomfort and even temporary or lasting damage to many people, and can be particularly troublesome to individuals that suffer from emphysema, asthma, and hay fever and like allergies.

Of particular concern are viruses and other pathogens that can cause communicable diseases, many of which are spread from person to person through the air. It is therefore desirable to provide a solution for eliminating, or at least substantially reducing, contaminants and microorganisms located in the air within indoor spaces in which people congregate in order to prevent, or at least minimize, the transmission of viruses and infectious pathogens. The indoor spaces in which harmful airborne contaminants may be present and thus require elimination are offices, hospitals, retail stores and educational institutions. Of particular importance is cleaning and purifying air within medical facilities, clinics and doctor's offices which are especially vulnerable due to the regular presence of ill persons. Other confined areas which would benefit from better and more efficient air cleaning and purifying are public transport systems such as subways and trains, public transport vehicles such as aircraft and buses, and personal vehicles.

One embodiment is directed to a portable and modular air cleaner assembly which is usable in a variety of different indoor environments which are enclosed, but which are subject to air exchange, and which may harbor air transmissible substances harmful to persons. The air cleaning assembly incorporates an elongate housing arrangement which defines therein an interior air duct utilized for treatment of contaminated air which enters the duct. Advantageously, the housing arrangement includes a base housing portion configured for attachment to virtually any rigid and generally planar support surface by a mounting arrangement. Such attachment may be achieved via a toolless method, which method would permit removal and/or relocation of the air cleaner assembly as needed. In one embodiment, the mounting arrangement may be an adhesive strip or adhesive elements which cooperate between the base housing portion and the support surface, or may include fastening arrangements such as hook and loop type fasteners or magnetic fasteners. Other fastening elements which may be utilized are screws and the like. Further, the air cleaner assembly incorporates a lighting arrangement which emits ultraviolet energy or light, which is particularly useful for cleaning and purifying air. In this regard, and in general, ultraviolet light is classified into three wavelength ranges: UV-C, from about 200 nanometers (nm) to about 280 nm; UV-B, from about 280 nm to about 315 nm; and UV-A, from about 315 nm to about 400 nm. Generally, ultraviolet light, and in particular, UV-C light is "germicidal," i.e., it deactivates the DNA of bacteria, viruses and other pathogens and thus destroys their ability to multiply and cause disease. This effectively results in inactivation of the microorganisms. Specifically, UV-C light causes damage to the nucleic acid of microorganisms by forming covalent bonds between certain adjacent bases in the DNA. The formation of these bonds prevents the DNA from being "unzipped" for replication, and the organism is neither able to produce molecules essential for life process, nor is it able to reproduce. In fact, when an organism is unable to produce these essential molecules or is unable to replicate, the organism dies. Further, damage to an organism by UV-C light is cumulative, and thus is highly effective. More specifically, each time an organism is exposed to UV-C light, the organism receives another treatment. This means that after a number of treatments (and in some cases only one treatment) the microorganism is inactivated. If multiple treatments with UV-C light are necessary in order to inactivate the organism, then each treatment would at least significantly compromise the organism.

In one embodiment, the lighting arrangement of the air cleaner assembly includes a plurality of LEDs which emit ultraviolet energy, which LEDs are located within the interior air duct of the housing arrangement and are distributed along a substantial portion of the length thereof for maximum air treatment capability. An air circulating module or assembly is also provided on the housing arrangement and includes an air circulating or moving device, such as a fan or fans, located within a housing of the air circulating module. The air moving device transports air to be cleaned into the interior air duct, where the contaminated air is cleaned by the ultraviolet light emitted by the lighting arrangement, and discharges the cleaned air from the interior air duct back into the environment located exteriorly of the air cleaning assembly. The air circulating module additionally includes an electric motor located in the module housing for driving the air moving device, and a power supply is provided on the module housing which serves to provide electrical power to the motor as well as to the lighting arrangement. The power supply may conveniently be a power cord mounted to the module housing and configured for electrical connection to an external source of electrical power, such as an electrical receptacle provided within the interior space near the support surface on which the air cleaner assembly is mounted. Alternatively, the power supply may be in the form of a battery or batteries, such as a rechargeable battery or batteries. The air-circulating module may additionally be provided with a power module which regulates, controls and/or converts the electrical power provided from the power source as necessary for powering and operating the components of the air-circulating module and the lighting arrangement.

The structure of the air cleaner assembly is compact and self-contained in that same incorporates an air treatment duct provided with source of ultraviolet light, an on-board air circulating module which both circulates air through the duct for treatment and discharges purified air therefrom, and a power supply which supplies all electrical power needed to operate the assembly.

The support surface to which the air cleaner assembly is mounted may be a horizontally-oriented and rigid top frame member of a space-dividing wall panel system such as those used to divide a large open area of a building into smaller areas suitable for use as individual workspaces in an office environment. Other locations which would provide a suitable support surface are walls and/or other generally upright support surfaces, such as support posts or columns which form part of an enclosed space within a building. As such, the air cleaner assembly may be mounted in both horizontal and vertical orientations, or in other angular orientations, as dictated by the enclosed area to be treated.

The air cleaner assembly may also be utilized in public shopping areas such as retail stores, and in this regard the assembly or assemblies may be mounted on flooring along shopping isles and/or along racks or shelves which store goods for purchase. The air cleaner assembly may additionally be used in mass transport vehicles, such as trains, buses and subways. For example, the air cleaner assembly may be utilized in overhead areas of trains, buses and subways or under racks provided on these types of vehicles. Additionally, the air cleaner assembly may be used in personal vehicles, such as cars and trucks, and may be mounted along the roof of such vehicles within the interior cabin.

The air cleaner assembly may alternatively be utilized in conjunction with an existing air handling system, for example air handling systems integrated into aircraft, cruise ships, subways, trains, or other transport vehicles. In this regard, the air cleaner assembly is retrofitted into the existing duct of the air handling system such that air flow within the duct flows through the housing arrangement of the air cleaner assembly where the contaminated air is treated by the lighting arrangement thereof.

A further embodiment of the air cleaner assembly includes an elongate housing arrangement similar to the housing arrangement of the first embodiment and which defines therein an elongate interior air duct or chamber, and an air circulation and decontamination module or assembly connected to the housing arrangement. In this variation, the air circulation and decontamination module defines therein a further interior air duct which functions as an air treatment chamber in which an ultra-violet, air-disinfecting lighting arrangement is disposed. The air treatment chamber of the air circulation and decontamination module communicates with the air duct of the interconnected housing arrangement, such that contaminated air is drawn into the air duct of the housing arrangement and is directed to the air treatment chamber of the air circulating and decontamination module for treatment. Cleaned air is thereafter discharged from the air circulation and decontamination module to the exterior environment. This embodiment of the air cleaner assembly includes a heat dissipation arrangement provided on the air circulation and decontamination module which directs cooling air from the exterior environment toward the lighting arrangement, conducts heat generated by the lighting arrangement away therefrom as heated air, and discharges the heated air through at least one cooling channel incorporated into the air circulation and decontamination module. The heat dissipation arrangement maximizes the life of the lighting arrangement, which is particularly important when LEDs are utilized.

The air circulation and decontamination module of the above-described embodiment may be utilized as a stand-alone air cleaning assembly without the use of the elongate housing arrangement connected thereto. More specifically, the air circulation and decontamination module may be configured to draw contaminated air directly into the treatment chamber of the air circulation and decontamination module, for example through a protective screen installed a housing of the module.

One aspect of the air cleaning assembly is directed to an air cleaning assembly including a housing having a length and a width of a substantially lesser dimension than the length such that the housing is longitudinally elongate in shape, the housing having an interior air duct, a base portion extending along the length thereof and a plurality of ports in communication with the interior air duct and in communication with an environment exterior to the housing, the plurality of ports being distributed in a longitudinally spaced-apart manner with one another along a substantial portion of the length of the housing, a mounting arrangement disposed on the base portion and configured for fixedly attaching the base portion to a generally planar and substantially rigid support, a lighting arrangement comprising a plurality of ultraviolet emitting lights, and an air circulating module fixed to the housing, the air circulating module comprising at least one air moving device configured to transport contaminated air from the exterior environment through the plurality of ports disposed in the housing and into the interior air duct for cleaning by the plurality of ultraviolet lights and to discharge cleaned air from the interior air duct to the exterior environment.

A further aspect of the air cleaning assembly is directed to the housing having first and second longitudinally spaced-apart ends and a housing wall connected to the base member and extending lengthwise along the housing between the first and second ends, the ports being disposed in the housing wall.

Another aspect of the air cleaning assembly is that each port includes a discrete opening extending through the housing wall and the openings are disposed in a longitudinally spaced-apart manner with one another along the housing.

Yet another aspect of the air cleaning assembly is that the lighting arrangement is disposed within the interior air duct.

A further aspect of the air cleaning assembly is that the ultraviolet emitting lights comprise LED lights disposed longitudinally along the interior air duct of the housing.

A still further aspect of the air cleaning assembly is that the interior air duct is a first interior air duct and the air circulating module comprises a module housing and a second interior air duct disposed within the module housing, the lighting arrangement being disposed within the second interior air duct.

Another aspect of the air cleaning assembly is that the module housing has a length and a width of a substantially lesser dimension than the length of the module housing such that the module housing is longitudinally elongate in shape, the module housing having a first upstream end and a second downstream end longitudinally spaced from the first upstream end, the first upstream end of the module housing having an intake opening connected to the housing to fluidly interconnect the first and second interior air ducts to one another such that the intake opening at the first upstream end of the module housing receives contaminated air entering the housing through the plurality of ports.

A further aspect of the air cleaning assembly is that the second downstream end of the module housing comprises a discharge opening in communication with the second interior air duct for discharging cleaned air therefrom and into the exterior environment after treatment by the lighting arrangement.

A still further aspect of the air cleaning assembly is that the ultraviolet emitting lights comprise LED lights disposed longitudinally along the second interior air duct.

Another aspect of the air cleaning assembly is that at least one air moving device is disposed at the first upstream end of the module housing and is configured to draw contaminated air into the second interior air duct from the first interior air duct of the housing and to discharge cleaned air from the second interior air duct through the second downstream end of the module housing.

A further aspect of the air circulating module comprises at least one cooling channel and a heat dissipating member disposed adjacent the LED lights to dissipate and transfer heat generated by the LED lights to the at least one cooling channel, the at least one cooling channel communicating with the second downstream end of the module housing to discharge heated air therefrom.

A still further aspect of the air cleaning assembly is that the at least one air moving device comprises two air moving devices, the two air moving devices being an upstream air moving device and a downstream air moving device, the upstream air moving device being disposed at the first upstream end of the module housing and the downstream air moving device being disposed at the second downstream end of the module housing, the module housing comprising a plurality of cooling-air openings in communication with the exterior environment and in communication with the at least one cooling channel.

A further aspect of the air cleaning assembly is directed to an air cleaning assembly comprising a housing having a base portion extending along a length thereof, an intake opening and a discharge opening, a mounting arrangement disposed on the base portion and configured for fixedly attaching the base portion to a generally planar and substantially rigid support surface, an interior air duct disposed within the housing, a lighting arrangement disposed within the interior air duct and comprising a plurality of ultraviolet emitting LED lights, at least one air moving device fixed to the housing and configured to transport contaminated air from an environment exterior to the housing through the intake opening of the housing and into the interior air duct for cleaning by the plurality of ultraviolet lights and to discharge cleaned air from the interior air duct to the exterior environment through the discharge opening of the housing, and a heat dissipating arrangement disposed on the housing and comprising at least one cooling channel, at least one cooling air inlet in communication with an environment exterior to the housing and at least one heat transfer element disposed adjacent the LED lights to dissipate and conduct heat generated by the LED lights away therefrom such that heated air is discharged from the housing via the at least one cooling channel.

A further aspect of the air cleaning assembly is that the cooling channel is disposed to communicate with the discharge opening such that heat generated by the LED lights is discharged as heated air through the discharge opening.

A still further aspect of the air cleaning assembly is that the housing is an outer housing and the air cleaning assembly comprises an inner housing disposed within the outer housing and defining the interior air duct therein, the outer housing including the cooling air inlet in communication with the exterior environment and in communication with the at least one cooling channel.

Another aspect of the air cleaning assembly is that the housing is a first housing and the interior air duct is a first interior air duct, the air cleaning assembly comprising a second housing having a length and a width of a substantially lesser dimension than the length such that the second housing is longitudinally elongate in shape, the second housing having a second interior air duct, a base extending along the length of the second housing and a plurality of ports in communication with the second interior air duct and in communication with the exterior environment, the first housing being connected to the second housing such that the intake opening of the first housing is in communication with the second interior air duct of the second housing, the at least one air moving device transporting contaminated air from the exterior environment through the plurality of ports into the second interior air duct and into the first interior air duct for cleaning by the LED lights.

A further aspect of the air cleaning assembly is that the plurality of ports are distributed in a longitudinally spaced-apart manner with one another along a substantial portion of the length of the second housing.

A further aspect of the air cleaning assembly is an air cleaning assembly for use in conjunction with an upright space-dividing wall panel system, the air cleaning assembly comprising a first housing having a length and a width of a substantially lesser dimension than the length such that the first housing is longitudinally elongate in shape, the first housing having a first interior air duct, a base portion forming a lower part of the first housing and extending along the length thereof, and a plurality of ports in communication with the first interior air duct and in communication with an environment exterior to the first housing, the plurality of ports being distributed in a longitudinally spaced-apart manner with one another lengthwise along the first housing, a first mounting arrangement disposed on the base portion and configured for fixedly attaching the base portion to a generally planar and substantially rigid support surface of an upright space-dividing wall panel system, an air circulation and decontamination module comprising a second housing having a base forming a lower part of the second housing and extending along a length thereof, the second housing having a second interior air duct in communication with the first interior air duct of the first housing, a second mounting arrangement disposed on the base of said second housing and configured for fixedly attaching the base to a generally planar and substantially rigid support surface of an upright space-dividing wall panel system, the air circulating and decontamination module comprising a lighting arrangement disposed within the second interior air duct and comprising a plurality of ultraviolet emitting lights, and at least one air moving device configured to transport contaminated air from the exterior environment through the plurality of ports disposed in the first housing, into the first interior air duct of the first housing and into the second interior air duct for cleaning by the plurality of ultraviolet lights and to discharge cleaned air from the second interior air duct to the exterior environment.

A further aspect of the air cleaning assembly for use in conjunction with an upright space-dividing wall panel system is that the second housing comprises an intake opening and a discharge opening, and the air circulating and decontamination module further comprises at least one cooling channel and a heat dissipating arrangement mounted on the second housing and comprising at least one heat transfer element disposed adjacent the plurality of ultraviolet emitting lights to dissipate and conduct heat generated by the plurality of ultraviolet emitting lights away therefrom and towards the at least one cooling channel.

Another aspect of the air cleaning assembly for use in conjunction with an upright space-dividing wall panel system is that the ultraviolet emitting lights comprise LED lights.

BRIEF DESCRIPTION OF THE DRAWINGS

FIG. 7 is an enlarged, exploded and fragmentary view of an end cap of the air cleaner assembly disassembled from one end of the housing arrangement thereof;

FIG. 8 is an enlarged cross-sectional view as seen generally along line 8-8 in FIG. 7, with the end cap assembled to the housing arrangement;

FIG. 9 is an enlarged cross-sectional view of the end cap, as seen generally along line 9-9 in FIG. 7;

FIG. 14 is an enlarged, exploded and fragmentary view of a further connector utilized to join two air cleaner assemblies in a co-linear arrangement, which connector does not permit air flow between the two air cleaner assemblies;

FIG. 15 is an enlarged cross-sectional view of the connector of FIG. 14, as seen generally along line 15-15 in FIG. 14;

FIG. 27 is an enlarged, exploded and fragmentary view of an upstream end of the air circulation and decontamination module disassembled from a terminal end of the housing arrangement of the air cleaner assembly of FIG. 22;

FIG. 27A is an enlarged and fragmentary perspective view of an open end cap installed on a terminal end of the housing arrangement of the air cleaner assembly of FIG. 22;

FIG. 41 is an enlarged perspective view of the end cap of the air cleaner assembly of FIG. 22;

FIG. 42 is an enlarged perspective view of a connector utilized to join two housing arrangements of the air cleaner assembly of FIG. 22 in a co-linear arrangement;

FIG. 43 is an enlarged perspective view of a T-shaped connector utilized to join three housing arrangements of the air cleaner assembly of FIG. 22 in a T-shaped arrangement;

FIG. 44 is an enlarged perspective view of a further four-way connector utilized to join four housing arrangements of the air cleaner assembly of FIG. 22 in a cross arrangement; and FIG. 45 is an enlarged perspective view of a further 90 degree connector utilized to join two housing arrangements of the air cleaner assembly of FIG. 22 in a right-angled arrangement.

Figure 1:
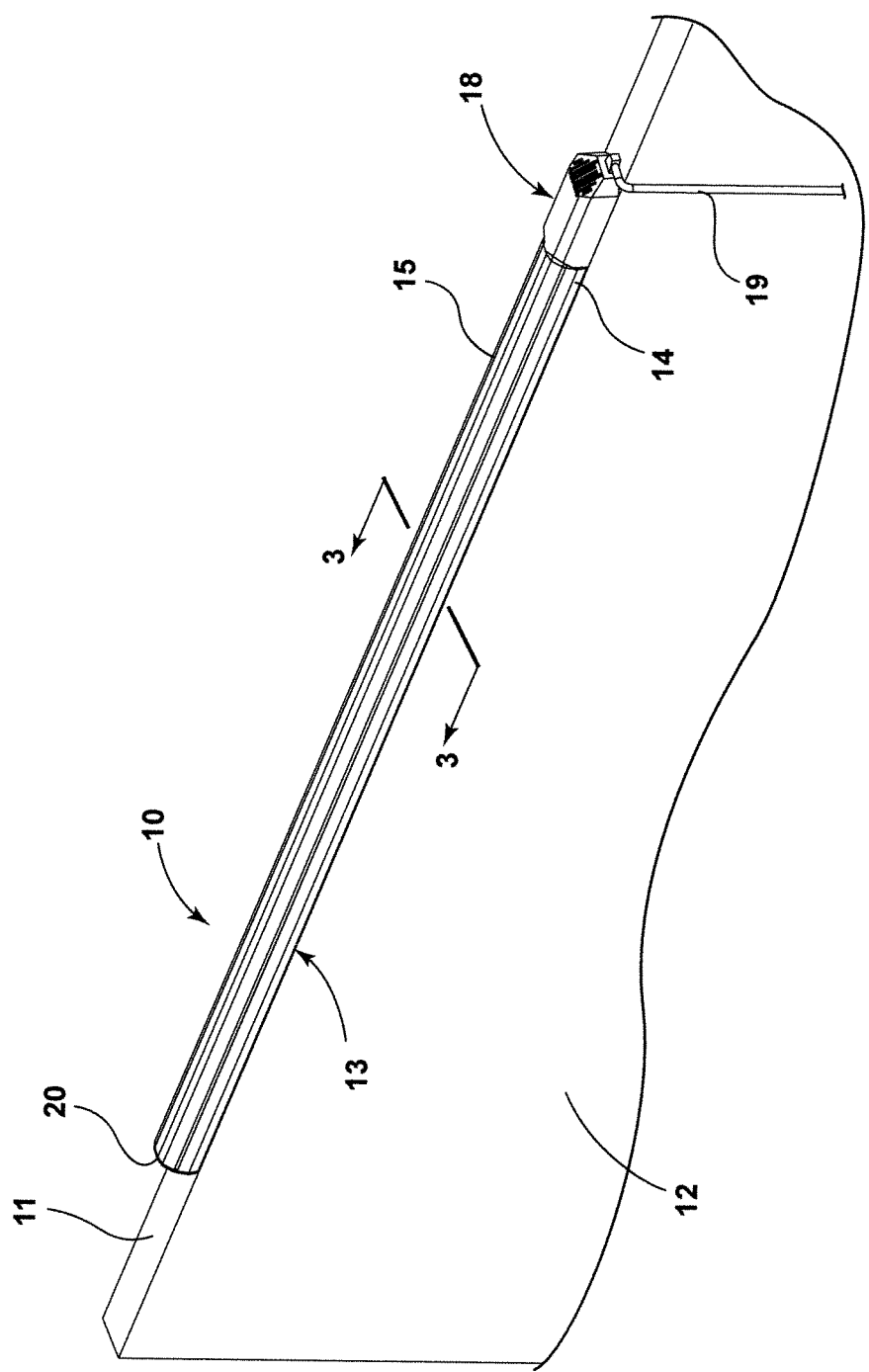
FIG. 1 is an overhead perspective and fragmentary view of an air cleaner assembly installed on a support surface formed on a conventional upright space-dividing wall panel.

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the air cleaner assembly and of designated parts thereof. The words "upstream" and "downstream" will refer to the direction of flow through the air cleaner assembly. Additionally, the words "forward" and "proximal" will refer to the direction toward the end of the arrangement which is closest to the viewer of the drawing, and the words "rearward" and "distal" will refer to the direction toward the end of the arrangement which is furthest from the viewer. Said terminology will include the words specifically mentioned, derivatives thereof, and words of similar import.

DETAILED DESCRIPTION

Referring to FIG. 1, there is illustrated an air cleaner assembly 10 according to one embodiment. The air cleaner assembly 10 may be mounted on any generally flat and sufficiently rigid support surface. By way of example only, in the configuration depicted in FIG. 1, the air cleaner assembly 10 is installed on an upper frame member 11 of a conventional wall panel 12. The wall panel 12 may form part of a conventional prefabricated upright wall system intended for support on a floor within a building, and which may cooperate with additional fixed or prefabricated movable walls to assist in dividing a large open area into smaller areas used for offices and the like. The upright wall system may include a plurality of walls which interconnect in various co-linear or angled relationships so as to define desired individual or group work spaces. Many conventional upright wall systems are electrically powered, and thus incorporate one or more electrical receptacles mounted on the wall panel 12 so as to provide power to various equipment and/or accessories typically utilized in a work area.

Figure 3:
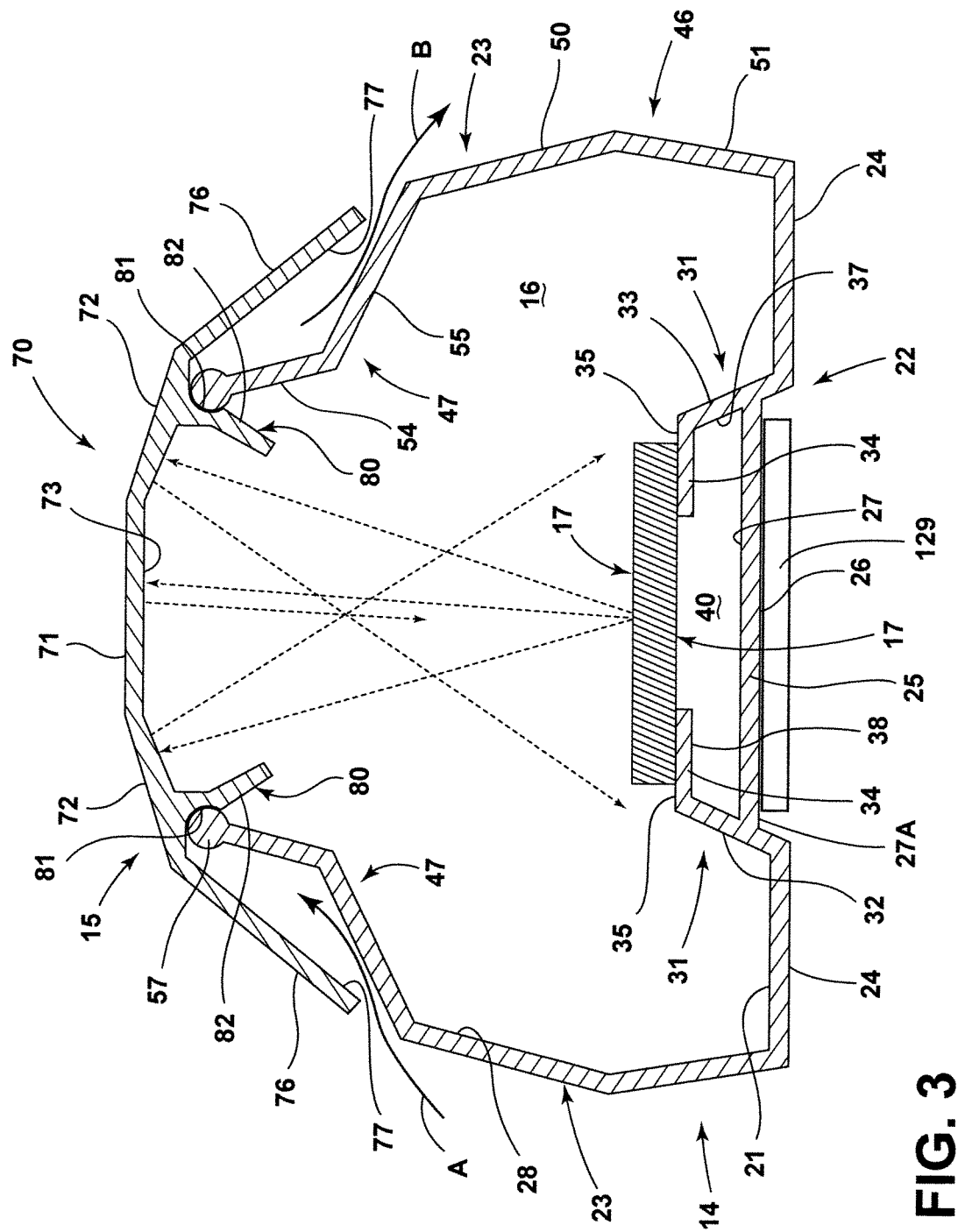
FIG. 3 is an enlarged cross-sectional view of the air cleaner assembly as seen generally along line 3-3 in FIG. 1.

The air cleaner assembly 10 generally includes an elongate housing arrangement 13. In the illustrated embodiment, the housing arrangement 13 is formed by interconnected and longitudinally elongate base and cover housing members 14 and 15. However, it will be appreciated that the housing arrangement 13 may instead be formed from a one-piece component, or from three or more components. In one embodiment, the base and cover housing members 14 and 15 may be extruded components and may be constructed of aluminum, although other materials and forming processes may be utilized. The housing members 14 and 15 when assembled together define an elongate interior air duct or chamber 16 in which an ultra-violet, air-disinfecting lighting arrangement 17 is mounted, as shown in FIG. 3. The air cleaner assembly 10 additionally includes an air circulating module or assembly 18 and an end cap 20. The air circulating assembly 18 and the end cap 20 are disposed at opposite terminal ends of the housing arrangement 13. The air circulating assembly 18 incorporates a power supply 19, which in the illustrated embodiment is a power cord which cooperates with an electrical receptacle provided within the indoor space to be treated. Alternatively, the power supply 19 may be a rechargeable battery or batteries.

The base housing member 14 in the illustrated embodiment is generally U-shaped, and includes a bottom or base wall 22 and a pair of sidewalls 23 which are joined to opposite longitudinal edges of the bottom wall 22 and project away therefrom in a cantilevered fashion.

Figure 2:
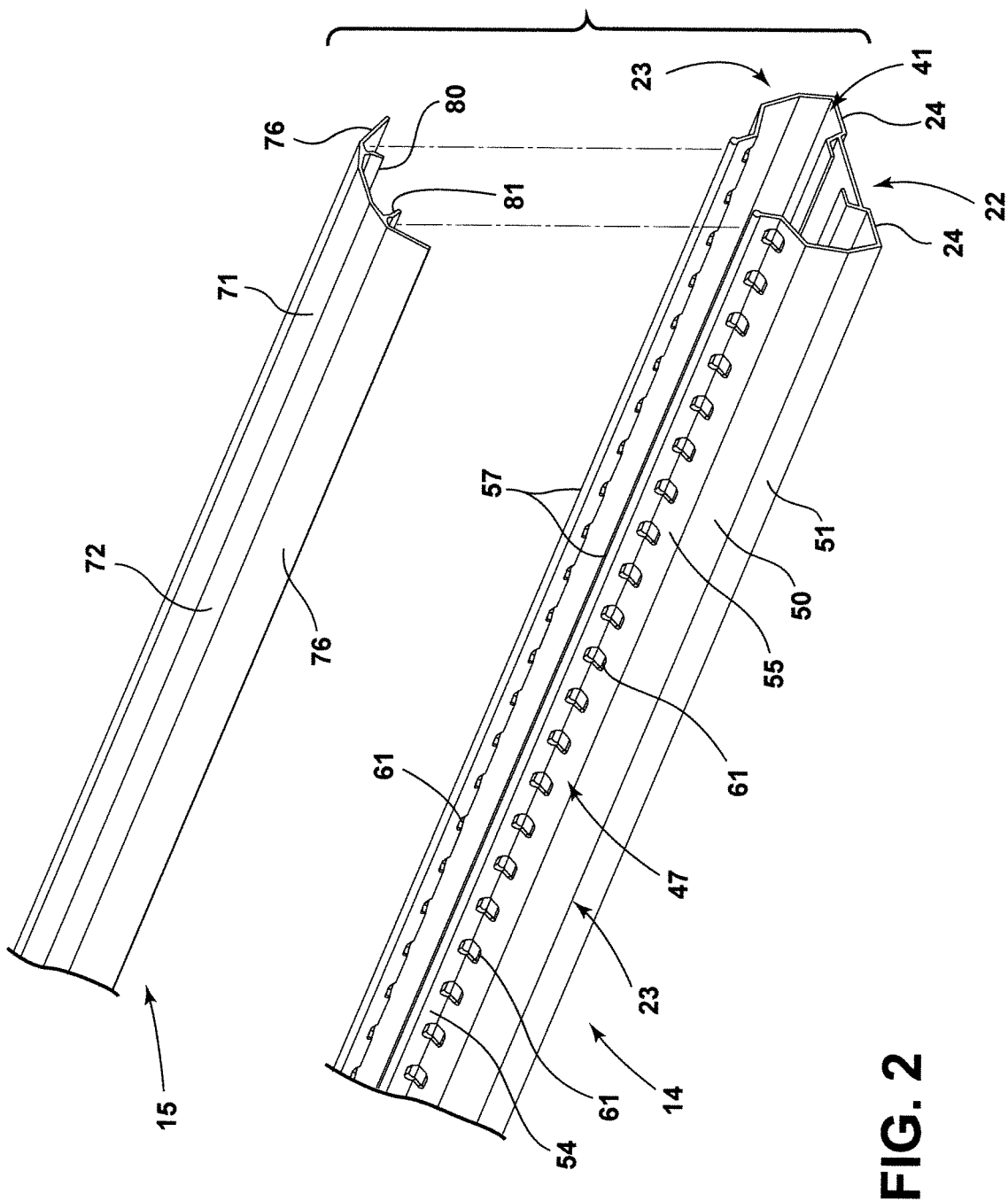
FIG. 2 is an enlarged, exploded and fragmentary view of a housing arrangement of the air cleaner assembly of FIG. 1.

The bottom wall 22 of the base housing member 14 includes a pair of generally planar and longitudinally extending feet 24 which form supports for the base housing member 14 in that the feet 24 are configured to be supported on and engage a structural support surface, such as the upper frame member 11 of the wall panel 12 shown in FIG. 1. The base housing member 14 may alternatively be mounted on an upright wall or post, or on a floor surface. The feet 24 are laterally spaced from one another by a substantially flat or planar intermediate section 25 of the bottom wall 22, which intermediate section 25 extends laterally between and interconnects the feet 24 and has a lower surface 27A spaced upwardly a short distance therefrom so as to define a recess 26 which extends longitudinally along the bottom wall 22 and opens toward the structural support surface on which the air cleaner assembly 10 is mounted. In FIGS. 1-3 which illustrate the housing arrangement 13 oriented in a horizontal manner, the recess 26 opens downwardly. The intermediate section 25 additionally includes an upper surface 27 which faces away from the recess 26. The bottom wall 22 additionally incorporates a pair of support walls 31, each of which projects both upwardly and inwardly from an inner end of the adjacent foot 24 and is adjoined to an outer end of the intermediate section 25. Each support wall 31 includes an inwardly angled wall section 33 adjoined to the adjacent foot 24 and a support flange 34 connected to the respective angled wall section 33 and oriented transversely relative thereto. The two support flanges 34 define respective upper surfaces 35 which are co-planar and as shown in FIG. 3, together define a mounting location for the lighting arrangement 17. Inwardly-facing surfaces 37 of the respective angled wall sections 33, inwardly-facing surfaces 38 of the respective support flanges 34 and the upper surface 27 of the intermediate section 25 together define a dovetail-type groove 40 which opens upwardly between inner terminal ends of the respective support flanges 34, and which also opens endwise through open opposite terminal ends 41 of the base housing member 14.

The sidewalls 23 of the base housing member 14 in the illustrated embodiment are each defined by a lower side wall part 46 joined to an outer edge of the adjacent bottom wall 22 and an upper sidewall part 47 joined to an upper edge of the respective lower sidewall part 46. Each lower sidewall part 46 includes upper and lower wall sections 50 and 51 which are oriented at an angle relative to one another such that their junction forms an apex which is disposed slightly outwardly relative to the outer terminal edge of the adjacent foot 24. Each upper sidewall part 47 includes upper and lower wall sections 54 and 55 which are oriented at an angle relative to one another such that their junction forms an apex which is disposed inwardly of the apex formed by the wall sections 50 and 51 of the respective sidewall 23, which apex is located in generally vertically aligned relation with an inner terminal edge of the adjacent foot 24 where same joins to the adjacent support wall 31. The upper wall sections 54 terminate at respective free ends 57 which define the uppermost extent of the respective sidewalls 23. In one embodiment, these ends 57 are rounded and substantially spherically-shaped or bulb-like and cooperate with the cover housing member 15 to secure same to the base housing member 14. The terminal ends 57 may be configured with an alternative shape from that which is shown, provided that such alternative shape enables the necessary cooperation between the base and cover housing members 14 and 15, as discussed further below.

As shown in FIG. 2, a plurality of ports 61 are formed in each of the upper sidewall parts 47 adjacent the apex of the respective upper and lower wall sections 54 and 55 thereof such that each port 61 extends through part of each of these wall sections. The ports 61 extend completely through the respective sidewalls 23 and communicate with the interior air duct 16. In one embodiment, the ports 61 are substantially rectangular in configuration, and are distributed along substantially the entire longitudinal extent of the base housing member 14. However, it will be appreciated that other shapes and/or locations of the ports 61 are within the scope of the invention, and these shapes and/or locations may be varied to provide the desired or necessary air pressure and/or air flow within and along the assembly 10. Further, these ports 61 may be selectively obstructed or covered so as to provide the desired air pressure and/or air flow within and along the assembly 10.

The ultraviolet lighting arrangement 17, which is shown diagrammatically only in FIG. 3, includes a plurality of ultraviolet-emitting LEDs attached to a circuit board (or PCB) and/or bus, which circuit board serves to route power to the LEDs and also serves as a heat sink. The lighting arrangement 17 is mounted to the upper surfaces 35 of the support flanges 34 of the bottom wall 22 of the base housing member 14 within the interior air duct 16. In this regard, the support flanges 34, in addition to providing a mounting location for the lighting arrangement 17 on the base housing member 14, also serve as heat sinks and conduct heat generated by the lighting arrangement 17 away from same and into the bottom wall 22 of the base housing member 14. The base housing member 14 has a substantial width (as defined transversely to the longitudinal extent of the base housing member 14) adjacent the bottom wall 22 thereof, and in the illustrated embodiment this width adjacent the bottom wall 22 is substantially greater than a width of the base housing member 14 adjacent the upper terminal ends 57 of the sidewalls 23. This larger width at the bottom wall 22 provides both stability to the overall arrangement when same is supported on and fixed to a support surface, and also assists in the conduction of heat away from the lighting arrangement 17 which is particularly important for maximizing the life of the LEDs. Additionally, the space defined between the inner ends of the support flanges 34 provides a conduit for such heat so that same is directed and dispersed into the groove 40 formed by the bottom wall 22.

The lighting arrangement 17 is elongated and extends along a substantial portion of the overall length of the base housing member 14, so that the LEDs are distributed along this length for maximum air treatment capability. The minimum output of ultraviolet energy, and preferably UV-C energy, from the LEDs of the lighting arrangement 17 is 4000 microwatts, which is sufficient to inactivate most viruses and bacteria. Some molds and bacteria require a higher energy level to inactivate same, and thus the output indicated above for the lighting arrangement 17 should be considered a minimum output, and higher energy outputs may be desirable or necessary. In one embodiment, the required UV-C germicidal energy is calculated based on air speed and UV-C intensity. Every pathogen has a known, published "K-value" that provides that accepted lethal dose or UV-C energy. This value varies by the pathogen. However, general accepted guidelines indicate that certain intensities provide different levels of overall reduction, for example, an intensity of 2000 J/cm2 provides an average reduction of virus and bacteria of about 95%.

Turning now to the cover housing member 15 of the housing arrangement 13 and with continued reference to FIGS. 2 and 3, same includes a top wall 70 having a substantially planar central section 71 adjoined at opposite longitudinal edges to a pair of top wall sections 72. The top wall sections 72 are disposed such that same angle slightly downwardly as same project away from the central section 71, and the central and top wall sections 71 and 72 together define a centrally disposed lower or inner surface 73 of the top wall 70. The top wall 70 additionally includes a pair of sidewalls 76 which angle downwardly from outer edges of the respective top wall sections 72, and each of the sidewalls 76 defines an inner surface 77 which, in the orientation of the housing arrangement 13 shown in FIG. 3, face generally downwardly. The top wall 70 additionally incorporates a pair of guide flanges 80 which are fixed to and project away from the respective top wall sections 72 in a cantilevered fashion. Each guide flange 80 defines therein a recess or seat 81 which generally faces towards the inner surface 77 of the adjacent sidewall 76. The recesses 81 are configured in a manner which substantially corresponds with at least a portion of the external contour of the respective terminal free ends 57 of the sidewalls 23 of the base housing member 14.

In one embodiment, and with reference to FIGS. 2 and 3, the cover housing member 15 is assembled to the base housing member 14 by positioning the cover housing member 15 over same and in longitudinal alignment therewith. The cover housing member 15 is then lowered and positioned atop the sidewalls 23 of the base housing member 14 so that outwardly facing surfaces 82 of the respective guide flanges 80 are engaged with respective inner sides of the terminal free ends 57 of the sidewalls 23. The configuration of the guide flanges 80 accordingly provides early engagement of same with the terminal free ends 57 of the sidewalls 23 during installation of the cover housing member 15, and this engagement causes a slight flexing of the cover housing member 15. More specifically, the sidewalls 76 flex slightly inwardly, the top wall 70 flexes slightly outwardly (or upwardly in the orientation of FIGS. 2 and 3), and the guide flanges 80 move slightly inwardly towards one another). With continued movement of the cover housing member 15 toward the base housing member 14, the terminal free ends 57 of the base housing member 14 eventually seat in the respective recesses 81 so that each free end 57 is captured between one of the flanges 80 and the adjacent sidewall 76 of the cover housing member 15, which effectively secures the cover housing member 15 to the lower base member 14. With the cover housing member 15 installed on the base housing member 14, the inner surfaces 21 of the feet 24, the outwardly facing surfaces 32 of the angled wall sections 33, the inner surfaces 28 of the sidewalls 23, and the inner surface 73 of the top wall 70 of the cover housing member 15 together define the air duct 16. The air duct 16 extends throughout the length of the housing arrangement 13 and opens through the open opposite terminal ends 41 of the base housing member 14. These inner surfaces which define the air duct 16 are either constructed of a polished or reflective material or are coated with a polished or reflective coating, which serves to deflect and/or bounce the ultraviolet light emitted by the lighting arrangement 17 throughout the interior air duct 16 so as to maximize the treatment area within the duct 16.

It will be appreciated that the terminal ends 57 of the sidewalls 23 of the base housing member 14 may be configured in another manner than that shown. In this regard, these ends 57 may be configured in any manner which facilitates a reasonably smooth lead-in or guiding of the guide flanges 80 of the cover housing member 15 into the open upper end of the base housing member 14 as the cover housing member 15 is installed thereon, and which configuration prevents movement of the cover housing member 15 away from the base housing member 14 after installation thereon. If servicing or maintenance of the air cleaner assembly 10 is desirable or necessary, the cover housing member 15 may be removed from the base housing member 14 by applying simultaneous inward pressure to the sidewalls 76 of the cover housing member 15, which causes inward deflection of the guide flanges 80 and disengagement of the terminal ends 57 from the respective recesses 81. Alternatively, the cover housing member 15 may be attached to the base housing member 14 permanently in a manner which prevents disassembly and/or tampering with the air cleaner assembly 10.

With reference to FIGS. 1 and 4-6, the air circulating assembly 18 includes a housing 90, which housing 90 in one embodiment is generally elongated in shape and configured so as to substantially correspond with the overall shape, external contour and aesthetics of the housing arrangement 13. The housing 90 includes an upper housing wall 91, a pair of sidewalls 92 which depend downwardly from opposite edges of the upper housing wall 91 and a bottom wall 94 which extends between lower edges of the respective side walls 92. An end wall 96 closes off one end of the housing 90, and the housing 90 has an open end 97 opposite the end wall 96. The end wall 96 defines therein a plurality of slots 100 which extend through the housing 90 and communicate with an interior 101 thereof. In one embodiment, the slots 100 are elongated, and extend along a substantial portion of the end wall 96, and also extend over a short extent along the upper housing wall 91. The air circulating assembly 18 additionally includes a power supply, in one embodiment the power cord 19, which power cord 19 at its end remote from the housing 90 includes a conventional electrical plug (not shown) which cooperates with a conventional electrical outlet (not shown) provided in the work space area or other area in which the air cleaner assembly 10 is located in order to provide power to the assembly 10. Alternatively, the air circulating assembly 18 may incorporate a power supply in the form of one or more rechargeable batteries.

Figure 5:
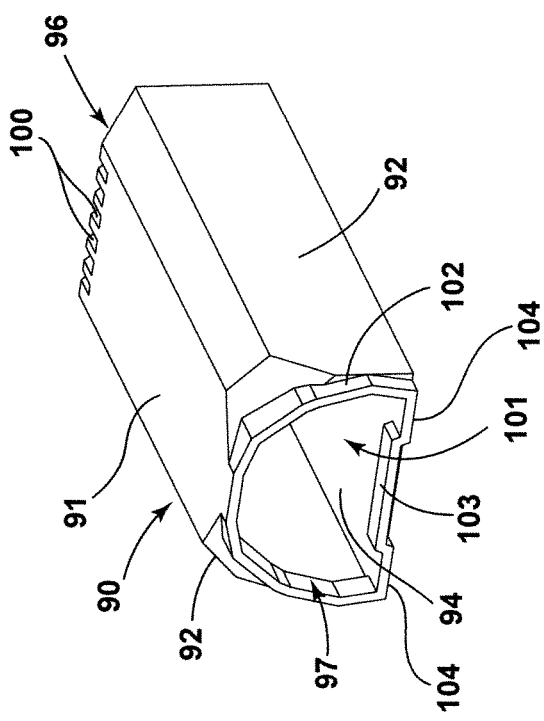
FIG. 5 is an enlarged view of a housing of the air circulator module of FIG. 4 shown in isolation, which shows the end thereof which connects to the housing arrangement.

As best shown in FIG. 5, the open end 97 of the housing 90 has an annular peripheral edge 102 which is shaped and sized such that the edge 102 can telescope over the assembled base and cover housing members 14 and 15 so as to permit communication between the interior air duct 16 and the interior 101 of the housing 90 of the air circulating assembly 18. Adjacent the bottom wall 94 of the housing 90, the peripheral edge 102 has a raised region 103 and foot regions 104 which are shaped in a complementary manner with respect to the recess 26 and feet 22 of the bottom wall 22 of the base housing member 14, such that the raised region 103 engages within the recess 26 and such that the foot regions 104 respectively snugly receive the feet 24 of the base housing member 14 when the peripheral edge 102 is slid over the end of the housing arrangement 13. The upper and side parts of the peripheral edge 102 of the housing 90 snugly receive therein the terminal edges of the sidewalls 23 of the base housing member 14 and the terminal edge of the cover housing member 15.

Figure 4:
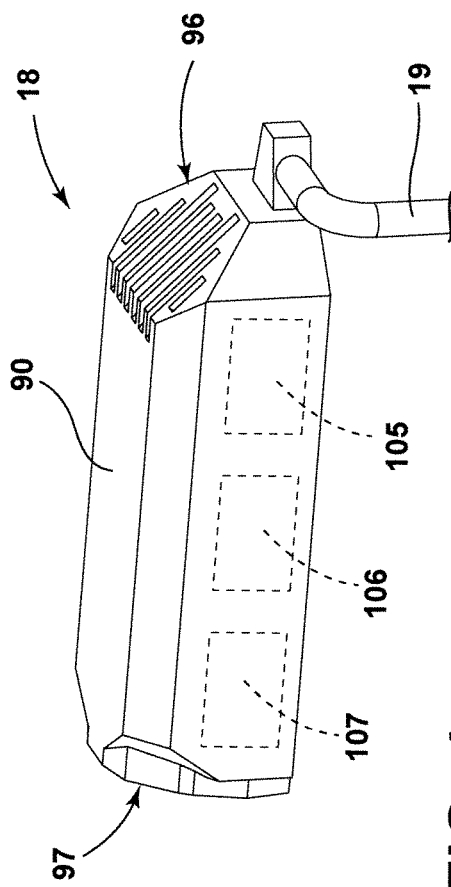
FIG. 4 is an enlarged and fragmentary side view of an air circulator module of the air cleaner assembly of FIG. 1.
Figure 6:
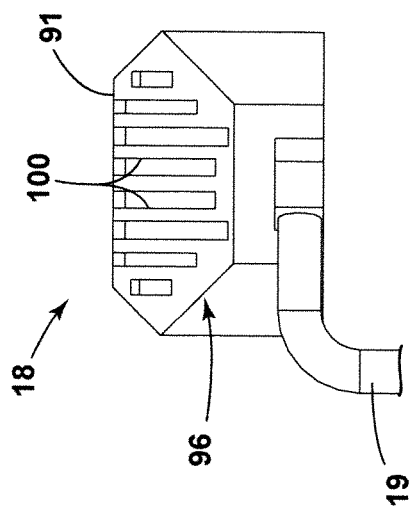
FIG. 6 is an enlarged fragmentary view of the air circulator module of FIG. 4, which shows the opposite end of the housing thereof from that shown in FIG. 5.

With reference to FIG. 4, various components of the air circulating assembly 18 are shown diagrammatically only in dotted lines. These components include a power module 105, an electric motor 106 electrically connected to the power module 105, and an air circulating or air moving device 107 driven by the motor 106. The air circulating device 107 may include one or more fans. Such fans may be an axial or radial fan(s). Where two fans or air moving devices are provided, such fans may be oriented in parallel with one another or in series with one another depending upon the desired or necessary pressure and/or the desired or necessary flow volume within the assembly 10. The power module 105 of the air circulating device 18 is also electrically connected to the lighting arrangement 17 located within the housing arrangement 13 to power same. The power module 15 converts AC current from the power supply 19 to DC current and additionally regulates and controls the electrical power as required by the motor 106 and the lighting arrangement 17. In one embodiment, the power module 105 may be, or the air circulating assembly 18 may additionally include, a PWM (pulse width modulation) module with appropriate logic which serves to cycle the LEDs of the lighting arrangement 17 on and off at a predetermined duty cycle so as to maximize the life of the LEDs by minimizing the heat emitted by same.

It will be appreciated that the air circulating assembly 18 may be configured and operated as a vacuum pump or as a blower. In this regard, when the air circulating assembly 18 is operated as a vacuum pump, the air circulating device 107 is driven and disposed so as to create a negative pressure within the interior air duct 16 of the housing assembly 13 which effectively draws contaminated air from the environment into the slots 61 (provided along the length of the housing arrangement 13) and into the duct 16 where the contaminated air is exposed to the ultra-violet energy emitted by the LEDs of the lighting arrangement 17. The cleaned air then exits through the slots 100 formed in the end 96 of the housing 90 of the air circulating assembly 18. Alternatively, when the air circulating assembly 18 is configured and operated as a blower, the air circulating device 107 is driven and disposed so as to draw contaminated air from the environment into the slots 100 of the housing 90 of the air circulating assembly 18, into and through the duct 16 where the light arrangement 17 cleans the contaminated air, and thereafter discharges the cleaned air into the environment through the slots 61 of the housing arrangement 13.

FIGS. 7-9 illustrate the end cap 20 which is used to close off one end of the housing arrangement 13, and which end cap 20 defines the terminal end of the interior air duct 16. The end cap 20 includes a solid end wall 120 having an outer peripheral edge 121 with a shape which corresponds to the outer peripheral shape of the assembled housing arrangement 13. The peripheral edge 121 defines therein a peripherally extending shoulder or seat 122 against which the peripheral terminal edge of the housing assembly 13 engages. On a side of the end wall 120 which faces inwardly or towards the housing arrangement 13, the end cap 20 incorporates a connector flange 123 which projects sidewardly outwardly from the end wall 120, and which has an overall shape and configuration which substantially matches the transverse cross-sectional interior shape of the base member housing 14, as best shown in FIG. 8 and as discussed in detail below. This configuration of the connector flange 123 allows same to be inserted sidewardly into the base member housing 14 to securely and snugly mount the end cap 20 on the housing arrangement 13.

More specifically, the connector flange 123 of the end cap 20 has a pair of laterally-spaced base sections 125, a pair of side sections 126 which extend away from respective opposite ends of the base sections 125, and a center section 127 disposed between and interconnecting the base sections 125. The center section 127 engages peripherally around the support walls 31 and support flanges 34 of the base housing member 14 and has a centermost portion configured generally as an inverted T-shaped member 128 which projects downwardly between the support flanges 34 of the base housing member 14 and engages within the groove 40 thereof. The support walls 31 and support flanges 34 of the base housing member 14 are similarly engaged within corner-shaped slots 130 formed in the connector flange 123. The base sections 125 and the side sections 126 of the connector flange 123 are sized and shaped such that same firmly seat against the inner surfaces of the feet 24 and the sidewalls 23 of the base housing arrangement 14 to maintain the cap 20 in snug engagement therewith so as to close off and seal the interior air duct 16 at the end thereof adjacent the end cap 20. It will be appreciated that the end cap 20 may alternatively or additionally be secured to the housing arrangement 13 with fasteners, or by other suitable methods.

With reference to FIG. 3, the assembled air cleaner assembly 10 additionally includes a mounting arrangement 129 for securing the assembly 10 to a support surface, such as the top frame member 11 of an upright panel, a floor, an upright surface or other surface. The mounting arrangement 129 may advantageously be a toolless mounting arrangement for convenience in installation. In one embodiment, the mounting arrangement 129 may be an adhesive strip or strips which is/are fastened to the lower surface 27A of the intermediate section 25 of the lower housing member 14 within the recess 26 thereof. Such adhesive strip or strips may be provided continuously along the length of the base housing member 14 or may be disposed in spaced apart relation with one another. The outwardly facing side of the adhesive is then firmly fixed to the support surface with pressure to secure the air cleaner assembly 10 to same. Other toolless mounting arrangements may be utilized, such as hook and loop fasteners or magnets. Alternatively, screws or other similar fasteners and associated mounting methods may be employed. For example, the base housing member 14, before assembly of the lighting arrangement 17 and the cover housing member 15 thereto, may be placed on the support surface and fasteners inserted downwardly through the intermediate section 25 and into the support surface. Assembly of the lighting arrangement 17 and the cover housing member 15 would then take place after the base housing member 14 is firmly in place on the support surface. Alternatively, fasteners may be installed on the support surface and then inserted upwardly through the intermediate section 25 to secure the assembly 10. The above are provided only as examples, and other types of mounting arrangements may be utilized as is appropriate for the type of support surface on which the assembly 10 is to be secured. In the embodiment where the mounting arrangement 129 is adhesive, the groove 40 formed along the bottom wall 22 of the base housing member 14 serves to space the lighting arrangement 17 away from the adhesive, and also to dissipate heat generated by the arrangement 17 away from the adhesive, which prevents damage thereto.

Once the air cleaner assembly 10 is secured to a suitable support surface as discussed above, the air cleaner assembly 10 may be utilized to clean contaminated air located within an enclosed space by connecting the power supply 19 to an adjacent electrical receptacle located within the area to be treated. It will be appreciated that the air cleaner assembly 10 may itself be provided with an on-off switch, or may be turned on and off in conjunction with a timer or in conjunction with an existing HVAC system when the assembly 10 is utilized in a building space. Alternatively, the air cleaner assembly 10 may be incorporated into a network for control purposes, such as a wireless smart-things network, therefore allowing for control of variables of operation including air flow and power of the LEDs, and making function parameters of the assembly 10 based on environmental variables such as working hours and inhabitant presence, for example.

Once the air cleaner assembly 10 is activated, and when the air circulating or moving device 107 is operated as a vacuum pump, the air circulating device 107 operates to create a negative pressure or vacuum within the interior air duct 16, and the lighting arrangement 17 produces ultraviolet energy via the LEDs located within the duct 16 as shown by the dotted lines in FIG. 3. Due to the multiple polished or reflective interior surfaces defined by both the cover housing member 15 and the base housing member 14, the ultraviolet energy is reflected or bounced throughout the duct 16 to effectively and thoroughly clean the contaminated air located therein. The air circulating device 107 draws contaminated air into the interior air duct 16 through the ports 61 defined along the housing assembly 13, which contaminated air enters the ports 61 between the space defined between the lower terminal edge of each sidewall 76 of the cover housing member 15 and the outer surface of the respective adjacent lower wall section 55 of the base housing member 14, as shown by the arrow A in FIG. 3. The cleaned air then exits the interior duct 16 through the slots 100 formed in the end 96 of the housing 90 of the air circulating assembly 18. Alternatively, when the air circulating assembly 18 is configured and operated as a blower, the air circulating device 107 draws contaminated air from the environment into the slots 100 of the housing 90 of the air circulating assembly 18, and then into and through the duct 16 for cleaning by the light arrangement 17, and thereafter discharges the cleaned air into the environment through the slots 61 of the housing arrangement 13 as shown by the arrow B in FIG. 3.

It will be appreciated that the shape, size and/or location of the ports 61 provided in the housing assembly 14 may be varied in order to achieve the desired pressure and/or flow within the air cleaning assembly 10. For example, when the air circulating assembly 18 is operated as a vacuum pump, it may be desirable or necessary to close off a number of ports 61 which are located close to the air circulating assembly 18 in order to provide a vacuum pressure sufficient to reach the end of the air cleaning assembly 10 remote from the assembly 18. Alternatively, the size of the ports 61 located close to the assembly 18 may be smaller than the size of the ports 61 located closer to the end cap 20, or the size of the ports 61 may become progressively larger in the direction from the air circulating assembly 18 towards the end cap 20. Further, it may be desirable or necessary to provide more than one air circulating assembly 18 along the length of the air cleaner assembly 10, depending on the length of same and/or based on the amount of contaminated air to be treated or on other factors.

One or more air cleaner assemblies 10 according to the invention may be utilized in any space where disinfection of the air enclosed therein is desirable or necessary, such as in office-type work areas, commercial establishments such as grocery stores and retail stores, public transport systems such as subways, trains, buses and airplanes, educational institutions such as schools and universities, medical facilities such as hospitals, clinics, medical centers and doctor's offices and in personal motor vehicles.

Figure 10:
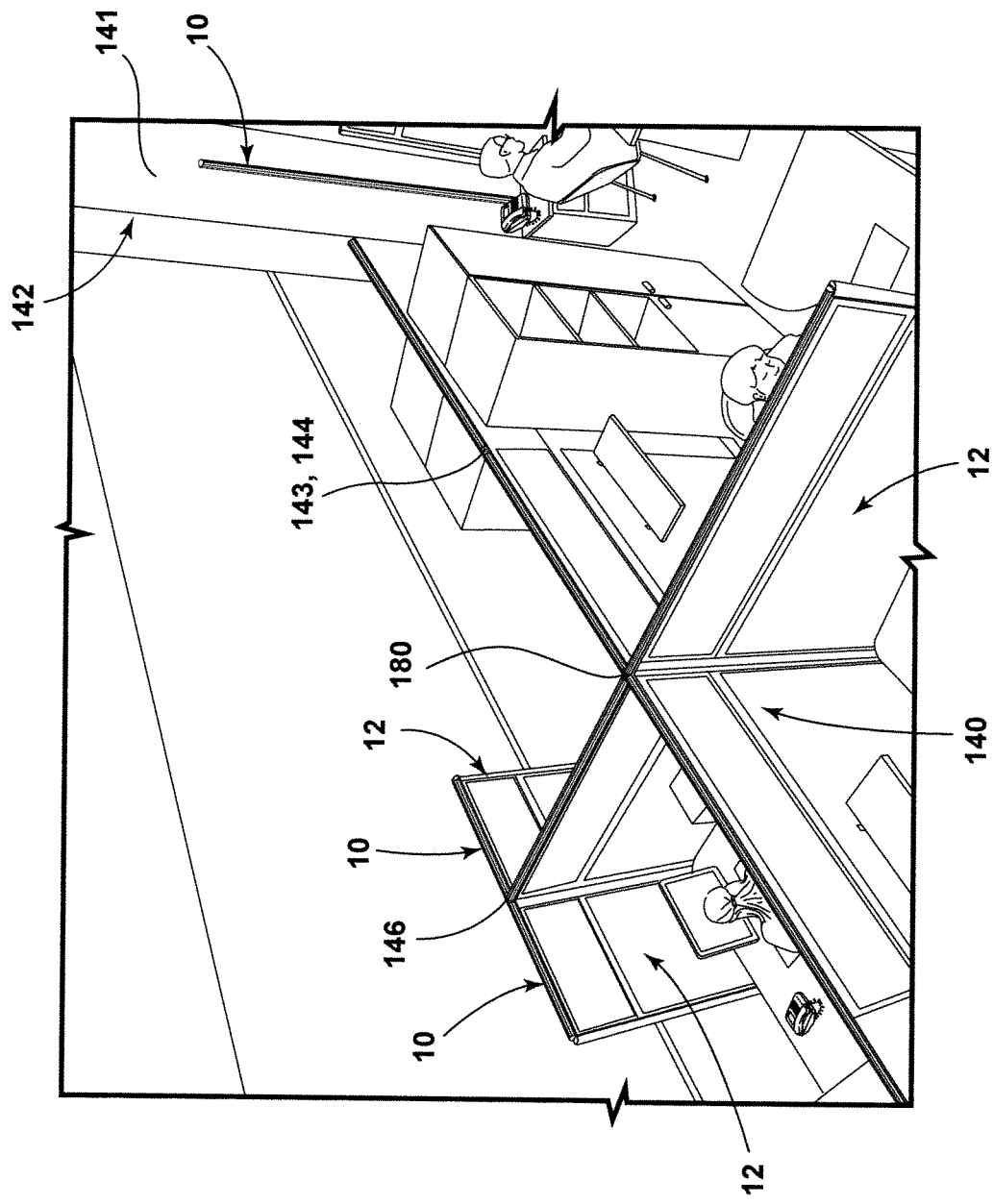
FIG. 10 is a fragmentary overhead view of a plurality of air cleaner assemblies in various orientations relative to one another which may be utilized in a work environment, such as an office.

An example of one type of enclosed space in which the air cleaner assembly 10 may be used is shown in FIG. 10, which illustrates a plurality of air cleaner assemblies 10 arranged in various linear and angular relationships with one another in a work area, such as an office. In this application of the invention, the air cleaner assemblies 10 are utilized on a conventional space-dividing wall panel system 140, typically formed by a plurality of the upright wall panels 12 which can be joined edge-to-edge in either aligned or angled relationship. The wall panels 12, in the illustrated arrangement, are of the type which project upwardly from the floor through a distance significantly less than floor-to-ceiling height in that the upper frame members 11 of the various wall panels 12 are spaced downwardly from the ceiling such that an open air-circulating space is present above the wall panel system 140 and around the various wall panels 12 which define same. The air cleaner assembly 10 is also mounted to an upright surface 141 of a wall or support post 142 located within the work area, as shown in FIG. 10.

The air cleaner assembly 10 may be provided with a predetermined longitudinal length, such as six feet. However, it will be appreciated that this length may be varied based on the intended use and therefore the area in which the assembly is to be installed and used. When used in a wall panel system such as the wall panel system 140 shown in FIG. 10, a single air cleaner assembly 10 may be suitable for mounting along one or more of the wall panels 12. In parts of the wall panel system 140 where two or more wall panels 12 are oriented in a linear relationship with one another, two adjacent housing arrangements 13 of two neighboring air cleaner assemblies 10 can be joined to one another by a connector 143 or by a connector 144, both of which are discussed in detail below.

Figure 12:
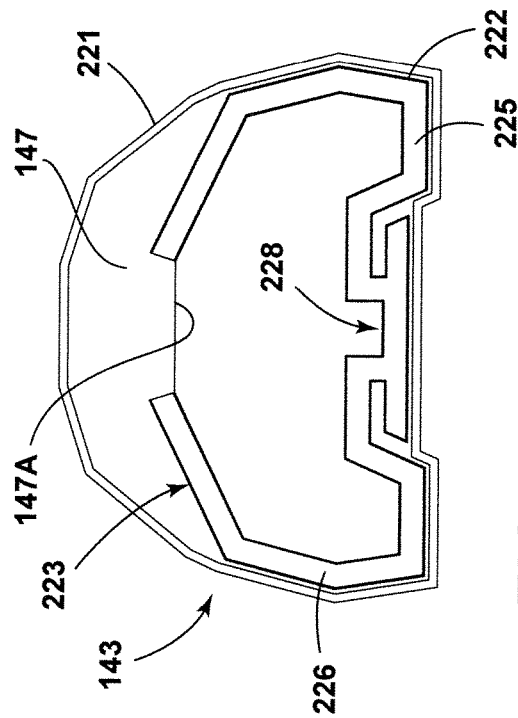
FIG. 12 is an enlarged view of one side of the connector of FIG. 11, the opposite side of the connector being identical to the side illustrated in FIG. 12.
Figure 13:
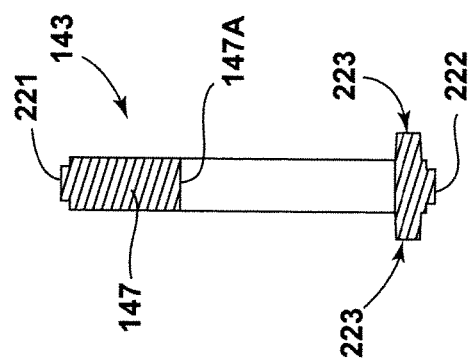
FIG. 13 is an enlarged cross-sectional view of the connector, as seen generally along line 13-13 in FIG. 11.
Figure 11:
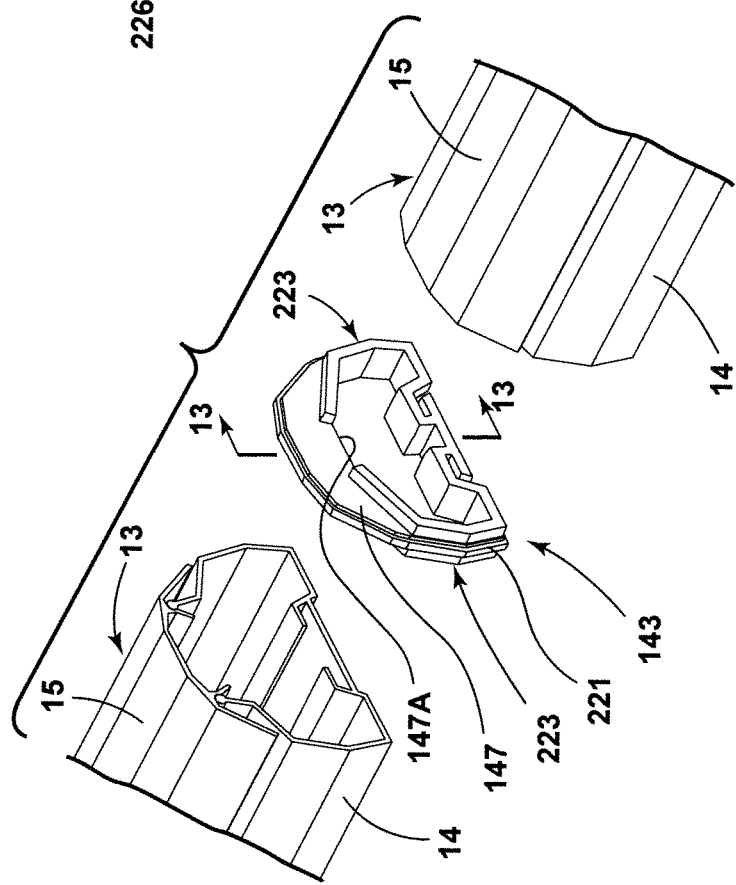
FIG. 11 is an enlarged, exploded and fragmentary view of a connector utilized to join two air cleaner assemblies in a co-linear arrangement, which connector allows air flow between the two air cleaner assemblies.

The connector 143 is shown in FIGS. 11-13, and this connector 143 is utilized to join two housing arrangements 13 of two air cleaner assemblies 10 to one another in co-linear relation, and which connector 143 is configured to permit airflow between the air ducts 16 of the adjacent air cleaner assemblies 10. The connector 143 is generally similar in shape and construction to the end cap 20 described above. In this regard, structures and/or features of the connector 143 which are similar or identical to structures and/or features of the end cap 20 are provided with the same reference numbers, plus 100, and will accordingly not be discussed further here. The connector 143 includes an end wall 147 with an outer peripheral edge 221 shaped so as to substantially correspond to the outer peripheral shape of the assembled housing arrangement 13. The connector 143 differs from the end cap 20 described previously in that same includes connector flanges 223 on both of its sides which face away from one another. These connector flanges 223, as is the case with the connector flange 123 of the end cap 20, allow the connector 143 to be inserted sidewardly into the open ends of the base member housings 14 of two air cleaner assemblies 10 to be arranged co-linearly. A further difference between the end cap 20 and the connector 143 is that the end wall 147 of the connector 143 is not solid along the entire length and width of the connector 143, and instead terminates a distance upwardly from the lowermost part of the outer peripheral edge 221 thereof. More specifically, the end wall 147 defines an opening 147A which extends through the entire thickness of the end wall 147 so as to permit communication between the air ducts 16 of the adjacent air cleaning assemblies 10.

The connector 144 is shown in FIGS. 14 and 15, and is also utilized to join two housing arrangements 13 of two air cleaner assemblies 10 to one another in co-linear relation. The connector 144 is identical to the connector 143, except that same is configured to prevent airflow between the air ducts 16 of the adjacent air cleaner assemblies 10, and thus includes an end wall 150 which is solid along its entire length and width. Structures and/or features of the connector 143 which are similar or identical to structures and/or features of the end cap 20 are provided with the same reference numbers, plus 200, and will not be discussed further here.

Figure 16:
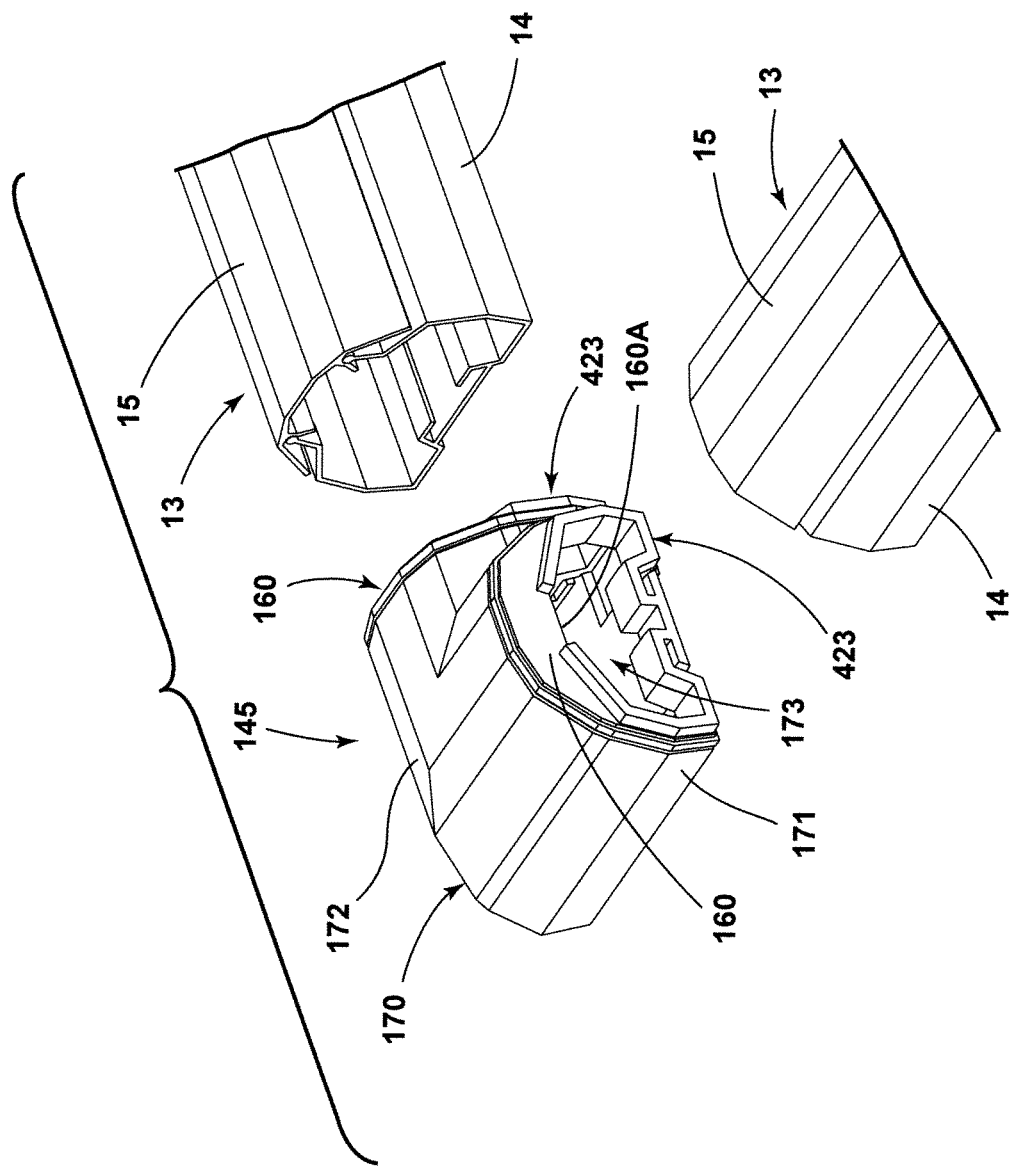
FIG. 16 is an enlarged, exploded and fragmentary view of a 90 degree connector utilized to join two air cleaner assemblies in a right-angled arrangement.

A further connector 145 is illustrated in FIG. 16, which connector is utilized to join two air cleaner assemblies 10 in a right-angled orientation with one another. The connector 145 includes a housing 170, which has two housing parts 171 and 172 oriented in perpendicular relation with one another. The housing 170 is generally hollow and defines an interior 173 which opens sidewardly outwardly through open ends of the respective housing parts 171 and 172. These open ends are identical to one another in configuration and only one of which will accordingly be described here. Further, the structures and/or features of the connector 145 which are similar or identical to structures and/or features of the end cap 20 will be provided with the same reference numbers, plus 300. Each open end of the connector 145 includes an end wall 160, which end wall 160, similar to the end wall 147 of the connector 143 described above, is not solid but instead defines an opening 160A which extends through the entire thickness of the end wall 160 to permit communication between the air ducts 16 of the two air cleaner assemblies 10 to be joined to one another in a 90 degree orientation.

Figure 17:
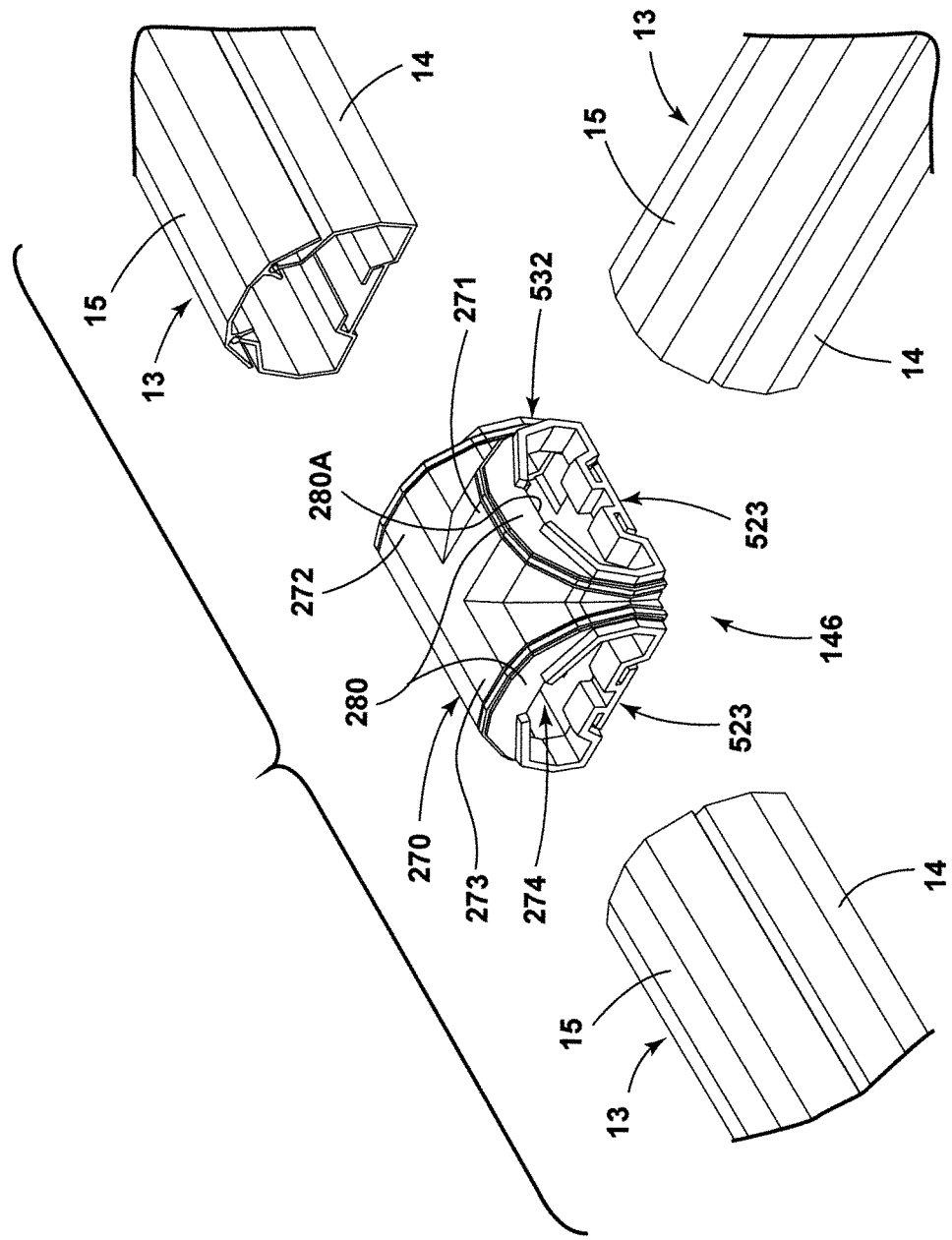
FIG. 17 is an enlarged, exploded and fragmentary view of a T-shaped connector utilized to join three air cleaner assemblies in a T-shaped arrangement.

FIG. 17 illustrates a further T-shaped connector 146 which is utilized to join three air cleaner assemblies 10 in a T-shaped orientation with one another. The structures and/or features of the connector 146 which are similar or identical to structures and/or features of the end cap 20 are provided with the same reference numbers, plus 400. The connector 146 includes a housing 270, which has three housing parts 271, 272 and 273 oriented in a T-shaped configuration. The housing 270 is generally hollow and defines an interior 274 which opens sidewardly outwardly through open ends of each of the respective housing parts 271, 272 and 273. These open ends are identical to one another, and each includes an end wall 280 which defines an opening 280A which extends through the entire thickness of the end wall 280 to permit communication between the air ducts 16 of the three air cleaner assemblies 10 to be joined in a T-configuration.

Figure 18:
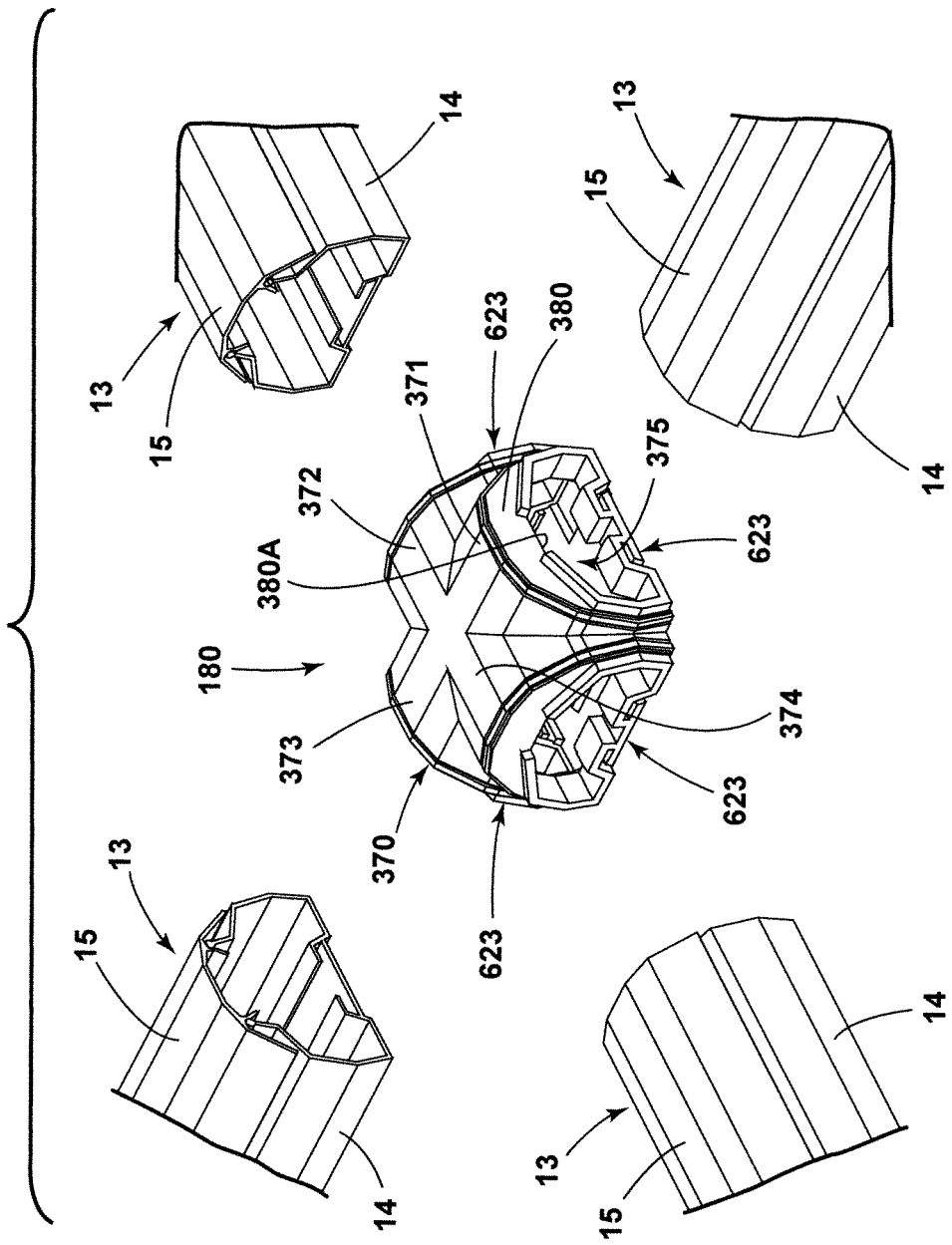
FIG. 18 is an enlarged, exploded and fragmentary view of a four-way connector utilized to join four air cleaner assemblies in a cross arrangement.

A further four-way connector 180 is shown in FIG. 18, and is utilized to join four air cleaner assemblies 10 in a cross-type configuration. The structures and/or features of the connector 180 which are similar or identical to structures and/or features of the end cap 20 are provided with the same reference numbers, plus 500. The connector 180 includes a housing 370 having four housing parts 371, 372, 373 and 374 oriented in a cross configuration. The housing 370 is generally hollow and defines an interior 375 which opens sidewardly outwardly through open ends of each of the respective housing parts 371, 372, 373 and 374. These open ends of the housing parts are identical to one another, and each includes an end wall 380 which defines an opening 380A extending completely through the entire thickness of the end wall 380 to permit communication between the air ducts 16 of the four air cleaner assemblies 10 to be joined in a cross configuration.

Referring back to FIG. 10, the appropriate connector 143 or 144 (co-linear connection), 145 (right-angle connection), 146 (T-shaped connection) or 180 (cross connection) is utilized in order to arrange the air cleaning assemblies 10 in the desired orientation. It will be appreciated that while the connectors 145, 146 and 180 are depicted as "open" connectors which allow air flow through adjacent air cleaning assemblies 10, such connectors may alternatively be configured as "closed" connectors so as to prevent air flow through adjacent air cleaner assemblies 10 when desirable or necessary.

While the air cleaner assembly 10 according to the invention is disclosed herein as a modular and portable arrangement usable on a variety of support surfaces, the invention may instead be incorporated into building structures which form parts of enclosed areas, such as in crown-molding which extends along ceiling-wall junctures of rooms which serve as offices or even residential spaces.

Figure 19:
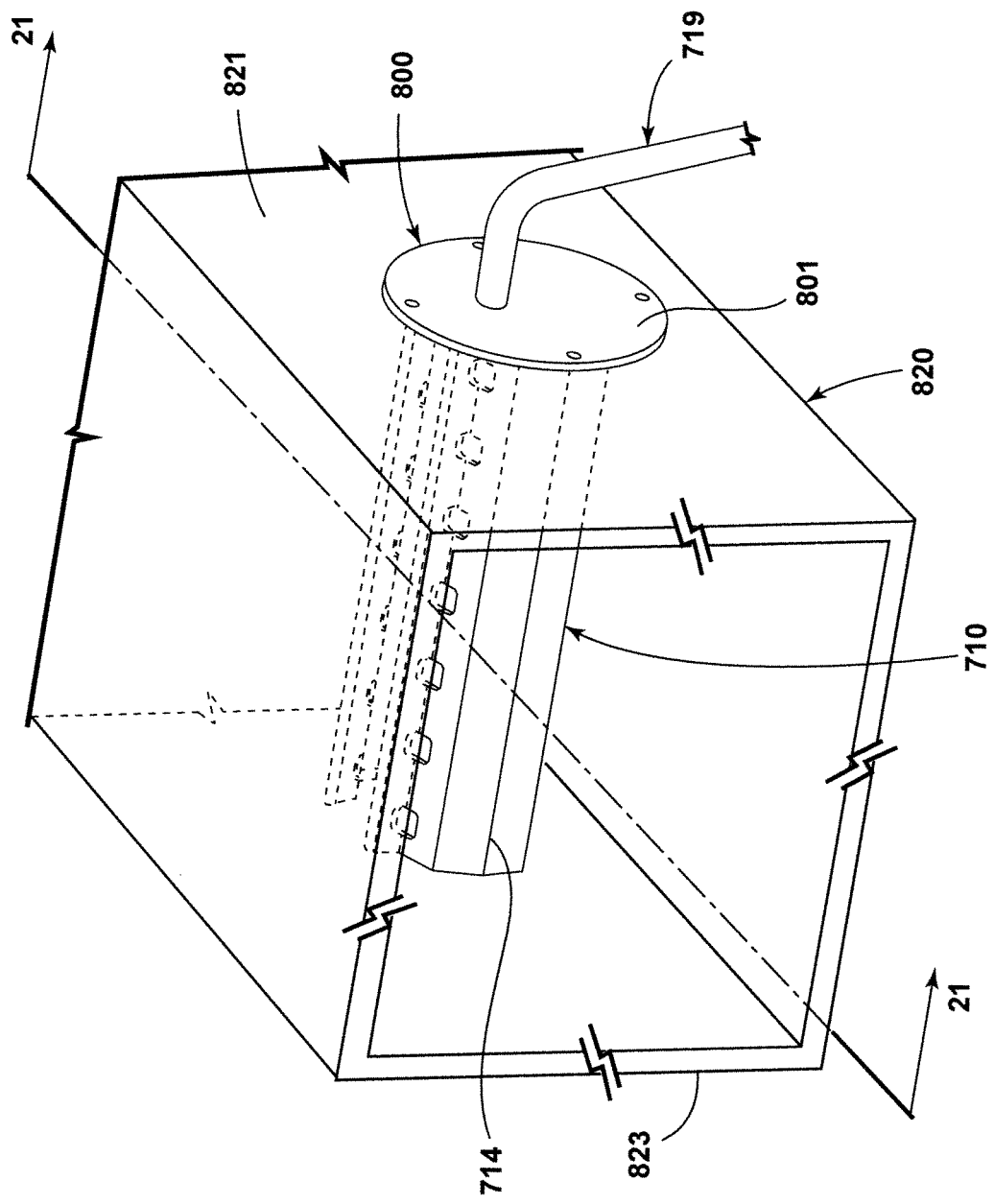
FIG. 19 is an enlarged and fragmentary view of a further embodiment of the air cleaner assembly installed within a duct of an air handling system.
Figure 20:
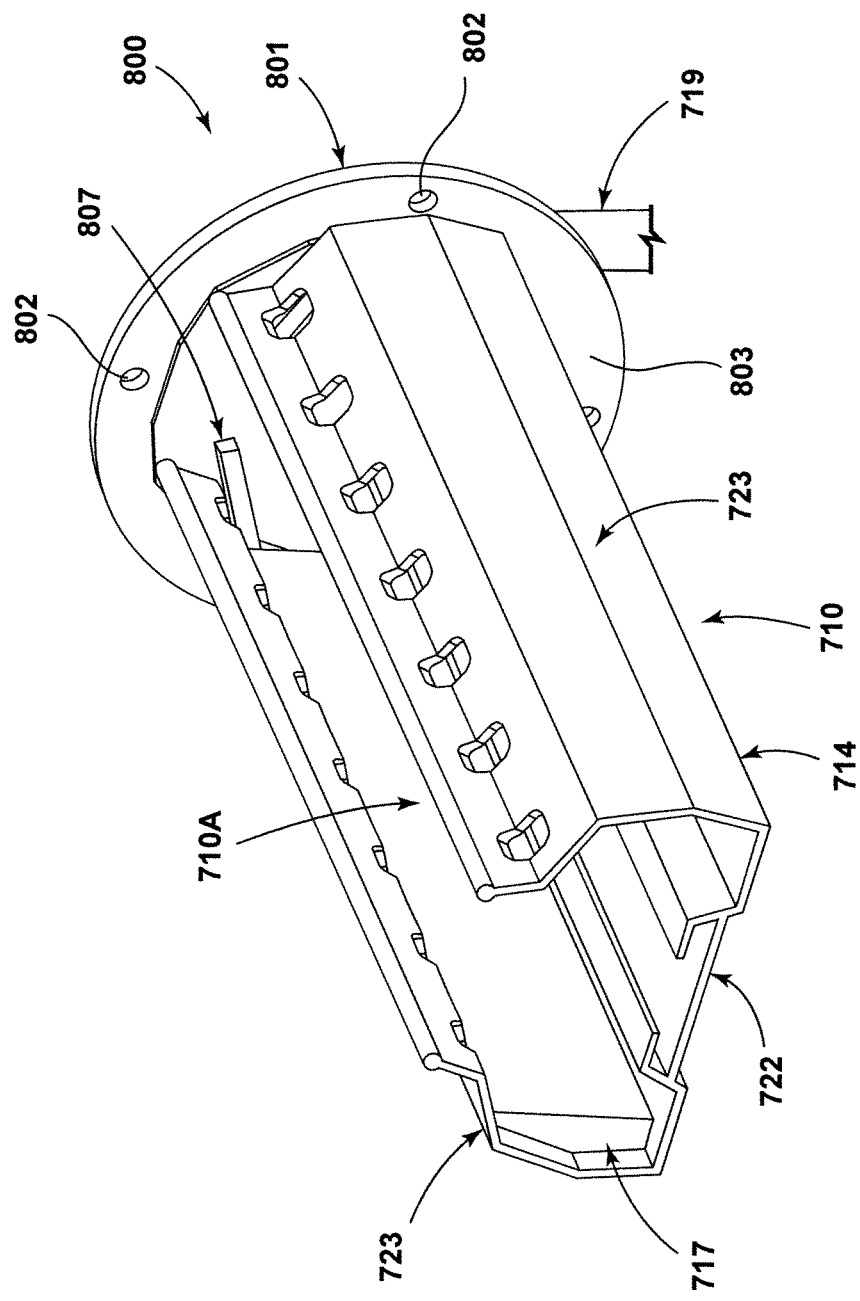
FIG. 20 is an enlarged perspective and fragmentary view of the air cleaner assembly of FIG. 19.
Figure 21:
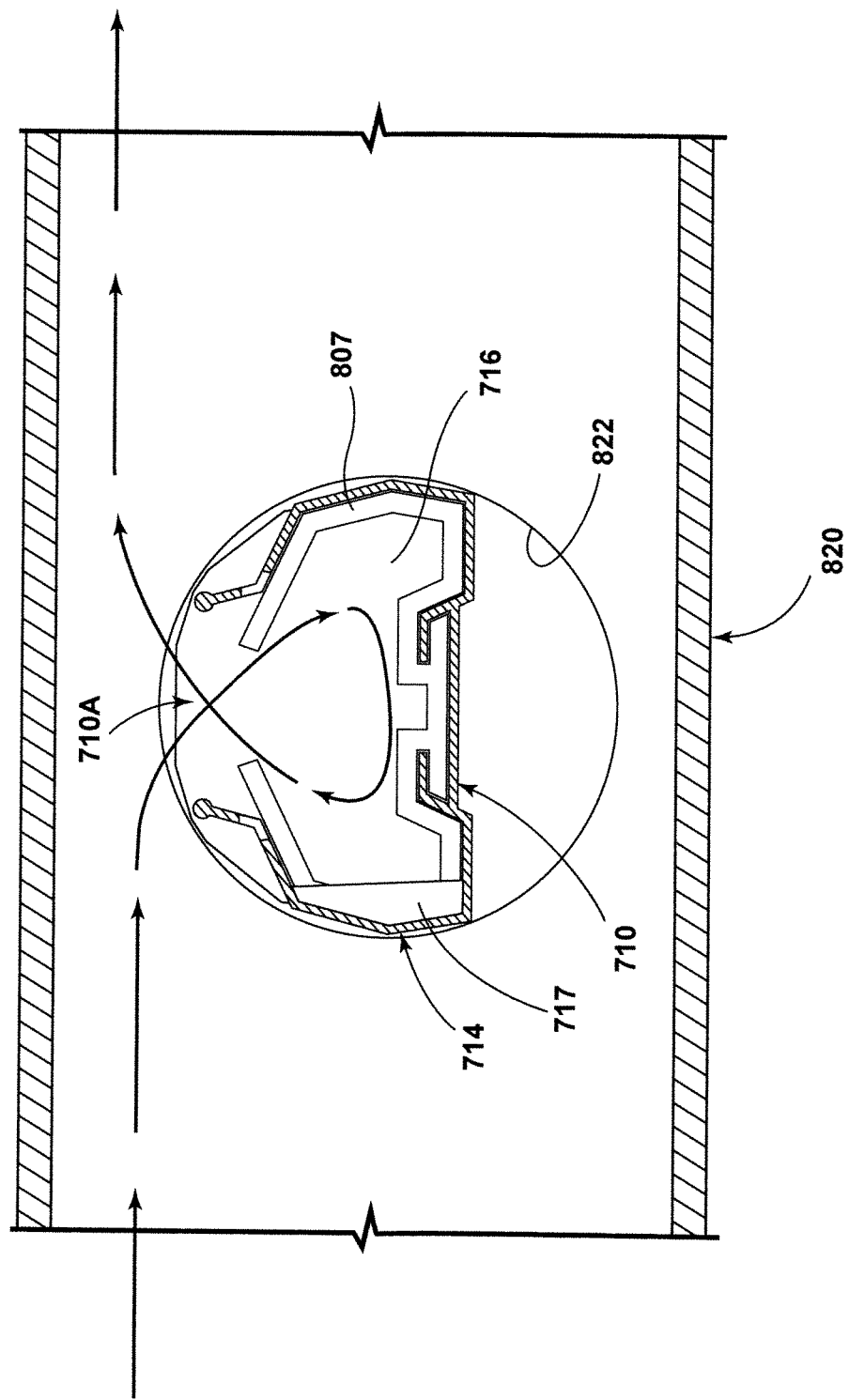
FIG. 21 is an enlarged cross-sectional view of the air cleaner assembly and duct as seen generally along line 21-21 in FIG. 19.

FIGS. 19-21 depict a further embodiment of an air cleaner assembly 710. In this embodiment, the air cleaner assembly 710 is utilized in conjunction with an existing air handling system, for example an air handling system structurally integrated into an aircraft, cruise ship, subway, train or other transport vehicle. In this regard, the air cleaner assembly 710 is retrofitted into an existing duct 820 of the air handling system such that air flow within the duct 820 flows through the air cleaner assembly 710 where same is treated. The air cleaner assembly 710 according to this embodiment does not include the cover housing member 15 or the air circulating assembly 18 as with the prior embodiment. Further, the air cleaner assembly 710 is of a shorter length as compared to the prior embodiment, which length is substantially equal or similar to a transverse width of the duct 820. Other components and/or features of the air cleaner assembly 710 which are generally similar to components and/or features of the air cleaner assembly 10 are provided with the same reference number, plus 700, and will not be described in detail.

In this embodiment, the lighting arrangement 717 is mounted adjacent the interior of one of the sidewalls 723 of the base housing member 714, as shown in FIGS. 20 and 21. Further, the air cleaner assembly 710 includes an end cap 800 having a plate-shaped end wall 801, which in the illustrated embodiment is circular in shape along its periphery. The end wall 801 has a plurality of fastening holes 802 defined therein which are distributed in spaced relation with one another along the periphery of the end cap 800. Additionally, the end wall 801 has an inner surface 803 from which a mounting flange 807 projects sidewardly. This mounting flange 807 is substantially identical in shape to the flange 123 of the end wall 20 of the first embodiment of the air cleaner assembly 10, so as to permit insertion of the mounting flange 807 into the open end of the base housing member 714.

In order to install the air cleaner assembly 710 to the duct 820, first an opening 822 is formed in an upright wall 821 of the duct 820, for example by using a hole saw. With the end wall 801 of the air cleaner assembly 710 disposed outermost relative to the duct wall 821, the opposite end of the base housing member 714 is inserted into and through the opening 822 of the duct wall 821 until this end abuts the opposite upright wall 823 of the duct 820. The air flow to the duct 820 is then turned on, and the air cleaner assembly 710 is rotated about the central axis of the opening 822 in order to place the air cleaner assembly 710 in a position within the duct 820 which eliminates or at least minimizes whistling and/or other harmonics. The air cleaner assembly 710 is then fixed to the duct wall 821 with fasteners which are inserted into the openings 802 of the end wall 801 to securely fix the air cleaner assembly 710 to the duct 820. A gasket (not shown) is provided between the inner surface 803 of the end wall 801 and the outer surface of the duct wall 821 for sealing purposes. Further, the end of the base housing member 714 which abuts the end wall 823 of the duct 820 may be secured to the end wall 823 with appropriate fasteners, if desirable or necessary, and/or may include a damping element or elements to prevent rattling and/or excessive movement between the two components. The air cleaner assembly 710 includes a power supply 719 which may include appropriate wiring for connection to the electrical system of the transport vehicle for the purpose of powering the assembly 710. Alternatively, the power supply may be a power cord housed within a suitable conduit or may be a battery or batteries.

With the air cleaner assembly 710 fixed within the duct 820 as discussed above, air flow moving within the duct 820 enters the base housing member 714 through the longitudinally extending open end 710A thereof, the air is treated by the lighting arrangement 717, and the cleaned air then exits the base housing member 714 through the end 710A, as depicted by the arrows in FIG. 21.

A further embodiment of an air cleaner assembly 1010 is illustrated in FIGS. 22-45. The air cleaner assembly 1010 has some similar or identical components as the air cleaner assembly 10 depicted in FIGS. 1-18, and such similar or identical components are provided with the same reference number, plus 1000. The air cleaner assembly 1010, similar to the air cleaner assembly 10, may be mounted on any generally flat and sufficiently rigid support surface. In the configuration shown in FIG. 22, the air cleaner assembly 1010 is installed along upper frame members 1011 of respective wall panels 1012. The wall panels 1012 form part of an upright wall panel system 1140 which divides an larger open area into smaller areas for use in offices and the like.

The air cleaner assembly 1010 generally includes an elongate housing arrangement 1013, similar to the housing arrangement 13, which defines therein an elongate interior air duct or chamber 1016 (see FIG. 23), and an air circulating and decontamination module or assembly 1018. In this embodiment, the air circulation and decontamination module 1018 defines therein an elongate interior air duct or air treatment chamber 2000 (see FIGS. 31 and 32) in which an ultra-violet, air-disinfecting lighting arrangement 1017 is mounted. The air cleaner assembly 1010 additionally includes a power supply 1019, which may be a power cord which cooperates with an electrical receptacle located within the indoor space to be treated. Alternatively, the power supply 1019 may be a rechargeable battery or batteries. In the arrangement shown in FIG. 22, the housing arrangement 1013 which is located at the remote or distal end of the air cleaner assembly 1010 terminates at an end cap 1020, which end cap 1020 is also shown in FIG. 41. The configuration of the air cleaner assembly 1010 shown in FIG. 22 includes a plurality of housing arrangements 1013 connected to one another and arranged in a co-linear fashion, with the respective interior air ducts 1016 thereof in communication with one another and with the proximal housing arrangement 1013 connected to the air circulation and decontamination module 1018. In this embodiment, the air ducts 1016 of the housing arrangements 1013 communicate with the air duct or treatment chamber 2000 of the air circulation and decontamination module 1018. Contaminated air is drawn into the air ducts 1016 from the exterior environment by the module 1018 and is directed into the air duct 2000 thereof for treatment. After treatment within the air duct 2000, cleaned air is thereafter discharged from the module 1018 as discussed further below.

Figure 22:
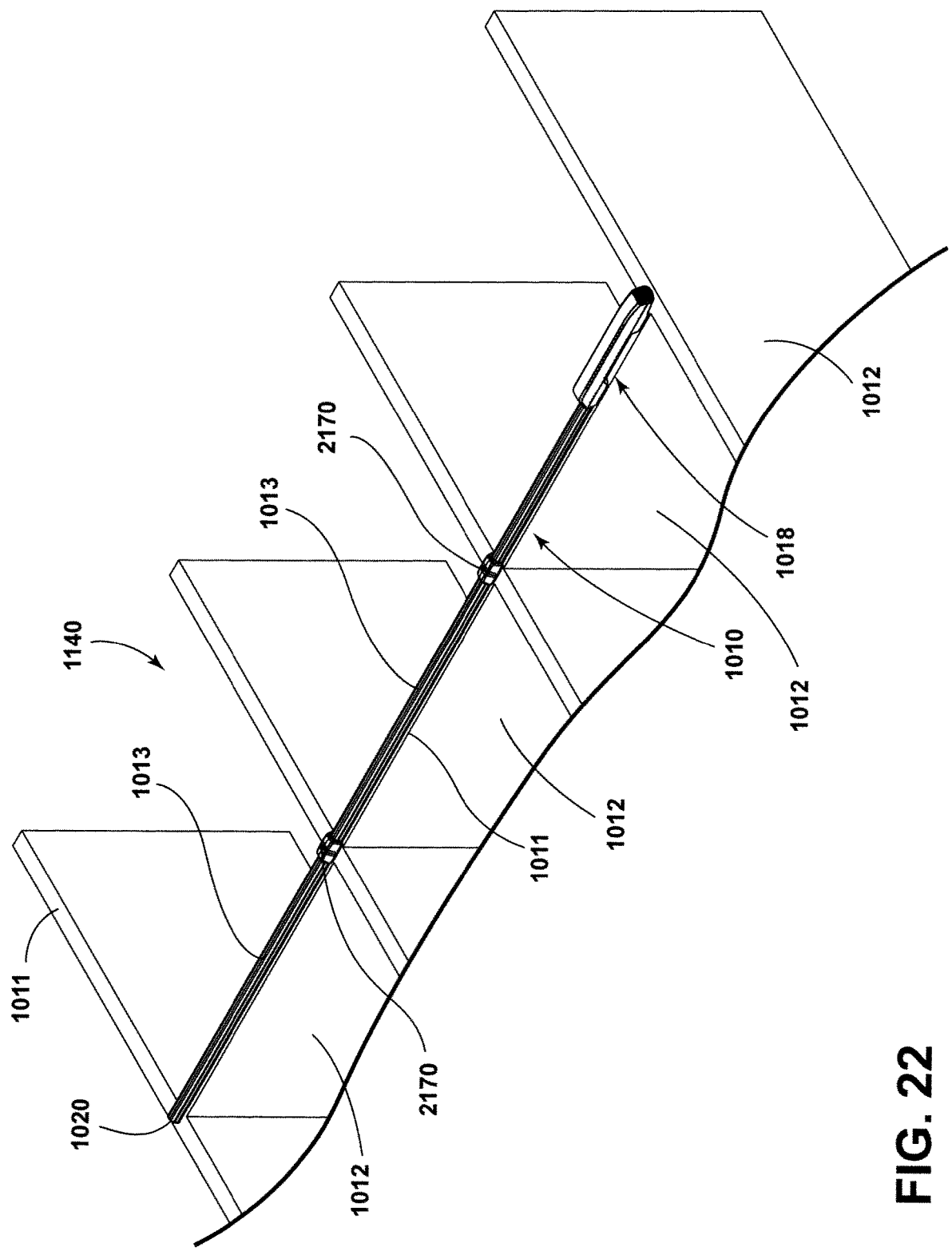
FIG. 22 is an overhead perspective and fragmentary view of a further embodiment of the air cleaner assembly installed on a conventional upright space-dividing wall panel system.
Figure 23:
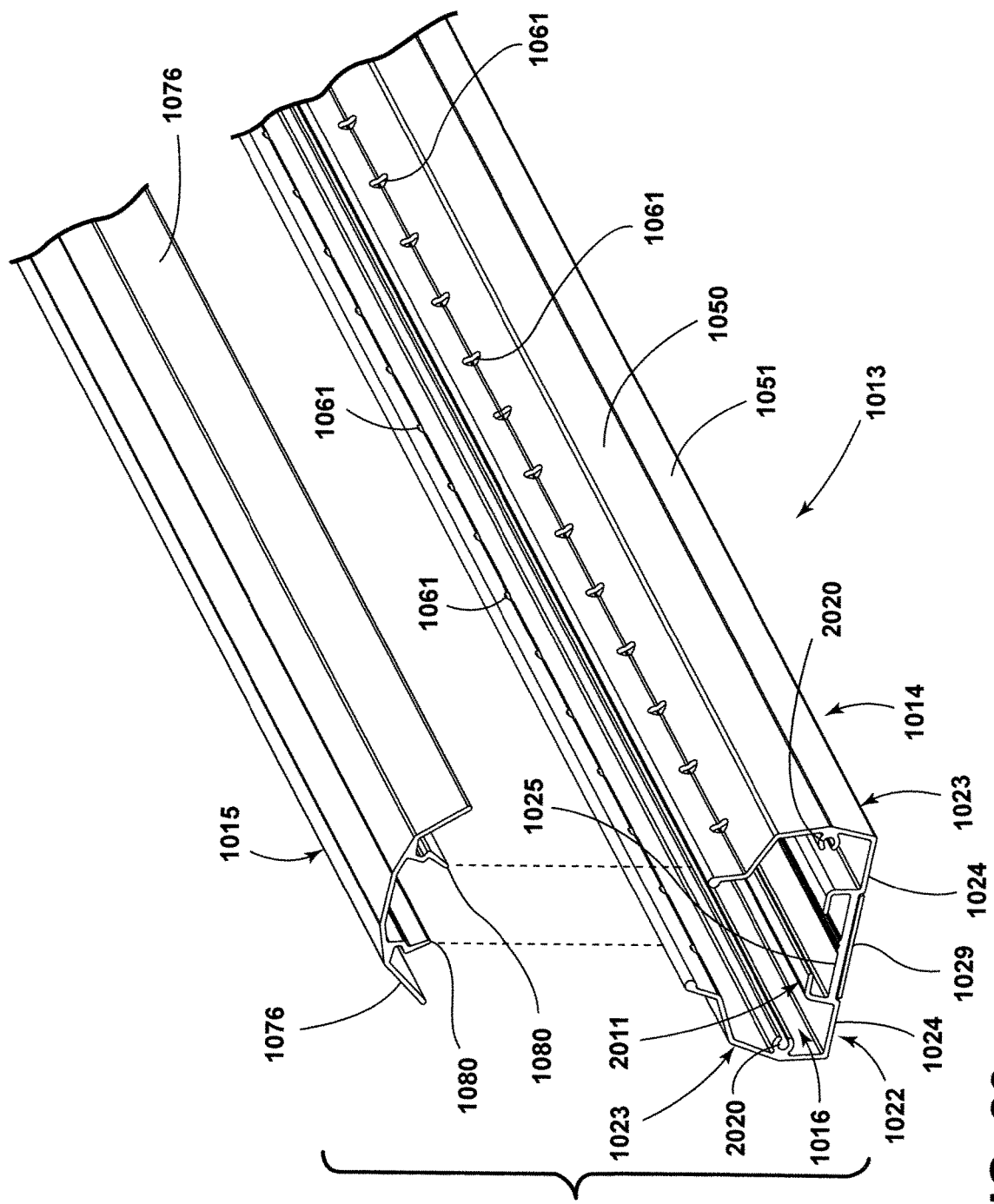
FIG. 23 is an enlarged, exploded and fragmentary view of a housing arrangement of the air cleaner assembly of FIG. 22.

With reference to FIG. 23, the housing arrangement 1013 is a two-piece component composed of base and cover housing members 1014 and 1015, which when assembled together define the air duct 1016. The base housing member 1014 is generally U-shaped, and includes a bottom or base wall 1022 and a pair of sidewalls 1023 joined to the base wall 1022 along opposite longitudinal edges thereof. The base wall 1022 has a pair of feet 1024 which are substantially planar and form supports for the housing arrangement 1013 when same is installed on a support surface, such as the upper frame member 1011 of the wall panel 1012 as shown in FIG. 22. The feet 1024 are laterally spaced from one another by an intermediate section 1025 of the base wall 1022. A lower surface of the intermediate section 1025 defines therein an elongate recess which extends longitudinally along the base wall 1022 and opens downwardly toward the support surface on which the housing arrangement 1013 is mounted. A mounting arrangement 1029, such as adhesive or other suitable fastening arrangement such as a hook and loop-type fastener, is located within the recess for the purpose of securing the housing arrangement 1013 on the support surface. The intermediate section 1025 of the base wall 1022, opposite the recess, includes a connecting structure 2011 which opens endwise of the housing arrangement 1013 at opposite ends thereof. Further, a pair of receiving channels 2020 are provided interiorly on the respective sidewalls 1023 which also open endwise of the housing arrangement 1013 at opposite ends thereof. The connecting structure 2011 is configured to cooperatively engage with an interior surface of the end cap 1020 (shown in detail in FIG. 41), and fasteners may be inserted through the end cap 1020 and into the respective receiving channels 2020 of the housing arrangement 1013 in order to secure the end cap 1020 thereto. In this regard, the fasteners may frictionally engage with the channels 2020 via a press-fit or interference-type fit. The base and cover housing members 1014 and 1015 are joined to one another in a manner similar to the prior embodiment of FIGS. 1-18. The remainder of the housing arrangement 1013 is similar to the housing arrangement 13 and will not be described further here.

Figure 24:
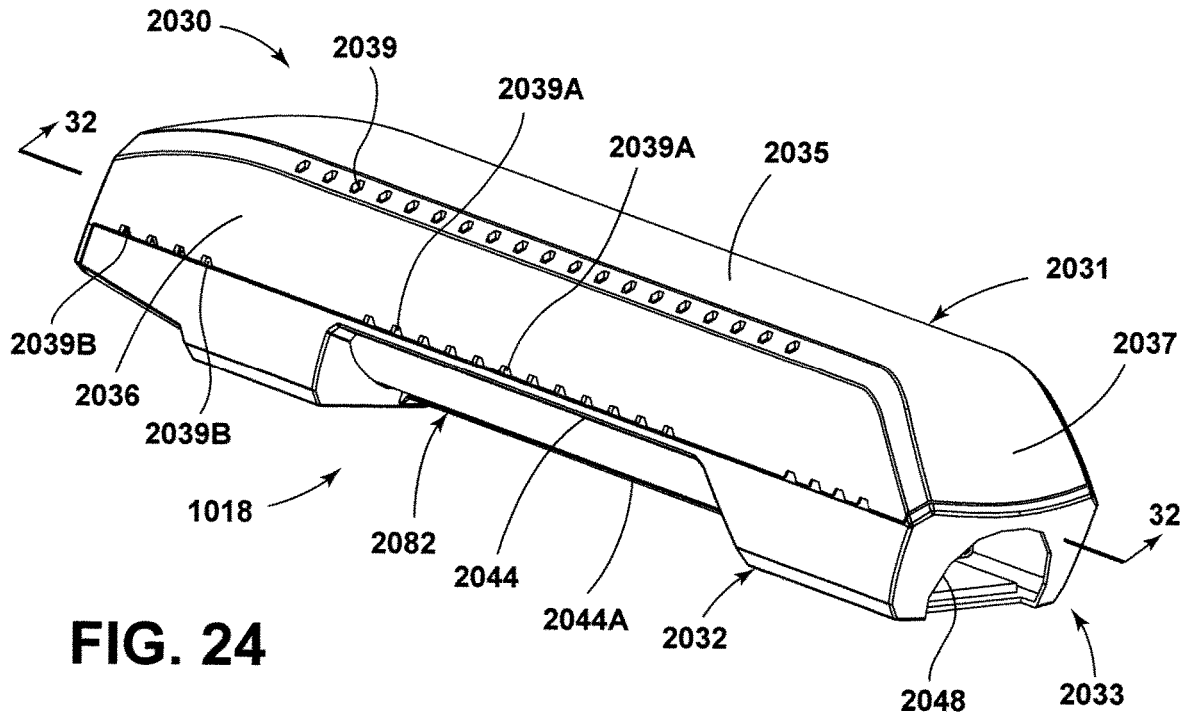
FIG. 24 is an enlarged perspective view of an air circulation and decontamination module of the air cleaner assembly of FIG. 22.
Figure 25:
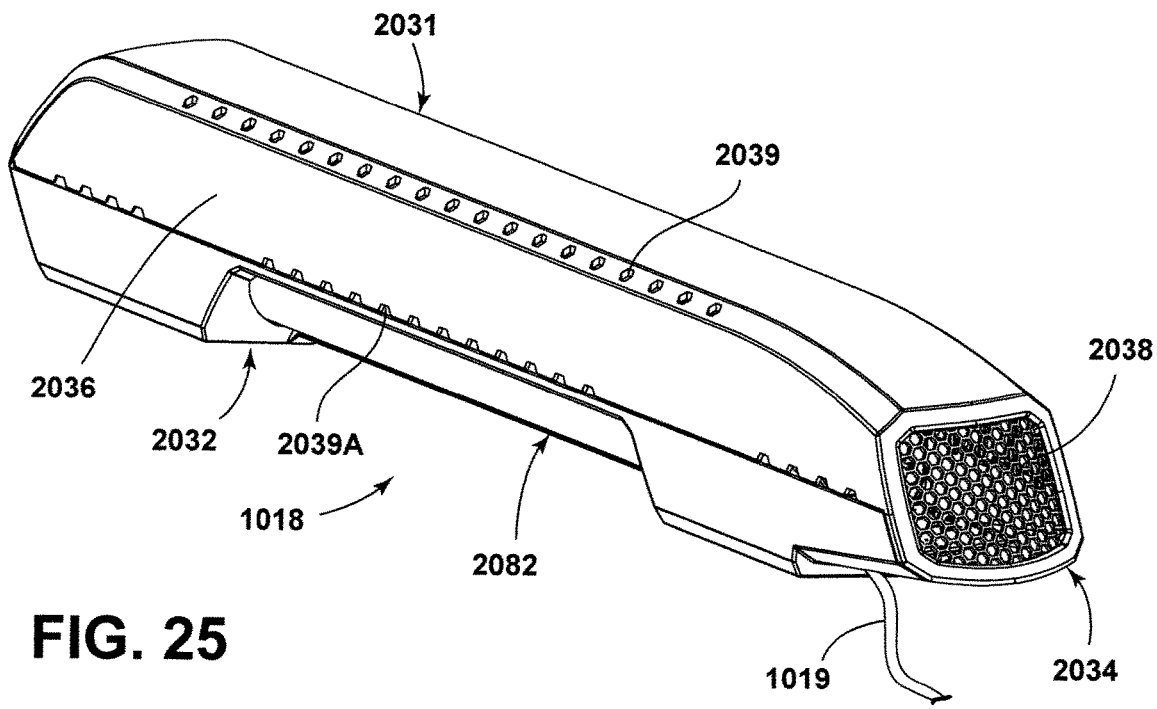
FIG. 25 is an enlarged perspective view of the air circulation and decontamination module which is rotated approximately 180 degrees from the view shown in FIG. 24.
Figure 26:
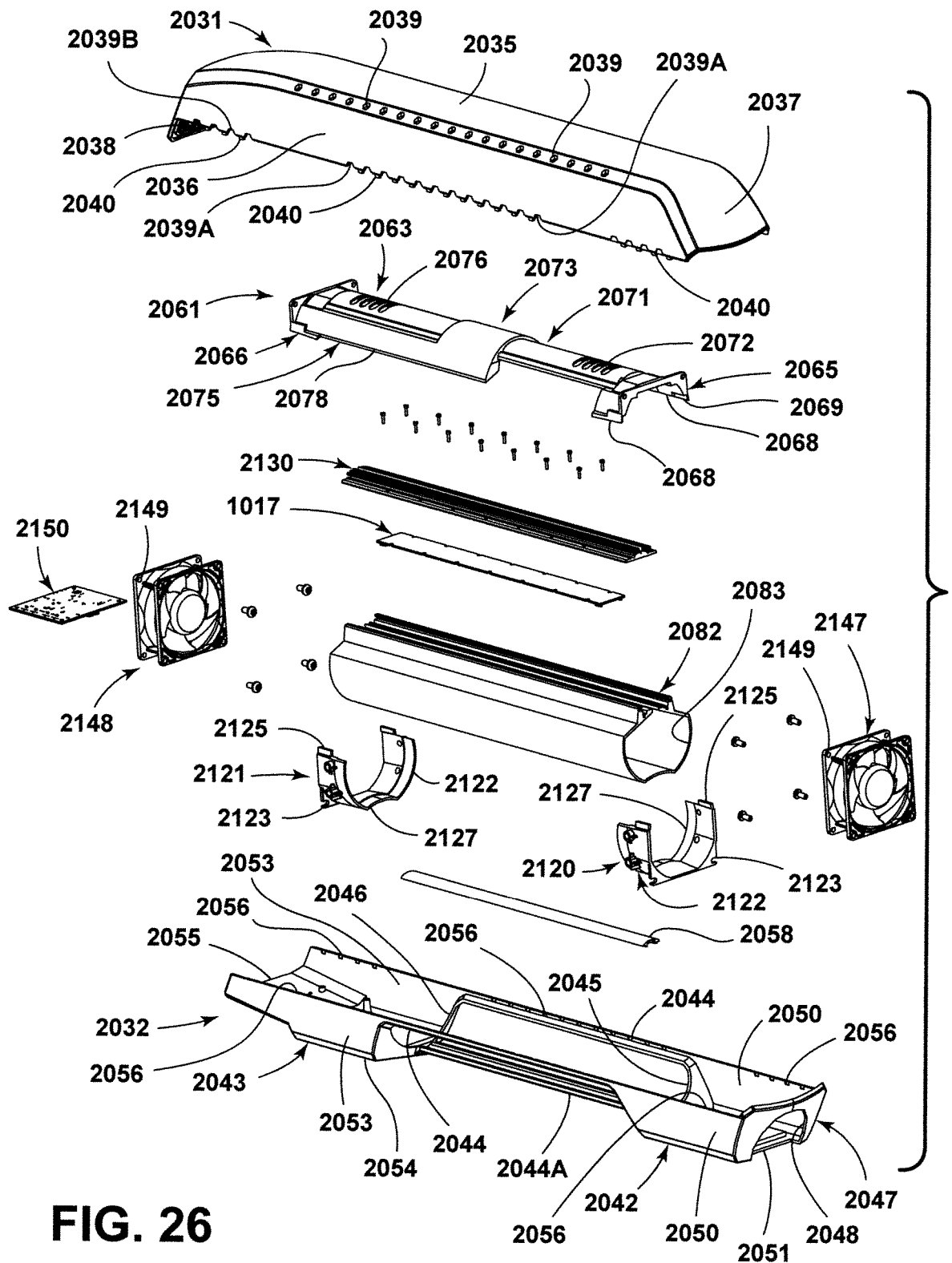
FIG. 26 is an enlarged exploded view of the air circulation and decontamination module of the air cleaner assembly of FIG. 22.

With reference to FIGS. 24-26, the air circulation and decontamination module 1018 will now be described. The air circulation and decontamination module 1018 includes an outer housing or casing 2030 which is generally hollow. In the illustrated embodiment, the outer housing 2030 includes an upper housing member 2031 and a base housing member 2032 which when assembled together define an upstream end 2033 and a downstream end 2034 of the outer housing 2030 which are spaced from one another in a longitudinal direction thereof. The upper housing member 2031 has a generally planar top wall 2035, a pair of laterally-spaced sidewalls 2036 which depend downwardly from respective opposite longitudinal edges of the top wall 2035, an upstream end wall 2037 which angles downwardly as same projects away from the top wall 2035 and a downstream end wall 2038 spaced longitudinally from the upstream end wall 2037. The downstream end wall 2038 is configured as a screen, which screen has a plurality of openings which extend therethrough. Further, the upper housing member 2031 defines therein a plurality of cooling air openings 2039. The cooling air openings 2039 are formed as discrete openings which are spaced from one another in a row-like manner longitudinally along opposite sides of the upper housing member 2031, with each row being disposed adjacent a junction between each sidewall 2036 and the top wall 2035. Additional cooling air openings 2039A are provided on the outer housing 2030 along central parts of lower terminal edges of each of the sidewalls 2036. Further, a plurality of exhaust openings 2039B are provided along downstream parts of the lower terminal edges of each of the sidewalls 2036 adjacent the downstream end 2034 of the outer housing 2030. The cooling air openings 2039 and 2039A communicate with the interior of the outer housing 2030 and allow entry of air from the exterior environment into the outer housing 2030 for the purpose of cooling the lighting arrangement 1017. The exhaust openings 2039B communicate with the interior of the outer housing 2030 and allow the exit of heated air therefrom. The openings 2039, 2039A and 2039B of the outer housing 2030 all form part of a heat dissipating arrangement associated with the lighting arrangement 1017 as is discussed further below. The upper housing member 2031 additionally includes a plurality of locking tabs 2040 along the lower terminal edges of each of the sidewalls 2036.

Figure 32:
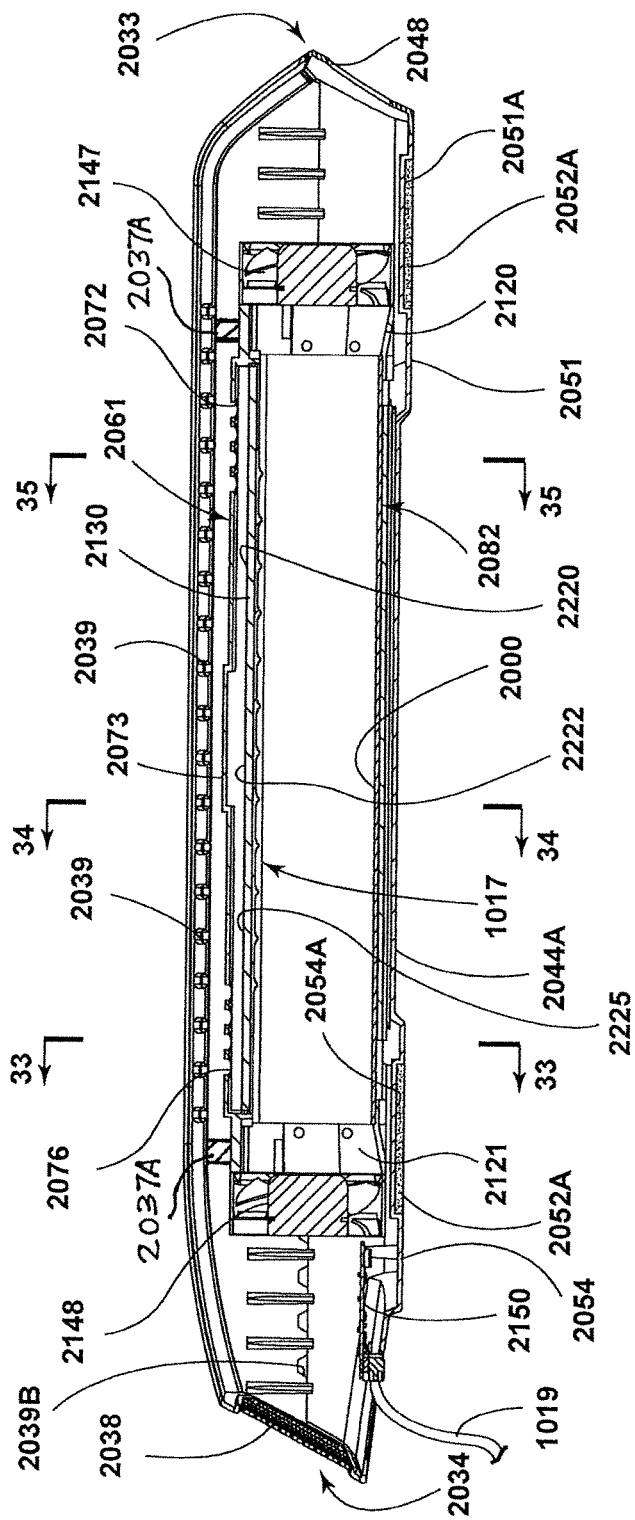
FIG. 32 is an enlarged and longitudinal cross-sectional view of the air circulation and decontamination module taken generally along line 32-32 in FIG. 24.

Turning now to the base housing member 2032, same is of an upwardly-opening cradle-like configuration. More specifically, the base housing member 2032 includes an upstream support 2042 and a downstream support 2043 which are joined to one another by a plurality of elongated and strip-shaped base housing elements 2044 and 2044A. One of the housing elements 2044A is located centrally between the housing elements 2044, and serves as a bottom support for further components of the air circulation and decontamination module 1018. The housing elements 2044 and 2044A are laterally spaced from and parallel to one another such that the base housing member 2032 is substantially open along a central lower portion thereof, except for in the areas of the housing elements 2044 and 2044A. The housing elements 2044 and 2044A are joined at their respective upstream ends to a U-shaped end wall 2045 of the upstream support 2042, and at their respective downstream ends to a U-shaped end wall 2046 of the downstream support 2043. The upstream support 2042 has a further end wall 2047 spaced longitudinally from the end wall 2045 and defines an opening 2048 therein which is shaped so as to correspond with an outer contour of the housing arrangement 1013 to permit insertion of a terminal end thereof into the opening 2048, as best shown in FIG. 27. The upstream support 2042 additionally includes a pair of laterally-spaced sidewalls 2050 joined to an extending away from respective opposite sides of the end wall 2047, and a bottom wall 2051 connected to and extending between lower edges of the sidewalls 2050 and the end wall 2047. The bottom wall 2051 is generally flat and defines therein a downwardly opening recess 2051A, as shown in FIG. 32, in which recess 2051A a mounting arrangement 2052A is located. The downstream support 2043 has a pair of laterally-spaced sidewalls 2053 joined to and extending away from respective opposite sides of the end wall 2046, and a bottom wall member including an upstream generally flat bottom wall part 2054 and a downstream bottom wall part 2055 connected thereto, which downstream bottom wall part 2055 angles upwardly as same projects away from the upstream bottom wall part 2054. The upstream bottom wall part 2054, as shown in FIG. 32, defines therein a downwardly opening recess 2054A in which a further mounting arrangement 2052A is located.

The mounting arrangements 2052A are utilized to secure the air circulation and decontamination module 1018 to a support surface such as the upper frame member 1011 of the wall panel 1012. The mounting arrangements 2052A may include adhesive, hook and loop fasteners or other suitable fastening arrangements. Further, locking detents or recesses 2056 are disposed along uppermost edges of the sidewalls 2050 of the upstream support 2042, along the housing elements 2044 and along the uppermost edges of the sidewalls 2053 of the downstream support 2043, which locking detents 2056 cooperate with the locking tabs 2040 of the upper housing member 2031 to secure the upper and base housing members 2031 and 2032 to one another.

Figure 34:
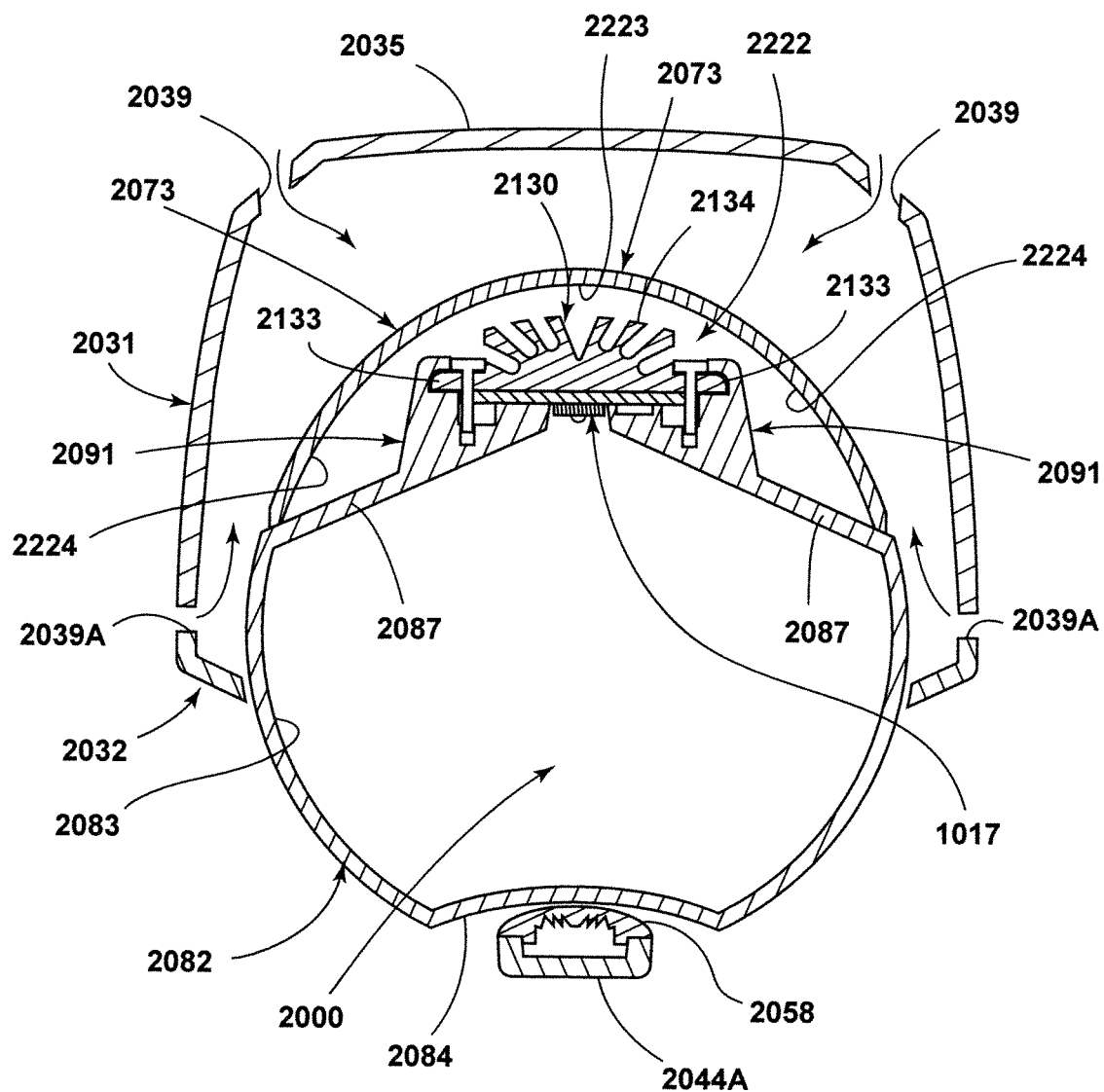
FIG. 34 is an enlarged cross-sectional view of the air circulation and decontamination module taken generally along line 34-34 in FIG. 32.
Figure 35:
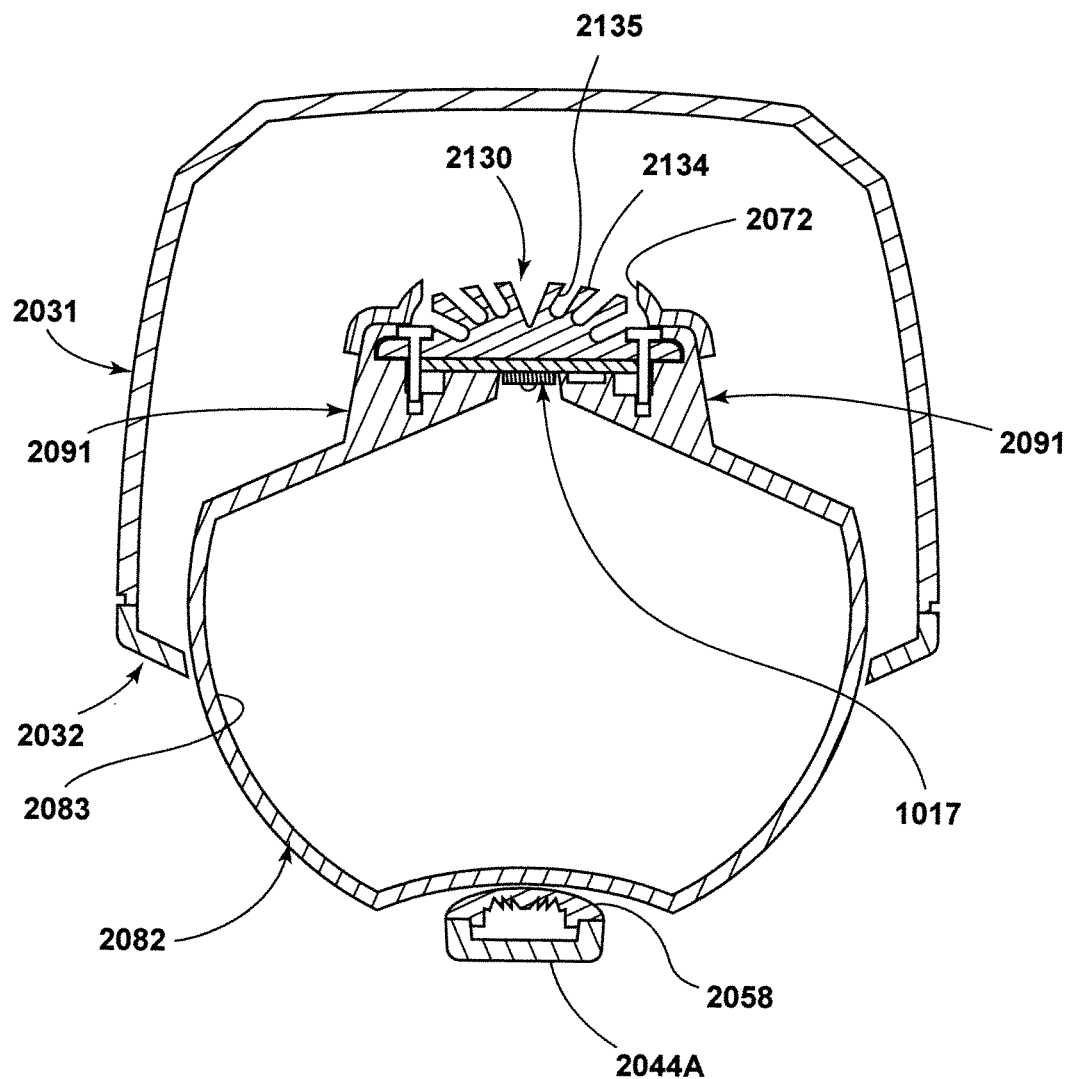
FIG. 35 is an enlarged cross-sectional view of the air circulation and decontamination module taken generally along line 35-35 in FIG. 32.
Figure 36:
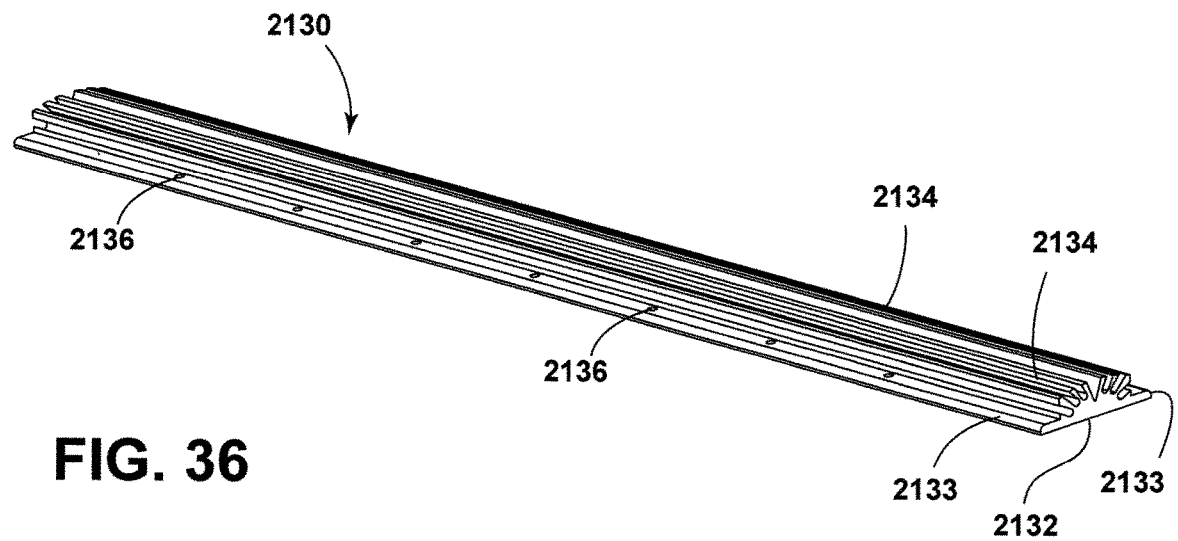
FIG. 36 is an enlarged perspective view of a heat dissipating element of the air circulation and decontamination module of the air cleaner assembly of FIG. 22.
Figure 37:
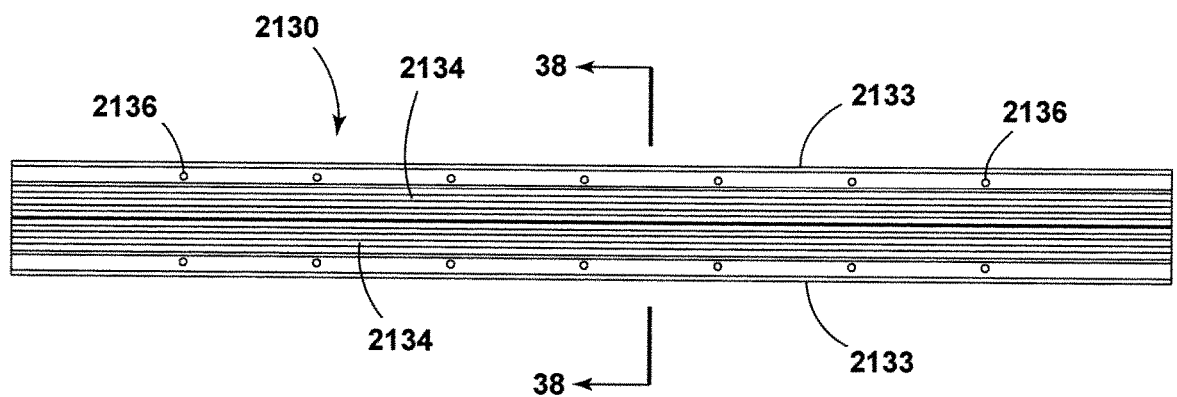
FIG. 37 is an enlarged overhead view of the heat dissipating element of the air circulation and decontamination module of the air cleaner assembly of FIG. 22.
Figure 38:
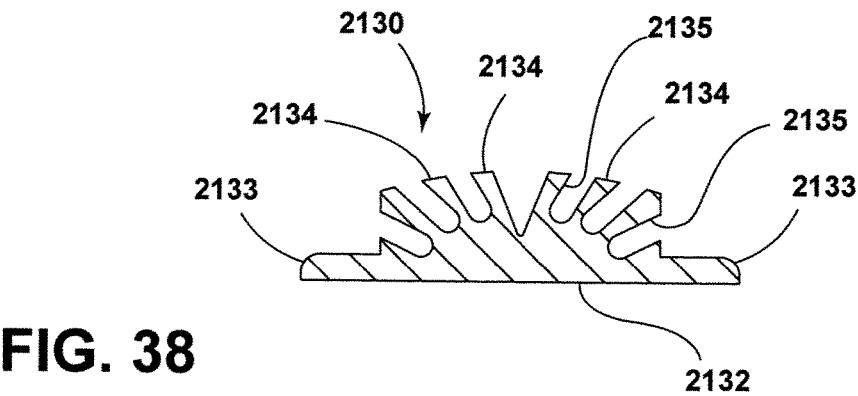
FIG. 38 is an enlarged cross-sectional view of the heat dissipating element taken generally along line 38-38 in FIG. 37.

With reference to FIGS. 26, 34 and 35, the air circulation and decontamination module 1018 additionally includes an indicator element 2058 which seats atop the central housing element 2044A of the base housing member 2032. The indicator element 2058 serves to visually indicate when the lighting arrangement 1017 is operating, and may include LEDs or other lighting in order to provide a visual indication of such operation to an observer.

Figure 28:
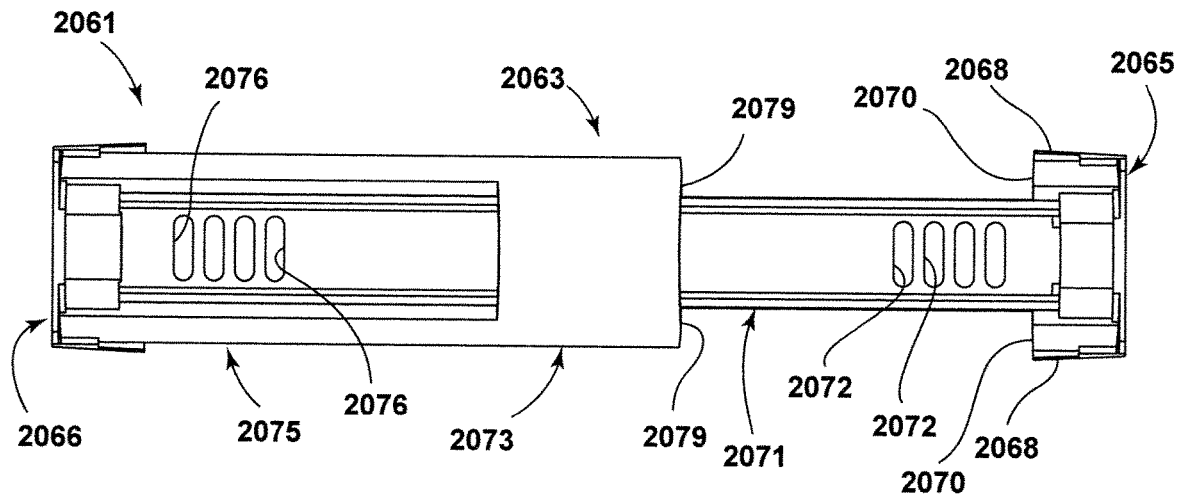
FIG. 28 is an enlarged overhead view of an upper shroud of the air circulation and decontamination module of the air cleaner assembly of FIG. 22.
Figure 29:
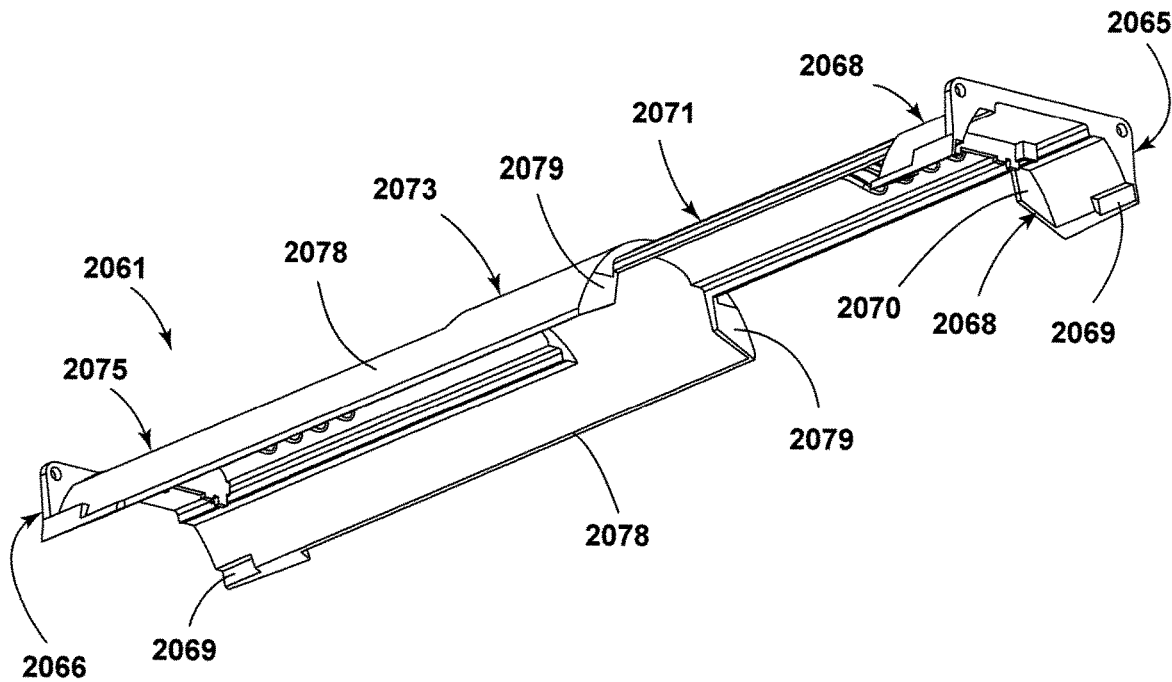
FIG. 29 is an enlarged bottom perspective view of the upper shroud of the air circulation and decontamination module of the air cleaner assembly of FIG. 22.

As shown in FIGS. 26, 28 and 29, the air circulation and decontamination module 1018 further includes an upper shroud 2061, which is formed as an elongated and generally downwardly-arcuate wall 2063 with an upstream mounting flange 2065 and a downstream mounting flange 2066 at opposite longitudinal ends thereof. The mounting flanges 2065 and 2066 are generally flat and are oriented vertically and include fastener holes adjacent opposite lateral edges thereof. The arcuate wall 2063 has a pair of downwardly depending and arcuately shaped legs 2068 joined to the upstream mounting flange 2065, each of which legs 2068 has a downwardly opening recess 2069 at a lower terminal edge thereof (only one of which is shown in FIGS. 26 and 29). The downstream ends of the legs 2068 are joined to respective end walls 2070, and the end walls 2070 are generally parallel to the upstream and downstream mounting flanges 2065 and 2066. The arcuate wall 2063 additionally includes an arcuate upstream wall part 2071 disposed centrally between and joined to the legs 2068, and which includes a plurality of upstream cooling air inlets 2072 disposed adjacent the upstream mounting flange 2065. The arcuate wall 2063 of the upper shroud 2061 further includes a central wall part 2073 connected to and extending away from the upstream wall part 2071, and a downstream wall part 2075 connected to and extending away from the central wall part 2073.

A plurality of downstream cooling air inlets 2076 are formed in the downstream wall part 2075 adjacent the downstream mounting flange 2066. The inlets 2072 and 2076 open into and communicate with the interior of the outer housing 2030 and serve to direct air from the exterior environment entering the cooling air openings 2039 and 2039A of the upper housing 2031 along the lighting arrangement 1017, and the inlets 2072 and 2076 accordingly form part of the heat dissipating arrangement associated therewith. The arcuate wall 2063 has a pair of downwardly depending lower legs 2078 which form lower parts of the central and downstream wall parts 2073 and 2075. These lower legs 2078 are joined to respective end walls 2079 of the arcuate wall 2063. The end walls 2079 are connected to the upstream wall part 2071 and are generally parallel to the upstream and downstream mounting flanges 2065 and 2066 as well as the end walls 2070. The lowermost edges of the legs 2078 and the lowermost edges of the legs 2068 project downwardly by the same amount on opposite sides of the upper shroud 2061, and each leg 2078 defines therein a downwardly opening recess 2069 (only one of which is shown in FIG. 29). Further, the upstream wall part 2071 has a transverse dimension or width which is less than a transverse dimension of the arcuate wall 2063 as defined transversely between the lowermost edges of the legs 2068 and a transverse dimension as defined transversely between the lowermost edges of the legs 2078, such that the arcuate wall 2063 is recessed sidewardly inwardly on opposite lateral sides of the upstream wall part 2071 between the legs 2068 and 2078.

Figure 30:
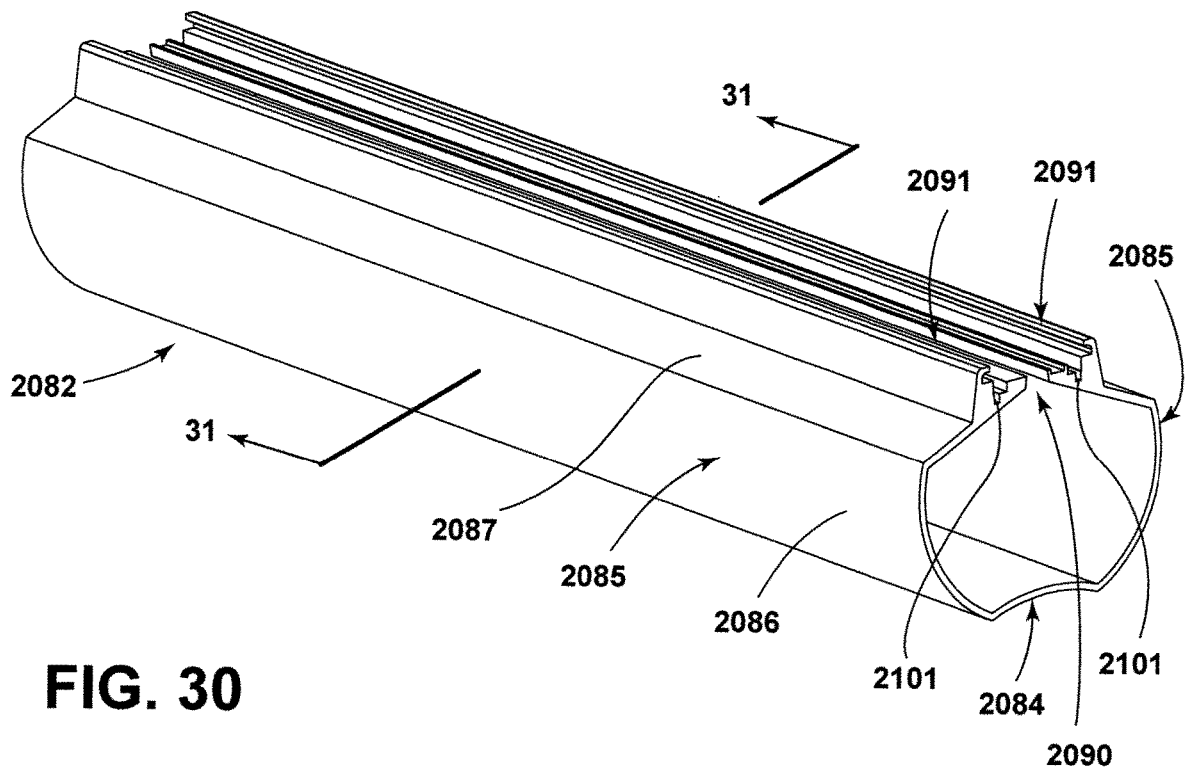
FIG. 30 is an enlarged perspective view of an inner housing of the air circulation and decontamination module of the air cleaner assembly of FIG. 22.
Figure 31:
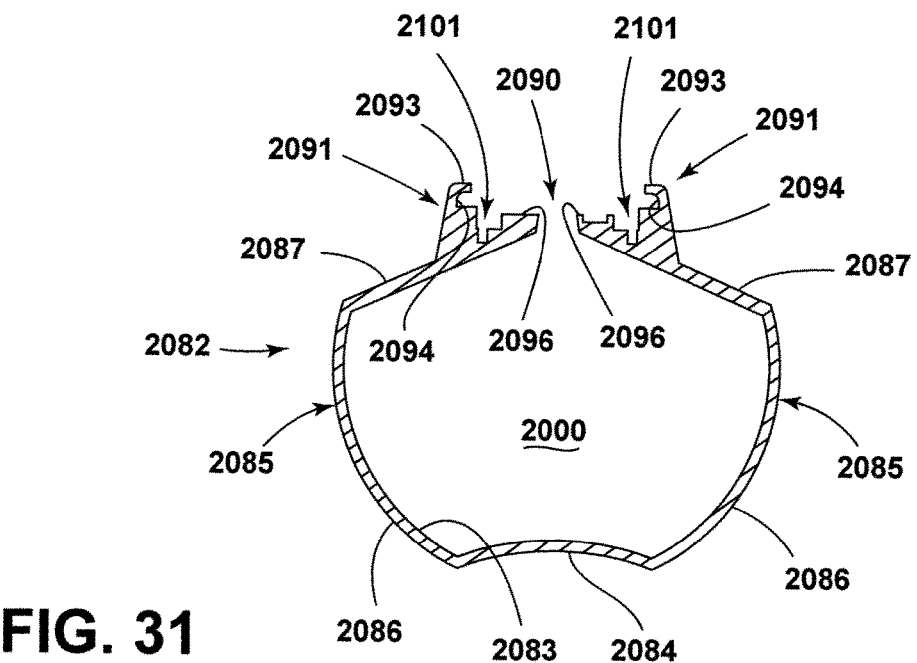
FIG. 31 is cross-sectional view of the inner housing taken generally along line 31-31 in FIG. 30.

For the purpose of defining the interior air duct or air treatment chamber 2000, the air circulation and decontamination module 1013 has a hollow and elongate inner housing 2082 having an inner surface 2083 which defines the interior air duct or air treatment chamber 2000. The housing 2082 may be formed as an extruded component and may be constructed of aluminum, although other materials and forming processes may be utilized. With reference to FIGS. 26, 30 and 31, the inner housing 2082 has a bottom wall 2084 which is upwardly arcuate in shape. More specifically, the bottom wall 2084 has an inwardly facing surface which is convex and an outwardly facing surface which is concave. The inner housing 2082 further includes a pair of sidewalls 2085 which project upwardly from opposite longitudinal edges of the bottom wall 2084, and each sidewall 2085 has an arcuate lower sidewall part 2086 with an outwardly facing convex surface and an inwardly facing concave surface, and an upper sidewall part 2087. Each upper sidewall part 2087 is generally planar in configuration and is joined to an uppermost longitudinal edge of the corresponding lower sidewall part 2086 and angles upwardly as same projects inwardly and away therefrom. The upper sidewall parts 2087 have respective inner surfaces which are generally flat or planar as shown in FIG. 31. Each of the sidewalls 2085 terminates at an upper edge portion 2091, and the upper edge portions 2091 are sidewardly or laterally spaced from one another so as to define a gap 2090 therebetween which extends longitudinally along the entire length of the inner housing 2082, and which gap 2090 opens both upwardly between the upper edge portions 2091 and endwise at opposite terminal ends of the inner housing 2082.

With reference to FIG. 31, the upper edge portions 2091 of the inner housing 2082 each include an inwardly projecting flange 2093 which forms the terminal upper end of the respective upper edge portion 2091. The flanges 2093 are generally corner-shaped and project inwardly towards one another and each defines an elongate receiving channel 2094, which receiving channels 2094 open inwardly towards one another. The upper edge portions 2091 additionally include respective longitudinally extending and flat support surfaces 2096 which are spaced sidewardly from one another and are disposed immediately sidewardly adjacent the gap 2090. The support surfaces 2096 are coplanar and together define a support surface for the lighting arrangement 1017. The upper edge portions 2091 additionally define therein respective fastener-receiving channels 2101 located adjacent the respective support surfaces 2096. The upper edge portions 2091 form part of the heat dissipating arrangement associated with the lighting arrangement 1017, and serve to dissipate heat generated by the arrangement 1017.

As shown in FIGS. 26 and 32, the air circulation and decontamination module 1018 further includes a pair of lower shrouds or supports, wherein one of the lower shrouds 2120 is located adjacent an upstream end of the inner housing 2082 and the other lower shroud 2121 is disposed adjacent the downstream end of the inner housing 2082. The upstream and downstream lower shrouds 2120 and 2121 are identical to one another, and each includes an upwardly opening and generally U-shaped wall 2122 with tabs 2125 fixed to upper terminal ends thereof. A mounting flange 2123 with fastener openings is connected to one side of the U-shaped wall 2122, and a U-shaped support flange 2127 is connected to an opposite side thereof. The wall 2122 and the support flange 2127 connected thereto are shaped so as to generally conform with the outer contour of the inner housing 2082. The lower shrouds 2120 and 2121, when assembled within the outer housing 2030, are oriented so their support flanges 2127 face towards one another, with the terminal ends of the inner housing 2082 resting upon the respective support flanges 2127.

FIGS. 26 and 36-38 illustrate a heat dissipating element or heat sink 2130 which forms part of the air circulation and decontamination module 1018 and the heat dissipating arrangement mentioned previously. The heat dissipating element 2130 is elongate in shape and includes a flat base 2132 which terminates sidewardly at respective lateral edge portions 2133. The element 2130 additionally includes a plurality of upwardly projecting fingers or projections 2134 which are cantilevered upwardly from the base 2132 and extend along the entire length thereof. The fingers 2134 are spaced from one another so as to define heat conducting channels 2135, with one channel 2135 being disposed between each adjacent pair of fingers 2134. The heat dissipating element 2130 is constructed of metal, such as aluminum, although other materials may be utilized.

Figure 39:
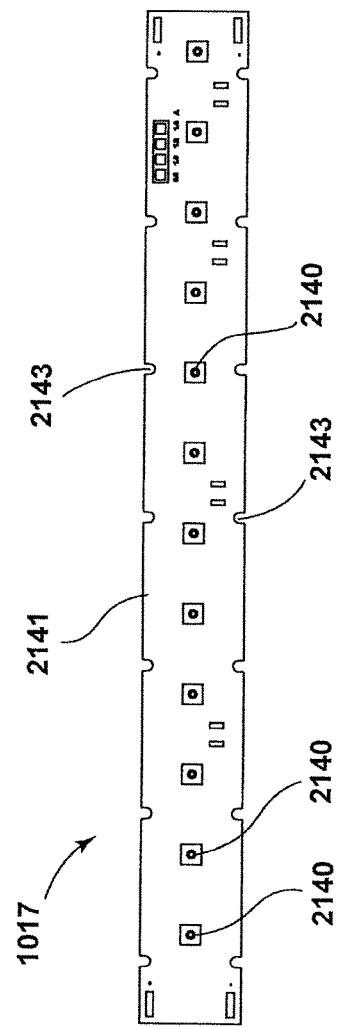
FIG. 39 is an enlarged bottom view of a lighting arrangement of the air circulation and decontamination module of the air cleaner assembly of FIG. 22.

Turning now to the lighting arrangement 1017 of the air circulation and decontamination module 1018, and with reference to FIGS. 26 and 39, the arrangement 1017 includes a plurality of ultra-violet emitting LEDs 2140 attached to a circuit board 2141 (or PCB) and/or a bus, which circuit board 2141 serves to route power to the LEDs. The circuit board 2141 defines therein a plurality of sidewardly opening mounting recesses 2143 along the respective opposite longitudinal edges thereof. The minimum output of ultraviolet energy, and preferably UV-C energy, from the LEDs 2140 of the lighting arrangement 1017 is 4000 microwatts, which is sufficient to inactivate most viruses and bacteria. Some molds and bacteria require a higher energy level to inactivate same, and thus the output indicated above for the lighting arrangement 1017 should be considered a minimum output, and higher energy outputs may be desirable or necessary. In one embodiment, the required UV-C germicidal energy is calculated based on air speed and UV-C intensity. Every pathogen has a known, published "K-value" that provides that accepted lethal dose or UV-C energy. This value varies by the pathogen. However, general accepted guidelines indicate that certain intensities provide different levels of overall reduction, for example, an intensity of 2000 J/cm2 provides an average reduction of virus and bacteria of about 95%.

As shown in FIGS. 26 and 32, the air circulating and decontamination module 1018 additionally includes a pair of air moving devices, which in the illustrated embodiment are fans 2147 and 2148. The fans 2147 and 2148 are identical to one another and include mounting holes 2149 for receiving fasteners which secure the fans 2147 and 2148 within the outer housing 2030. The fans 2147 and 2148 are axial fans, although other types of air moving devices may be utilized, such as radial fans. Further, it may be desirable to utilize a single air moving device or fan within the module 1018. For example, it may be sufficient to utilize only the downstream air moving device 2148 by powering same at a speed sufficient to draw the proper amount of air through the module 1018.

Figure 39A:
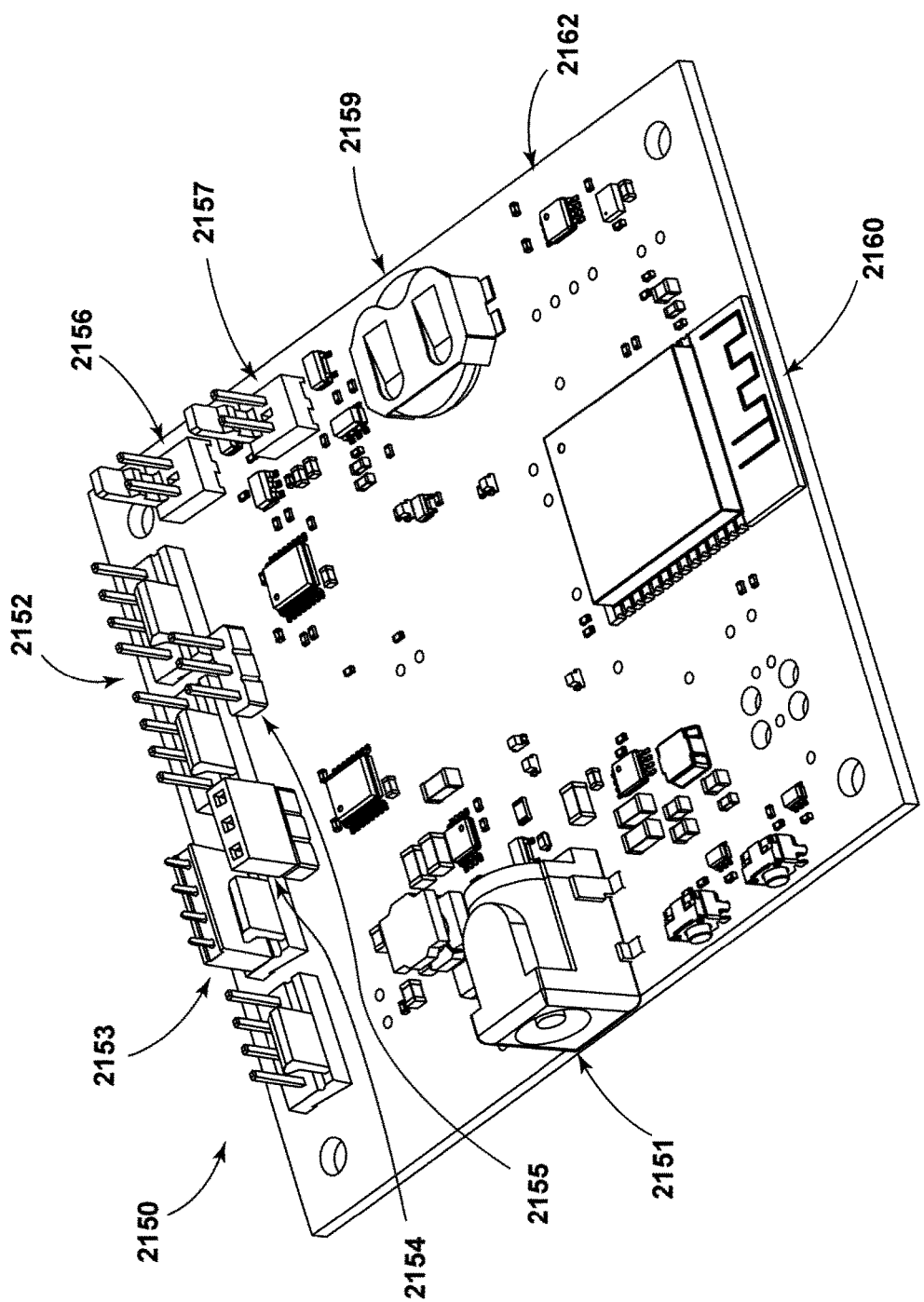
FIG. 39A is an enlarged top perspective view of the controller of the air circulation and decontamination module of the air cleaner assembly of FIG. 22.

The air circulation and decontamination module 1018 further includes a controller or printed circuit board (PCB) 2150, as shown in FIGS. 26 and 39A. The controller 2150 includes a power connector 2151 which is electrically connected to the power supply or cord 1019 so as to power the controller 2150 to allow same to in turn provide power to and control the air moving devices 2147 and 2148 and the lighting arrangement 1017. In this regard, the controller 2150 includes two fan-controlling banks 2152 and 2153, and each bank 2152, 2153 has two four-pin connectors with pulse width modulation (PWM) for powering and controlling the associated fan 2147 or 2148. Also provided are thermocouples 2154 and 2155 which detect and monitor the temperature of the LEDs 2140 of the lighting arrangement 1017. Data gathered by the thermocouples 2154 and 2155 is used to ensure that the LEDs 2140 are operating, to drive the LEDs 2140 in the most efficient manner possible and to determine when the LEDs 2140 are nearing the end of their useful life. The controller 2051 also includes two connectors 2156 and 2157, either of which can be used to provide power and control signals to the lighting arrangement 1017, and a real-time clock 2159 which allows the controller 2150 to maintain a set time regardless of whether the power connector 2151 is connected to a power source.

A chip or processor 2160 is provided on the controller 2150 and is capable of communicating according to various protocols, such as Bluetooth and Wi-Fi, and includes a programming port which is used to provide firmware updates thereto. The chip 2160 is programmed to achieve the desired functioning of the module 1018 based on parameters such as temperature, speed and power as provided to the chip 2160 by the various components of the controller 2150. The chip 2160 cooperates with a user interface service which may be utilized via a web portal or through another application programming interface (API), which allows a user to set a desired operating configuration of the air cleaner assembly 1010. The controller 2150 also incorporates a connector 2162 for the visual indicator element 2058 to power and control same.

In the illustrated embodiment, the air circulating and decontamination module 1018 incorporates two fans 2147 and 2148, and one fan 2147 is connected to the fan bank 2152 of the controller 2150 and the other fan 2148 is connected to the fan bank 2153 of the controller 2150. However, each fan bank 2152 and 2153 is capable of providing power to and controlling two fans, and thus additional fans can be incorporated into the air circulating and decontamination module 1018 if desirable or necessary. Further, while the air circulating and decontamination module 1018 in the illustrated embodiment includes one lighting arrangement 1017, the controller 2150 is capable of controlling and powering two lighting arrangements 1017 and thus a further lighting arrangement can be incorporated into the module 1018 if desirable or necessary by connecting same to one of the connectors 2156 or 2157. Alternatively, one controller 2150 can be utilized to control and power two different air circulation and decontamination modules 1018.

With reference to FIGS. 26 and 31-33, the air circulation and decontamination module 1018 is assembled as follows. The lighting arrangement 1017 is placed atop the mounting surfaces 2096 of the upper edge portions 2091 of the inner housing 2082 so that the LEDs 2140 project downwardly through the gap 2090 and towards the interior thereof of the inner housing 2082. The heat dissipating element 2130 is then positioned with its base 2132 atop the lighting arrangement 1017 and so that the lateral edges 2133 are located within the respective receiving channels 2094 of the upper edge portions 2091. Fasteners (see FIGS. 26 and 33) are then inserted downwardly through the openings 2136 of the heat dissipating element 2130, through the mounting recesses 2143 of the circuit board 2141 of the lighting arrangement 1017 and into the channels 2101 of the upper edge portions 2091.

The lower shrouds 2120 and 2121 are then assembled to the inner housing 2082 by placing the opposite terminal ends thereof atop the respective flanges 2127 of the lower shrouds 2120 and 2121. The lower shrouds 2120 and 2121 can be secured to the inner housing 2082 using clamping screws (see FIG. 26) provided on the exterior of the shrouds 2120 and 2121. The upper shroud 2061 is then placed atop the inner housing 2082 so that the tabs 2125 of the lower shrouds 2120 and 2121 engage within the respective recesses 2069 of the upper shroud 2061. Fasteners (see FIG. 26) are then inserted through the fastener holes provided in the upstream mounting flange 2065 of the upper shroud 2061 and through the fastening openings of the upstream lower shroud 2120 and into the mounting holes 2149 of the upstream fan 2147 to secure the upstream fan 2147 to the inner housing 2082. In a similar fashion, fasteners are inserted through the fastener holes in the downstream mounting flange 2066 of the upper shroud 2061 and through the fastening openings of the downstream lower shroud 2121 and into the mounting holes 2149 of the downstream fan 2148.

The controller 2150 is mounted within the base housing member 2032 within the interior of the downstream support 2043 and is suitably secured there as best shown in FIG. 32. The indicator element 2058 is secured atop the central housing element 2044A of the base housing member 2032, and the inner housing 2082 (as assembled to the upper shroud 2061, the lower shrouds 2120 and 2121 and the fans 2147 and 2148) is positioned within the base housing member 2032 such that the bottom wall 2084 is seated atop the indicator element 2058. The upper housing member 2031 is then positioned atop the base housing member 2032 so that the upstream end wall 2037 is vertically aligned with the end wall 2047 of the base housing member 2032, and so that the downstream end wall 2038 is vertically aligned with the downstream bottom wall part 2055 of the base housing member 2032. Continued downward movement of the upper housing member 2031 towards the base housing member 2032 eventually causes locking tabs 2040 of the upper housing member 2031 to engage with the respective locking detents 2056 of the base housing member 2032 to securely fix the upper and lower housing members to one another. The upstream fan 2147 is accordingly disposed adjacent the upstream end 2033 and the opening 2048 of the module 1018 and the downstream fan 2148 is disposed adjacent the downstream end 2034 and the screen 2038 of the module 1018. The controller 2150 is electrically connected via suitable wiring to the various components of the module 1018 to power and control same.

With the base and cover housing members 2014 and 2015 of the housing arrangement 1013 assembled to one another as discussed above, and with reference to FIGS. 27 and 27A, the terminal end of the housing arrangement 1013 is assembled to the upstream end 2033 of the air circulation and decontamination module 1018. For this purpose, the air cleaner assembly 1010 additionally includes a further end cap 2200 having a generally ring-shaped peripheral wall 2201 with an outer edge which corresponds in shape to the exterior contour of the housing arrangement 1013 and which wall 2201 defines therein an opening 2202. Further, a pair of generally semi-circular mounting elements 2203 project inwardly from the peripheral wall 2201 adjacent a lower side thereof, and each mounting element 2203 defines a fastener hole 2204 therein. Additionally, the end cap 2200 includes a pair of semi-circular flanges 2205 which are spaced laterally from one another and which project upwardly from a bottom of the peripheral wall 2201, and a pair of tab-like flanges 2206. The end cap 2200 is fixed to the end of the housing arrangement 1013 by placing the end cap 2200 over the open end of the housing arrangement 1013 so that the receiving channels 2020 thereof seat in respective recesses defined on an inner side of the mounting elements 2203, so that the flanges 2205 engage around the connecting structure 2011 of the housing arrangement 1013 and so that the tab-like flanges 2206 engage between the respective base and cover housing members 1014 and 1015. Fasteners are then inserted from the outer side of the end cap 2200 and into the respective receiving channels 2020 of the housing arrangement 1013 to secure the end cap 2200 thereto. The end of the housing arrangement 1013 with the end cap 2200 installed thereon is then inserted into the opening 2048 at the upstream end 2033 of the module 1018 so that the air duct 1016 of the housing arrangement 1013 communicates with the interior air duct 2000 of the module 1018 defined within the inner housing member 2082.

Figure 40:
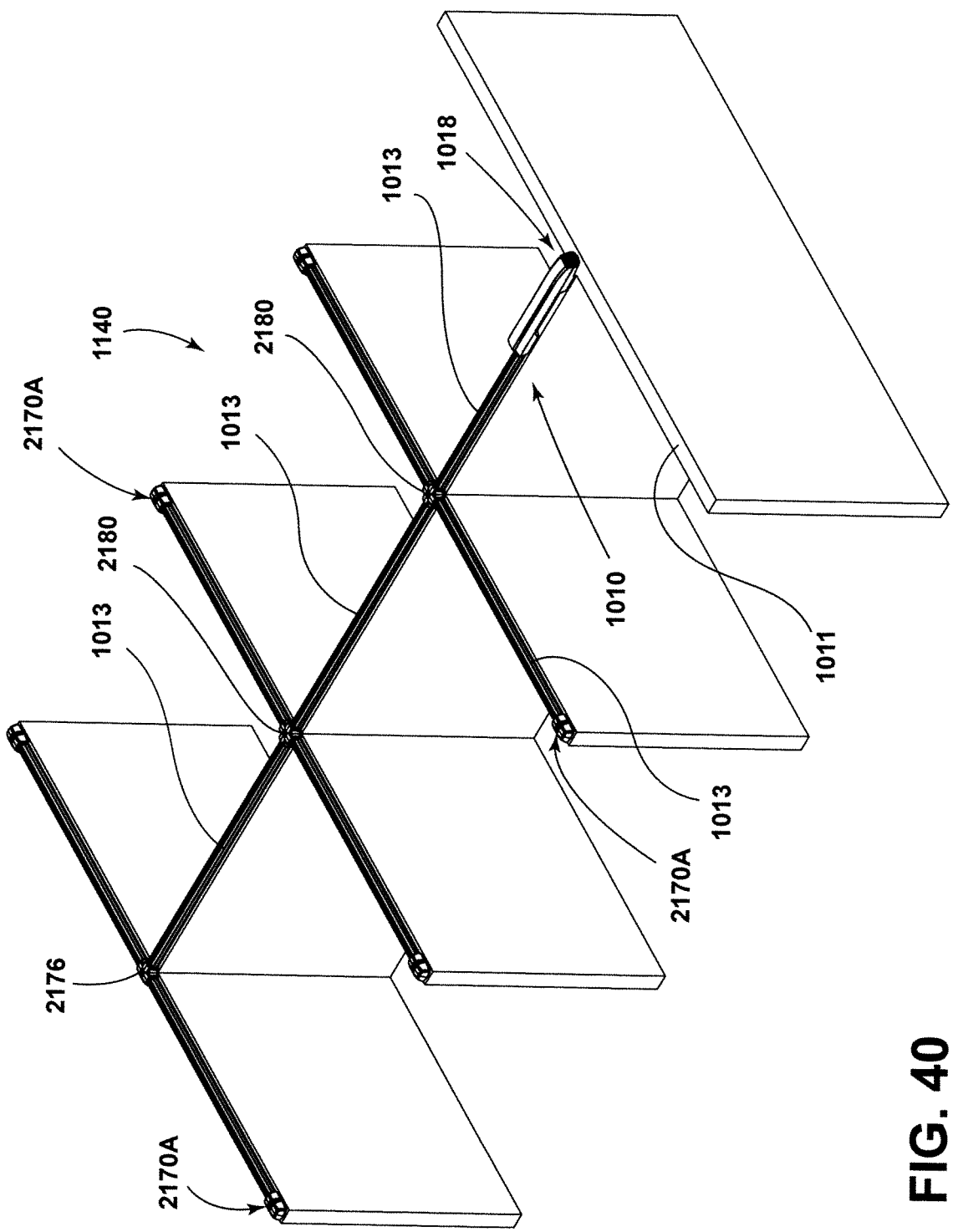
FIG. 40 is an overhead view of the air cleaner assembly of FIG. 22 with multiple housing arrangements thereof arranged in various orientations relative to one another and installed on the space-dividing wall panel system.

FIGS. 22 and 40 illustrate the air cleaner assembly 1010 in use with the space-dividing wall panel system 1140. As mentioned previously, FIG. 22 illustrates the air cleaner assembly 1010 with a plurality of the housing arrangements 1013 thereof installed along a series of wall panels 1012 which are aligned in a co-linear manner, and the distal end of the most remote or distal housing arrangement 1013 is closed off with an end cap 1020. The adjacent pairs of housing arrangements 1013 located proximally of this remote housing arrangement 1013 are interconnected to one another with a connector 2170, shown in FIGS. 22 and 42, which connector 2170 serves to join the terminal ends of the respective adjacent housing arrangements 1013 to one another in a co-linear manner. The connector 2170 has a hollow interior and includes openings 2171 at opposite ends thereof (only one of which openings 2170 is shown in FIG. 42). The openings 2171 are configured so as to match the outer contour of the terminal end of the housing arrangement 1013 such that the terminal end fits snugly within the connector 2170. The connector 2170 can be used to interconnect two adjacent housing arrangements 1013 so that their respective air ducts 1016 are in communication with another. If it is desirable or necessary to prevent air flow between two adjacent ones of the housing arrangements 1013, the end cap 1020 may be inserted into the interior of the connector 2170, as shown in FIG. 42. Alternatively, the connector 2170 may be configured with only one opening 2170 and may be closed at its opposite end. Such a connector 2170A is depicted in FIG. 40, and may be used in place of the end cap 1020. Additionally, the connector 2170 includes a fastener hole 2172 through which a fastener is inserted and installed into the upper frame member 1011 of the respective wall panel 1012 to secure the connector 2170 thereto.

The end cap 1020 is shown in detail in FIG. 41, and includes an inner surface which is configured to cooperate with the terminal end of the housing arrangement 1013, and includes a pair of openings 2173, through which fasteners extend into the respective receiving channels 2020 of the housing arrangement 1013 to secure the end cap 1020 thereto.

FIG. 43 illustrates a further T-shaped connector 2176 which is utilized to join three adjacent housing arrangements 1013 in a T-shaped orientation with one another, and such connector 2176 accordingly includes three openings 2177 at each end thereof (only two of which are shown in FIG. 43). If it is desirable or necessary to terminate the air duct 1016 of any of the housing arrangements 1013 associated with the connector 2176, then an end cap or end caps 1020 can be inserted into the corresponding opening 2177 of the connector 2176 adjacent the air duct 1016 which is to be closed. The connector 2176 also includes a fastener hole 2178, similar to fastener hole 2172.

A further four-way connector 2180 is shown in FIG. 44, and may be utilized to join four adjacent housing arrangements 1013 in a cross-type configuration with one another. The connector 2180 includes four openings 2181 (only two of which are shown) in which the terminal ends of the housing arrangements 1013 are inserted, and a fastener hole 2182. One or more end caps 1020 may be utilized to close off any air duct 1016 of an associated housing arrangement 1013 by inserting the end cap 1020 into the corresponding opening 2181 of the connector 2180.

Lastly, a right-angled connector 2190 is shown in FIG. 45, and may be utilized to join two adjacent housing arrangements 1013 in a right-angled configuration. The connector 2190 includes two openings 2191 (only one of which is shown in FIG. 45) which receive the terminal ends of the housing arrangements 1013, and a fastener hole 2192. An end cap 1020 may be utilized to prevent communication between the air ducts 1016 of the corresponding housing arrangements 1013 if desirable or necessary by inserting the end cap 1020 into one of the openings 2191.

FIG. 40 illustrates the air cleaner assembly 1010 with the housing arrangements 1013 oriented in both cross configurations, using the connectors 2180, and in a right angled configuration at the remote end of the wall panel system 1140 using the connector 2176. Other types of configurations of the housing arrangements 2013 may be utilized depending on the desired layout of the work area.

The air circulation and decontamination module 1018 and the interconnected housing arrangement 1013 are secured to the upper frame members 1011 of respective wall panels 1012 by placing the downwardly facing side of the adhesive of the mounting arrangement 1029 of the housing arrangement 1013 and the outwardly facing side of the adhesive of the mounting arrangements 2052A of the module 1018 on the frame members 1011 with pressure to secure the housing arrangement 1013 and the module 1013 thereto. Additional housing arrangements 1013 can be utilized by interconnecting same to the housing arrangement 1013 connected to the module 1018 as desired, in order to achieve the configurations shown in FIG. 22 or 40, or other desired configurations, by utilizing one or more of the various connectors 2170, 2176, 2180 or 2190. It will be appreciated that the mounting arrangements 1029 and 2052A may extend continuously along the length of the housing arrangement 1013 and module 1018, respectively, or may instead be disposed in spaced apart relation with one another along these components. Further, other toolless mounting arrangements may be utilized, such as hook and loop fasteners or magnets. Alternatively, screws or other similar fasteners and associated mounting methods may be employed.

With the air cleaner assembly 1010 arranged in the desired configuration along the wall panel system 1140, the assembly 1010 may be utilized to clean contaminated air located within an enclosed space by connecting the power supply or cord 1019 to an adjacent electrical receptacle located within the area to be treated. Such receptacle may be provided on the wall panel system 1140, in a floor or on another structure provided within the enclosed space which is located adjacent the air cleaner assembly 1010. In one embodiment, the controller 2150 operates the air cleaner assembly 1010 according to a preset program, which program controls variables of operation including air flow and power of the LEDs 2140 and operates the air cleaner assembly 1010 based on environmental variables such as working hours and inhabitant presence, for example. Further, multiple air cleaning assemblies 1010 may be installed within a building and each controller 2150 may be provided with a unique identifier which corresponds with the physical location of the controller 2150 within the building. A facility manager can then select or tag particular air cleaning assemblies 1010 based on location and operate same in order to achieve a unified performance based on worker schedules and desired protection levels, for example via a wireless smart-things network.

During operation, the controller 2150 operates the air moving devices 2147 and 2148 of the air circulation and decontamination module 1018 so that same create a negative pressure or vacuum within the air duct 1016 of the housing arrangement 1013 connected directly to the module 1018 (hereinafter "the upstream housing arrangement 1013") and within the air treatment chamber 2000 of the module 1018. If additional housing arrangements 1013 are connected to the upstream housing arrangement 1013, then a vacuum will also be created within the air ducts 1016 of these arrangements 1013. This negative pressure or vacuum causes air exterior to the housing arrangement 1013 to be drawn into the air duct 1016 through the ports 1061 provided along the housing arrangement 1013. The air to be cleaned is then directed from the air duct 1016, through the upstream fan 2147, and into the treatment chamber 2000 of the module 1018.

Figure 33:
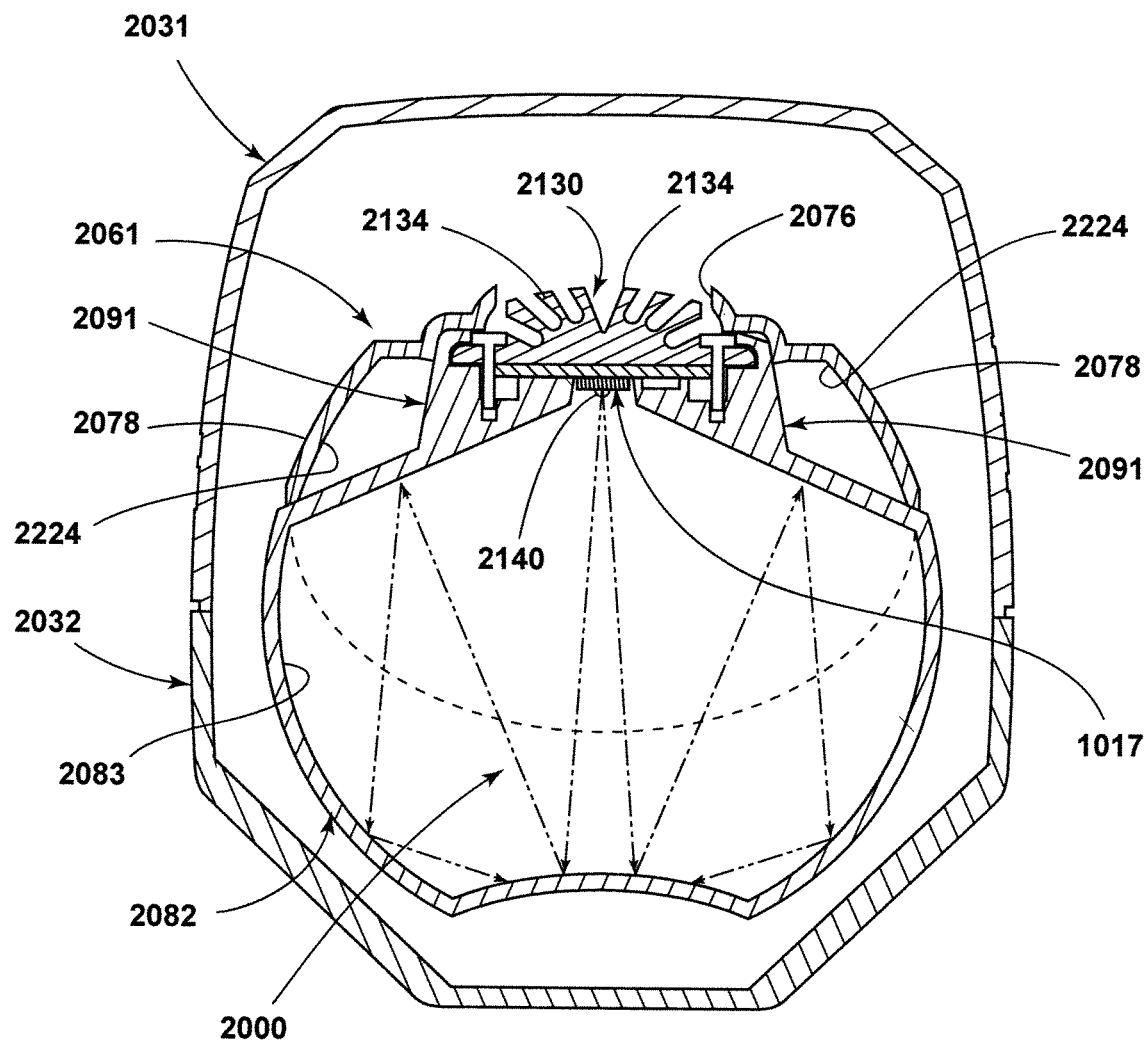
FIG. 33 is an enlarged cross-sectional view of the air circulation and decontamination module taken generally along line 33-33 in FIG. 32.

With reference to FIG. 33, the controller 2150 operates the lighting arrangement 1017 to drive the LEDs 2140 such that same emit ultraviolet energy within the treatment chamber 2000 as shown by the dotted lines. The multiple surfaces defined by the inner surface 2083 of the inner housing 2082 are reflective or polished, such that this ultraviolet energy is reflected or bounced throughout the treatment chamber 2000 to effectively and thoroughly clean the contaminated air located therein. The decontaminated air then exits the treatment chamber 2000 through the downstream end 2034 of the module 1018, and more specifically, through the downstream fan 2148 and then through the screen 2038.

The LEDs 2140 are particularly desirable for use in the lighting arrangement 1017 since same are highly energy-efficient and are therefore more cost-efficient than other forms of lighting. However, LEDs typically generate large amounts of heat which, if not directed away from the LEDs, will shorten the useful lifespan thereof. The air cleaner assembly 1010 accordingly incorporates the heat dissipating arrangement in order to cool the LEDs 2140 and to conduct heat away from same so as to maximize the life thereof. More specifically, the heat dissipating arrangement includes the following components included in the air circulation and dissipation module 1018: the cooling air inlet openings 2039 and 2039A and the exhaust openings 2039B of the outer housing 2030; the cooling air inlets 2072 and 2076 of the upper shroud 2061; the upper edge portions 2091 of the inner housing member 2082; and the heat dissipating element 2130. The lighting arrangement 1017 is sandwiched vertically between the upper edge portions 2091 of the inner housing member 2082, which edge portions 2091 together form a lower heat sink for the lighting arrangement 1017, and the heat dissipating element 2130, which element 2130 forms an upper heat sink for the lighting arrangement 1017.

In one method of operation, the controller 2150 controls the operation of the air moving devices 2147 and 2148 so that the downstream air moving device 2148 operates a higher speed as compared to the upstream air moving device 2147, which creates a negative pressure within an open area defined between the upper shroud 2061 and the heat dissipating element 2130, which open area is separate from and does not communicate with the treatment chamber 2000 located within the inner housing 2032. In this regard, the upper and lower shrouds 2061 and 2120 or the upper and lower housing members 2031 and 2032 of the outer housing 2030 include suitable ribs or walls 2037A which serve to separate and close off this open area from the treatment chamber 2000 at opposite longitudinal ends thereof. As the LEDs 2140 operate and produce heat, the upper edge portions 2091 of the inner housing 2082 absorb and conduct the heat sidewardly and away from the LEDs 2140 and distribute the heat along the length of the inner housing 2082. On the upper side of the lighting arrangement 1017, the heat dissipating element 2130 absorbs and conducts heat upwardly and away from the LEDs 2140. With reference to FIGS. 32 and 35, the negative pressure created by the downstream air moving device 2148 as discussed above causes cooling air from the exterior environment to enter into the openings 2039 and 2039A of the outer housing 2030 of the module 1018 and into the upstream openings 2072 of the upper shroud 2061. This cooling air interacts with the heat absorbed by the heat dissipating element 2130 to produce heated air, which heated air is then directed downstream along the channels 2135 of the heat dissipating element 2130. These channels 2135 together form a plurality of elongate upstream cooling channels 2220 (FIG. 32) defined between the lower surface of the upstream wall part 2071 of the upper shroud 2061 and the upper side of the heat dissipating element 2130. The heated air within the cooling channels 2220 then travels downstream to a further central cooling channel 2222, as shown in FIGS. 32 and 34, which central cooling channel 2222 is defined between the lower surface of the central wall part 2073 of the upper shroud 2061 and the upper side of the heat dissipating element 2130. As best shown in FIG. 34, the central cooling channel 2222 has an upper channel region 2223 located centrally above the heat dissipating element 2130, which upper channel region 2223 communicates with a pair of side channel regions 2224 disposed on respective opposite sides of the inner housing 2082. The side channel regions 2224 extend in a downstream direction from the central cooling channel 2222 and open endwise at and through the downstream fan 2148.

Further, the channels 2135 of the heat dissipating element 2130 located adjacent the downstream wall part 2075 of the upper shroud 2061 together form a plurality of downstream cooling channels 2225 defined between the lower surface of the downstream wall part 2075 of the upper shroud 2061 and the upper side of the heat dissipating element 2130. The outer surfaces of the upper sidewall parts 2087 and the outer side surfaces of the upper edge portions 2091 (of the inner housing 2082) together with the inner surfaces of the legs 2078 and the inner surfaces of the end walls 2079 (of the upper shroud 2061) together define the respective side channel regions 2224. The heat generated by the LEDs 2140 and absorbed by the upper edge portions 2091 of the inner housing 2082 is accordingly directed into the side channel regions 2224.

Cooling air from the exterior environment also enters (via the openings 2039 and 2039A of the outer housing 2030 of the module 1018) the downstream openings 2076 of the upper shroud 2061, as shown in FIGS. 32 and 33. This cooling air travels upstream via the cooling channels 2225 and interacts with the heat absorbed by the heat dissipating element 2130, and then enters into the central cooling channel 2222, and thus produces additional heated air within the channel 2222. The heated air within the channel 2222, which channel 2222 communicates with the side channel regions 2224, then enters the side channel regions 2224. The heated air moves downstream through the side channel regions 2224 and exits through the downstream fan 2148 and thereafter through the downstream end 2034 of the module 1018 through the screen 2038 thereof and also through the exhaust openings 2039B, along with the cleaned air exiting the treatment chamber 2000.

The heat dissipating arrangement described above thus allows heat generated by the LEDs 2140 of the lighting arrangement 1017 to be dissipated and removed from the module 1018 as heated air along substantially the entire extent of the lighting arrangement 1017. Cooling the LEDs 2140 of the lighting arrangement 1017 in the manner discussed above allows the controller 2150 to drive the LEDs 2140 at a higher power level which results in greater disinfection capability, and also maximizes the longevity of the LEDs 2140 by conducting and removing heat generated by same to the exterior environment.

The air circulation and decontamination module 1018 may be used as a stand-alone unit. That is, the air circulation and decontamination module 1018 may be utilized without having the housing arrangement 1013 attached thereto. In this embodiment, the air circulation and decontamination module 1018 includes a perforated member or screen, similar to screen 2038 at the downstream end 2034, installed thereon so as to cover the opening 2048 at the upstream end 2033 of the module 1018. Contaminated air in this embodiment directly enters the upstream end 2033 of the module 1018 through the screen for cleaning in the air treatment chamber 2000. This embodiment of the air circulation and decontamination module 1018 accordingly provides a portable unit which may be used in a desired treatment area in any suitable location which will support the module 1018.

Although particular preferred embodiments of the air cleaner assembly have been disclosed in detail for illustrative purposes, it will be recognized that variations or modifications of the disclosed air cleaner assembly, including the rearrangement of parts, lie within the scope of the invention.

What is claimed is:
1. An air cleaning assembly comprising:
a housing having a base portion extending along a length thereof, an intake opening and a discharge opening;
a mounting arrangement disposed on said base portion and configured for fixedly attaching said base portion to a generally planar and substantially rigid support surface;
an interior air duct disposed within said housing;
a lighting arrangement disposed within said interior air duct and comprising a plurality of ultraviolet emitting LED lights;
at least one air moving device fixed to said housing and configured to transport contaminated air from an environment exterior to said housing through said intake opening of said housing and into said interior air duct for cleaning by said plurality of ultraviolet lights and to discharge cleaned air from said interior air duct to the exterior environment through said discharge opening of said housing; and a heat dissipating arrangement disposed on said housing and comprising at least one cooling channel, at least one cooling air inlet in communication with an environment exterior to said housing and at least one heat transfer element disposed adjacent said LED lights to dissipate and conduct heat generated by said LED lights away therefrom such that heated air is discharged from said housing via said at least one cooling channel.

2. The air cleaning assembly according to claim 1, wherein said cooling channel is disposed to communicate with said discharge opening such that heat generated by said LED lights is discharged as heated air through said discharge opening.

3. The air cleaning assembly according to claim 2, wherein said housing is an outer housing and said air cleaning assembly comprises an inner housing disposed within said outer housing and defining said interior air duct therein, said outer housing including said cooling air inlet in communication with the exterior environment and in communication with said at least one cooling channel.

4. The air cleaning assembly according to claim 1, wherein said housing is a first housing and said interior air duct is a first interior air duct, said air cleaning assembly comprising a second housing having a length and a width of a substantially lesser dimension than the length such that said second housing is longitudinally elongate in shape, said second housing having a second interior air duct, a base extending along the length of said second housing and a plurality of ports in communication with said second interior air duct and in communication with the exterior environment, said first housing being connected to said second housing such that said intake opening of said first housing is in communication with said second interior air duct of said second housing, said at least one air moving device transporting contaminated air from the exterior environment through said plurality of ports into said second interior air duct and into said first interior air duct for cleaning by said LED lights.

5. The air cleaning assembly according to claim 4, wherein said plurality of ports are distributed in a longitudinally spaced-apart manner with one another along a substantial portion of the length of said second housing.

6. An air cleaning assembly comprising:
a housing having a length and a width of a substantially lesser dimension than the length such that said housing is longitudinally elongate in shape, said housing having an interior air duct, a base portion extending along the length thereof and a plurality of ports in communication with said interior air duct and in communication with an environment exterior to said housing, said plurality of ports being distributed in a longitudinally spaced-apart manner with one another along a substantial portion of the length of said housing;
a mounting arrangement disposed on said base portion and configured for fixedly attaching said base portion to a generally planar and substantially rigid support;
a lighting arrangement comprising a plurality of ultraviolet emitting lights; and
an air circulating module fixed to said housing, said air circulating module comprising at least one air moving device configured to transport contaminated air from the exterior environment through said plurality of ports disposed in said housing and into said interior air duct for cleaning by said plurality of ultraviolet lights and to discharge cleaned air from said interior air duct to the exterior environment.

7. The air cleaning assembly according to claim 6, wherein said housing has first and second longitudinally spaced-apart ends and a housing wall connected to said base member and extending lengthwise along said housing between said first and second ends, said ports being disposed in said housing wall.

8. The air cleaning assembly according to claim 7, wherein each said port each comprises a discrete opening extending through said housing wall and said openings are disposed in a longitudinally spaced-apart manner with one another along said housing.

9. The air cleaning assembly according to claim 6, wherein said lighting arrangement is disposed within said interior air duct.

10. The air cleaning assembly according to claim 9, wherein said ultraviolet emitting lights comprise LED lights disposed longitudinally along said interior air duct of said housing.

11. The air cleaning assembly according to claim 6, wherein said interior air duct is a first interior air duct and said air circulating module comprises a module housing and a second interior air duct disposed within said module housing, said lighting arrangement being disposed within said second interior air duct.

12. The air cleaning assembly according to claim 11, wherein said module housing has a length and a width of a substantially lesser dimension than the length of said module housing such that said module housing is longitudinally elongate in shape, said module housing having a first upstream end and a second downstream end longitudinally spaced from said first upstream end, said first upstream end of said module housing having an intake opening connected to said housing to fluidly interconnect said first and second interior air ducts to one another such that said intake opening at said first upstream end of said module housing receives contaminated air entering said housing through said plurality of ports.

13. The air cleaning assembly according to claim 12, wherein said second downstream end of said module housing comprises a discharge opening in communication with said second interior air duct for discharging cleaned air therefrom and into the exterior environment after treatment by said lighting arrangement.

14. The air cleaning assembly according to claim 13, wherein said ultraviolet emitting lights comprise LED lights disposed longitudinally along said second interior air duct.

15. The air cleaning assembly according to claim 14, wherein said at least one air moving device is disposed at said first upstream end of said module housing and is configured to draw contaminated air into said second interior air duct from said first interior air duct of said housing and to discharge cleaned air from said second interior air duct through said second downstream end of said module housing.

16. The air cleaning assembly according to claim 15, wherein said air circulating module comprises at least one cooling channel and a heat dissipating member disposed adjacent said LED lights to dissipate and transfer heat generated by said LED lights to said at least one cooling channel, said at least one cooling channel communicating with said second downstream end of said module housing to discharge heated air therefrom.

17. The air cleaning assembly according to claim 16, wherein said at least one air moving device comprises two air moving devices, said two air moving devices being an upstream air moving device and a downstream air moving device, said upstream air moving device being disposed at said first upstream end of said module housing and said downstream air moving device being disposed at said second downstream end of said module housing, said module housing comprising a plurality of cooling-air openings in communication with the exterior environment and in communication with said at least one cooling channel.

18. An air cleaning assembly for use in conjunction with an upright space-dividing wall panel system, said air cleaning assembly comprising:
- a first housing having a length and a width of a substantially lesser dimension than the length such that said first housing is longitudinally elongate in shape, said first housing having a first interior air duct, a base portion forming a lower part of said first housing and extending along the length thereof, and a plurality of ports in communication with said first interior air duct and in communication with an environment exterior to said first housing, said plurality of ports being distributed in a longitudinally spaced-apart manner with one another lengthwise along said first housing;
- a first mounting arrangement disposed on said base portion and configured for fixedly attaching said base portion to a generally planar and substantially rigid support surface of an upright space-dividing wall panel system;
- an air circulation and decontamination module comprising a second housing having a base forming a lower part of said second housing and extending along a length thereof, said second housing having a second interior air duct in communication with said first interior air duct of said first housing;
- a second mounting arrangement disposed on said base of said second housing and configured for fixedly attaching said base to a generally planar and substantially rigid support surface of an upright space-dividing wall panel system;
- said air circulating and decontamination module comprising:
  - a lighting arrangement disposed within said second interior air duct and comprising a plurality of ultraviolet emitting lights; and
  - at least one air moving device configured to transport contaminated air from the exterior environment through said plurality of ports disposed in said first housing, into said first interior air duct of said first housing and into said second interior air duct for cleaning by said plurality of ultraviolet lights and to discharge cleaned air from said second interior air duct to the exterior environment.

19. The air cleaning assembly according to claim 18, wherein said second housing comprises an intake opening and a discharge opening, and said air circulating and decontamination module further comprises at least one cooling channel and a heat dissipating arrangement mounted on said second housing and comprising at least one heat transfer element disposed adjacent said plurality of ultraviolet emitting lights to dissipate and conduct heat generated by said plurality of ultraviolet emitting lights away therefrom and towards said at least one cooling channel.

20. The air cleaning assembly according to claim 19, wherein said ultraviolet emitting lights comprise LED lights.

* * * * *